United States Patent
Yasuda

(10) Patent No.: US 12,142,723 B2
(45) Date of Patent: Nov. 12, 2024

(54) SOLID ELECTROLYTE COMPOSITION, SHEET FOR ALL-SOLID STATE SECONDARY BATTERY, ELECTRODE SHEET FOR ALL-SOLID STATE SECONDARY BATTERY, ALL-SOLID STATE SECONDARY BATTERY, METHOD OF MANUFACTURING SHEET FOR ALL-SOLID STATE SECONDARY BATTERY, AND METHOD OF MANUFACTURING ALL-SOLID STATE SECONDARY BATTERY

(71) Applicant: FUJIFILM Corporation, Tokyo (JP)

(72) Inventor: Koji Yasuda, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 1035 days.

(21) Appl. No.: 17/070,945

(22) Filed: Oct. 15, 2020

(65) Prior Publication Data
US 2021/0234193 A1 Jul. 29, 2021

Related U.S. Application Data

(63) Continuation of application No. PCT/JP2019/016133, filed on Apr. 15, 2019.

(30) Foreign Application Priority Data

Apr. 20, 2018 (JP) .................................. 2018-081671
Mar. 29, 2019 (JP) .................................. 2019-066143

(51) Int. Cl.
*H01M 10/0562* (2010.01)
*H01M 4/62* (2006.01)
*H01M 10/0585* (2010.01)

(52) U.S. Cl.
CPC ....... *H01M 10/0562* (2013.01); *H01M 4/622* (2013.01); *H01M 10/0585* (2013.01); *H01M 2300/008* (2013.01)

(58) Field of Classification Search
CPC ............. H01M 10/0562; H01M 4/622; H01M 10/0585; H01M 2300/008
See application file for complete search history.

(56) References Cited

U.S. PATENT DOCUMENTS

| | | | |
|---|---|---|---|
| 10,347,935 B2 | 7/2019 | Mochizuki et al. | |
| 2015/0349310 A1* | 12/2015 | Viner | C08G 75/00 429/126 |

(Continued)

FOREIGN PATENT DOCUMENTS

| | | |
|---|---|---|
| JP | 2015088486 | 5/2015 |
| JP | 2015164125 | 9/2015 |

(Continued)

OTHER PUBLICATIONS

The Decision to grant a Patent issued by KPO (Year: 2022).*

(Continued)

*Primary Examiner* — Alexander Usyatinsky
(74) *Attorney, Agent, or Firm* — JCIPRNET

(57) ABSTRACT

Provided is a solid electrolyte composition including: an inorganic solid electrolyte having ion conductivity of a metal belonging to Group 1 or Group 2 in the periodic table; and binder particles including a resin represented by a specific formula. In addition, provided are a sheet for an all-solid state secondary battery, an electrode sheet for an all-solid state secondary battery, and an all-solid state secondary battery that include the above-described solid electrolyte composition, and a method of manufacturing the sheet for an all-solid state secondary battery and a method of manufacturing the all-solid state secondary battery.

20 Claims, 1 Drawing Sheet

(56) References Cited

U.S. PATENT DOCUMENTS

| | | | |
|---|---|---|---|
| 2016/0181657 A1* | 6/2016 | Kawaji | H01M 10/0525 |
| | | | 429/162 |
| 2016/0204465 A1 | 7/2016 | Mimura et al. | |
| 2016/0336613 A1 | 11/2016 | Mochizuki et al. | |
| 2017/0352917 A1 | 12/2017 | Makino et al. | |

FOREIGN PATENT DOCUMENTS

| | | | | |
|---|---|---|---|---|
| WO | WO-2015046314 A1 * | 4/2015 | | C08F 12/24 |
| WO | 2015115561 | 8/2015 | | |
| WO | 2016136089 | 9/2016 | | |

OTHER PUBLICATIONS

The Decision to grant a Patent issued by JPO (Year: 2021).*
Anna Tochwin; et al., "Thermoresponsive and Reducible Hyperbranched Polymers Synthesized by RAFT Polymerisation, " Polymers, Sep. 13, 2017, pp. 1-15.
"International Search Report (Form PCT/ISA/210) of PCT/JP2019/016133", mailed on Jun. 25, 2019, with English translation thereof, pp. 1-5.
"Written Opinion of the International Searching Authority (Form/ISA/237) of PCT/JP2019/016133", mailed on Jun. 25, 2019, with English translation thereof, p1-p8.
"Search Report of Europe Counterpart Application", issued on May 14, 2021, p1-p8.

* cited by examiner

SOLID ELECTROLYTE COMPOSITION, SHEET FOR ALL-SOLID STATE SECONDARY BATTERY, ELECTRODE SHEET FOR ALL-SOLID STATE SECONDARY BATTERY, ALL-SOLID STATE SECONDARY BATTERY, METHOD OF MANUFACTURING SHEET FOR ALL-SOLID STATE SECONDARY BATTERY, AND METHOD OF MANUFACTURING ALL-SOLID STATE SECONDARY BATTERY

CROSS-REFERENCE TO RELATED APPLICATIONS

This application is a Continuation of PCT International Application No. PCT/JP2019/016133 filed on Apr. 15, 2019, which claims priority under 35 U.S.C. § 119 (a) to Japanese Patent Application No. JP2018-081671 filed in Japan on Apr. 20, 2018, and Japanese Patent Application No. 2019-066143 filed in Japan on Mar. 29, 2019. Each of the above applications is hereby expressly incorporated by reference, in its entirety, into the present application.

BACKGROUND OF THE INVENTION

1. Field of the Invention

The present invention relates to a solid electrolyte composition, a sheet for an all-solid state secondary battery, an electrode sheet for an all-solid state secondary battery, an all-solid state secondary battery, a method of manufacturing a sheet for an all-solid state secondary battery, and a method of manufacturing an all-solid state secondary battery.

2. Description of the Background Art

In an all-solid state secondary battery, a negative electrode, an electrolyte, and a positive electrode are all solid, and safety or reliability which is considered an issue of batteries including an organic electrolytic solution can be significantly improved. In addition, the service lives can also be extended. Further, an all-solid state secondary battery may have a structure in which electrodes and an electrolyte are directly disposed in series. Therefore, the energy density can be further increased as compared to a secondary battery in which an organic electrolytic solution is used, and the application to an electric vehicle or a large-sized storage battery is expected.

A configuration is disclosed in which, in the all-solid state secondary battery, any one of constituent layers (an inorganic solid electrolyte layer, a negative electrode active material layer, and a positive electrode active material layer) is formed of a material including an inorganic solid electrolyte or an active material and binder particles (binder) such as a specific polymer compound. For example, JP2015-164125A describes a solid electrolyte composition including an inorganic solid electrolyte and an amorphous multi-branched polymer. In addition, JP2015-088486A describes a solid electrolyte composition including: binder particles having an average particle size of 10 nm to 1,000 nm that is formed of a polymer incorporated with a macromonomer having a number-average molecular weight of 1,000 or higher as a side chain component; an inorganic solid electrolyte; and a dispersion medium.

SUMMARY OF THE INVENTION

In a case where a constituent layer of an all-solid state secondary battery is formed using solid particles (for example, an inorganic solid electrolyte, solid particles, or a conductive auxiliary agent), the interface contact between the solid particles is low, and the interface resistance tends to increase. Further, in a case where binding properties of binder particles between the solid particles are weak, poor contact between the solid particles occurs. In addition, in a case where binding properties between the solid particles and a current collector are weak, for example, poor contact between the active material layer and the solid electrolyte layer occurs due to poor contact between the active material layer and the current collector and expansion and contraction of the active material during charging and discharging. In a case where the poor contact occurs, the battery performance of the all-solid state secondary battery decreases.

Incidentally, recently the performance of an electric vehicle has increased, and research and development for practical use or the like has rapidly progressed. Therefore, battery performance required for the all-solid state secondary battery has increased. Thus, binding properties between the solid particles and binding properties between the current collector and the solid particle (hereinafter, collectively referred to as "binding properties between solid particles") are required to be improved for the all-solid state secondary battery to exhibit a high battery performance.

An object of the present invention is to provide a solid electrolyte composition that can improve binding properties between solid particles to impart a high battery performance to an all-solid state secondary battery in case of being used as a material forming a constituent layer of the all-solid state secondary battery. In addition, another object of the present invention is to provide a sheet for an all-solid state secondary battery, an electrode sheet for an all-solid state secondary battery, and an all-solid state secondary battery that are formed of the solid electrolyte composition, a method of manufacturing a sheet for an all-solid state secondary battery, and a method of manufacturing an all-solid state secondary battery.

The present inventors repeatedly conducted a thorough investigation and found that, by using binder particles formed of a specific branched resin including different both chains in combination with an inorganic solid electrolyte, an inorganic solid electrolyte and solid particles can be strongly bound to each other, and in a case where an active material layer is formed, a constituent layer in which solid particles and a current collector are strongly bound to each other can be formed, the chains including: a polymer chain including 50 mass % or higher of a component having a SP (Solubility Parameter) value of 19.5 or higher and a polymer chain including a component derived from a specific macromonomer. Further, the present inventors found that, by using the solid electrolyte composition as a sheet for an all-solid state secondary battery or a material for forming a constituent layer in an all-solid state secondary battery, an excellent battery performance can be imparted to the all-solid state secondary battery. The present invention has been completed based on the above findings as a result of repeated investigation.

That is, the above-described objects have been achieved by the following means.

<1> A solid electrolyte composition comprising:
an inorganic solid electrolyte having ion conductivity of a metal belonging to Group 1 or Group 2 in the periodic table; and
binder particles including a resin represented by the following (Formula 1), Formula (I)

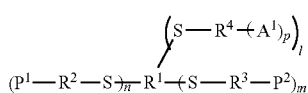

in the formula, $R^1$ represents a (l+m+n)-valent linking group,
$A^1$ represents a hydrogen atom, an acidic group, a group having a basic nitrogen atom, a urea group, a urethane group, an alkoxysilyl group, an epoxy group, an isocyanate group, or a hydroxyl group,
p represents an integer of 1 to 10,
$R^2$, $R^3$, and $R^4$ each independently represent a single bond or a linking group,
$P^1$ represents a polymer chain including 50 mass % or higher of a component having a SP value of 19.5 or higher,
$P^2$ represents a polymer chain including a component derived from a macromonomer having a number-average molecular weight of 500 or higher,
l represents an integer of 0 to 5,
m represents an integer of 1 to 8,
n represents an integer of 1 to 9, and
l+m+n represents an integer of 3 to 10.

<2> The solid electrolyte composition according to <1>, in which the macromonomer includes an ethylenically unsaturated bond at a terminal or a side chain.

<3> The solid electrolyte composition according to <1> or <2>,
in which the macromonomer is represented by the following (Formula 3), Formula (3)

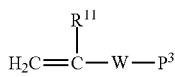

in the formula, $R^{11}$ represents a hydrogen atom or an alkyl group having 1 to 8 carbon atoms,
W represents a single bond or a linking group, and
$P^3$ represents a polymer chain.

<4> The solid electrolyte composition according to any one of <1> to <3>,
in which the macromonomer includes a polymer chain selected from the group consisting of a (meth)acrylic polymer, polyether, polysiloxane, polyester, and a combination thereof and an ethylenically unsaturated bond bound to the polymer chain.

<5> The solid electrolyte composition according to any one of <1> to <4>,
in which the polymer chain $P^1$ includes a component derived from a polymerizable compound selected from a (meth)acrylic acid compound, a (meth)acrylic acid ester compound, or a (meth)acrylonitrile compound.

<6> The solid electrolyte composition according to any one of <1> to <5>,
in which the resin is a reactant of a compound represented by the following (Formula 2), a polymerizable compound forming the polymer chain $P^1$, and a polymerizable compound forming the polymer chain $P^2$, Formula (2)

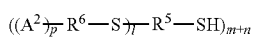

in the formula, $R^5$ represents a (l+m+n)-valent linking group,
$R^6$ represents a single bond or a linking group,
$A^2$ represents a hydrogen atom, an acidic group, a group having a basic nitrogen atom, a urea group, a urethane group, an alkoxysilyl group, an epoxy group, an isocyanate group, or a hydroxyl group,
p represents an integer of 1 to 10,
l represents an integer of 0 to 5,
m+n represents an integer of 2 to 10, and
l+m+n represents an integer of 3 to 10.

<7> The solid electrolyte composition according to any one of <1> to <6>,
in which a polymer chain in the macromonomer includes a component derived from a (meth)acrylic acid ester compound that has an alkyl group having 4 or more carbon atoms and a component derived from a polymerizable compound having a SP value of 20.0 or higher.

<8> The solid electrolyte composition according to any one of <1> to <7>,
in which a polymer chain in the macromonomer includes at least one component selected from a component derived from a (meth)acrylic acid ester compound that has an alkyl group having 4 or more carbon atoms, a component represented by the following (Formula 4), a component represented by the following (Formula 5), or a component derived from a (meth)acrylic acid hydroxyalkyl ester compound, Formula (4)

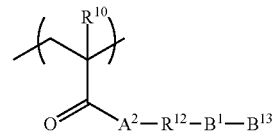

in (Formula 4), $R^{10}$ represents a hydrogen atom or methyl,
$A^2$ represents —O— or —$NR^A$—,
$R^A$ represents a hydrogen atom or an alkyl group,
$R^{12}$ represents a single bond or a linking group,
$B^1$ represents a single bond or a linking group including —$CONR^C$— or —$SO_2NR^C$—,
$R^C$ represents a hydrogen atom or an alkyl group, and
$R^{13}$ represents a hydrogen atom, an alkyl group having 1 to 20 carbon atoms, an aromatic group, an aryloxy group, or an aralkyloxy group, and Formula (5)

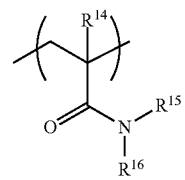

in (Formula 5), $R^{14}$ represents a hydrogen atom or methyl, and
$R^{15}$ and $R^{16}$ represent a hydrogen atom or an alkyl group.

<9> The solid electrolyte composition according to <7> or <8>,
in which a polymer chain in the macromonomer includes a component derived from a (meth)acrylic acid ester compound having an alicyclic structure.

<10> The solid electrolyte composition according to any one of <1> to <9>,
in which a glass transition temperature of the binder particles is 30° C. or lower.
<11> The solid electrolyte composition according to any one of <1> to <10>,
in which an average particle size of the binder particles is 300 nm or less.
<12> The solid electrolyte composition according to any one of <1> to <11>,
in which the inorganic solid electrolyte is represented by the following Formula (S1),

$$L_{a1}M_{b1}P_{c1}S_{d1}A_{e1} \quad (S1),$$

in the formula, L represents an element selected from Li, Na, or K,
M represents an element selected from B, Zn, Sn, Si, Cu, Ga, Sb, Al, or Ge,
A represents an element selected from I, Br, Cl, or F, and
a1 to e1 represent the compositional ratios among the respective elements, and a1:b1:c1:d1:e1 satisfies 1 to 12:0 to 5:1:2 to 12:0 to 10.
<13> The solid electrolyte composition according to any one of <1> to <12>, further comprising a dispersion medium.
<14> The solid electrolyte composition according to <13>,
in which the dispersion medium is selected from a ketone compound, an aliphatic compound, or an ester compound.
<15> The solid electrolyte composition according to any one of <1> to <14>, further comprising an active material.
<16> A sheet for an all-solid state secondary battery, the sheet comprising a layer that is formed of the solid electrolyte composition according to any one of <1> to <15>.
<17> An electrode sheet for an all-solid state secondary battery, the electrode sheet comprising an active material layer that is formed of the solid electrolyte composition according to <15>.
<18> An all-solid state secondary battery comprising a positive electrode active material layer, a solid electrolyte layer, and a negative electrode active material layer in this order,
in which at least one of the positive electrode active material layer, the solid electrolyte layer, or the negative electrode active material layer is formed of the solid electrolyte composition according to any one of <1> to <15>.
<19> A method of manufacturing a sheet for an all-solid state secondary battery, the method comprising forming a film using the solid electrolyte composition according to any one of <1> to <15>.
<20> A method of manufacturing an all-solid state secondary battery, the method comprising manufacturing the all-solid state secondary battery through the method according to <19>.

In a case where the solid electrolyte composition according to an aspect of the present invention is used as a material of a constituent layer in a sheet for an all-solid state secondary battery or an all-solid state secondary battery, a sheet or a constituent layer in which binding properties between solid particles are strong can be formed. The sheet for an all-solid state secondary battery according to the aspect of the present invention exhibits strong binding properties between solid particles. The all-solid state secondary battery according to the aspect of the present invention exhibits excellent battery performance. In addition, in the method of manufacturing a sheet for an all-solid state secondary battery and the method of manufacturing an all-solid state secondary battery according to the aspect of the present invention, the sheet for an all-solid state secondary battery and the all-solid state secondary battery according to the aspect of the present invention having the above-described excellent characteristics can be manufactured.

The above-described and other characteristics and advantageous effects of the present invention will be clarified from the following description appropriately with reference to the accompanying drawings.

DESCRIPTION OF THE PREFERRED EMBODIMENTS

Figure 1:
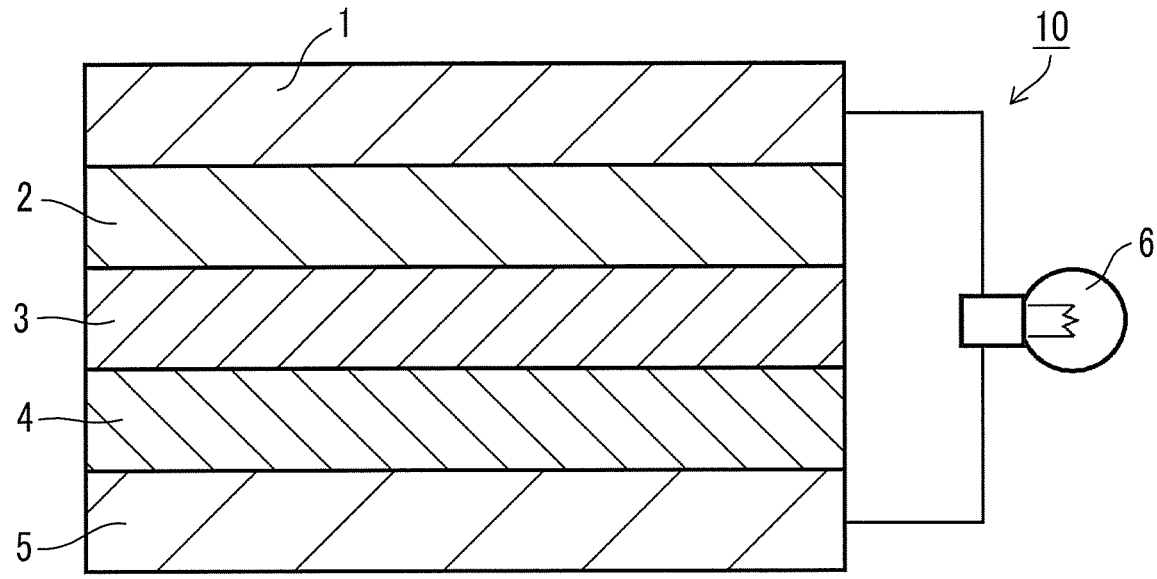
FIG. 1 is a vertical cross-sectional view schematically illustrating an all-solid state secondary battery according to a preferred embodiment of the present invention.

In the present specification, numerical ranges represented by "to" include numerical values before and after "to" as lower limit values and upper limit values.

In the description of the present specification, the simple expression "acryl" or "(meth)acryl" refers to acryl and/or methacryl.

In the present specification, the expression of a compound (for example, in a case where a compound is represented by an expression with "compound" added to the end) refers to not only the compound itself but also a salt or an ion thereof. In addition, this expression also refers to a derivative obtained by modifying a part of the compound, for example, by introducing a substituent into the compound within a range where the effects of the present invention do not deteriorate.

A substituent, a linking group, or the like (hereinafter, referred to as "substituent or the like") is not specified in the present specification regarding whether to be substituted or unsubstituted may have an appropriate substituent. Accordingly, even in a case where a YYY group is simply described in the present specification, this YYY group includes not only an aspect having a substituent but also an aspect not having a substituent. The same shall be applied to a compound which is not specified in the present specification regarding whether to be substituted or unsubstituted. Preferable examples of the substituent include respective substituents described below that can be used as Rr.

In the present specification, in a case where a plurality of substituents or the like represented by a specific reference numeral are present or a plurality of substituents or the like are simultaneously or alternatively defined, the respective substituents or the like may be the same as or different from each other. In addition, unless specified otherwise, in a case where a plurality of substituents or the like are adjacent to each other, the substituents may be linked or fused to each other to form a ring.

[Solid Electrolyte Composition]

A solid electrolyte composition according to an embodiment of the present invention comprises: an inorganic solid electrolyte having ion conductivity of a metal belonging to Group 1 or Group 2 in the periodic table; and binder particles including a resin represented by (Formula 1)

described below. The resin forming the binder particles has a branched structure and includes a polymer chain $P^1$ and a polymer chain $P^2$ that are different from each other and are bound to the branched structure.

In a case where a sheet or a constituent layer is formed using the solid electrolyte composition according to the embodiment of the present invention, solid particles can be strongly bound to each other. In addition, in a case where an active material layer is formed using the solid electrolyte composition, not only solid particles but also solid particles and a current collector can be strongly bound to each other. As a result, an all-solid state secondary battery including a sheet or a constituent layer that is formed using the solid electrolyte composition according to the embodiment of the present invention exhibits excellent battery performance. The details of the reason for this are not clear but considered to be as follows.

That is, in the binder particles defined by the present invention, the content of the resin represented by (Formula 1) described below is high, and the content (residual amount) of a synthetic raw material of the resin, in particular, a polymerizable compound or a macromonomer forming a component derived from a macromonomer is low. However, this resin can exhibit a function of itself separate from the functions of $P^1$ and $P^2$ that are different from each other and are introduced into the branched structure. Therefore, not only solid particles but also solid particles and a current collector can be strongly bound to each other, which can contribute to improvement of the battery performance of the all-solid state secondary battery.

It is preferable that the solid electrolyte composition according to the embodiment of the present invention includes a dispersion medium. In this case, a mixed aspect of the inorganic solid electrolyte, the binder particles, and the dispersion medium is not particularly limited and is preferably a slurry in which the inorganic solid electrolyte and the binder particles are dispersed in the dispersion medium.

In a case where a slurry is prepared using the solid electrolyte composition according to the embodiment of the present invention including the dispersion medium, the solid particles of the inorganic solid electrolyte and the active material, the conductive auxiliary agent, and the like that are used in combination can be favorably dispersed in the dispersion medium, and binding properties of solid particles in the obtained sheet or constituent layer can be further improved.

It is preferable that the solid electrolyte composition according to the embodiment of the present invention is used as a material for forming a sheet for an all-solid state secondary battery or a solid electrolyte layer or an active material layer in an all-solid state secondary battery.

The moisture content (also referred to as "water content") in the solid electrolyte composition according to the embodiment of the present invention is not particularly limited and is preferably 500 ppm or lower, more preferably 200 ppm or lower, still more preferably 100 ppm or lower, and still more preferably 50 ppm or lower. In a case where the moisture content of the solid electrolyte composition is low, deterioration of the inorganic solid electrolyte can be suppressed. The moisture content refers to the amount of water (the mass ratio thereof to the solid electrolyte composition) in the solid electrolyte composition and specifically is a value measured by Karl Fischer titration after filtering the solid electrolyte composition the through a membrane filter having a pore size of 0.02 μm.

Hereinafter, the components that are included in the solid electrolyte composition according to the embodiment of the present invention and components that may be included therein will be described.

<Inorganic Solid Electrolyte>

The solid electrolyte composition according to the embodiment of the present invention includes an inorganic solid electrolyte.

In the present invention, the inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic matter as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has ion conductivity of a metal belonging to Group 1 or Group 2 in the periodic table and generally does not have electron conductivity.

The inorganic solid electrolyte has ion conductivity of a metal belonging to Group 1 or Group 2 in the periodic table. The inorganic solid electrolyte can be appropriately selected from solid electrolyte materials that are typically used for an all-solid state secondary battery. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based solid electrolyte. From the viewpoint that a more favorable interface can be formed between the active material and the inorganic solid electrolyte, a sulfide-based inorganic solid electrolyte is preferably used.

In a case where an all-solid state secondary battery according to the embodiment of the present invention is a lithium ion battery, the inorganic solid electrolyte preferably has ion conductivity of lithium ions.

(i) Sulfide-Based Inorganic Solid Electrolyte

The sulfide-based inorganic solid electrolyte is preferably a compound that contains a sulfur atom, has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. However, the sulfide-based inorganic solid electrolyte may include elements other than Li, S, and P depending on the purposes or cases.

Examples of the sulfide-based inorganic solid electrolyte include a lithium ion-conductive inorganic solid electrolyte satisfying a composition represented by the following Formula (S1).

$$L_{a1}M_{b1}P_{c1}S_{d1}A_{e1} \tag{S1}$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios among the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the amounts of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case where the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S_5$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolyte

The oxide-based inorganic solid electrolyte is preferably a compound that contains an oxygen atom, has ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited, but realistically $1\times10^{-1}$ S/cm or less.

Specific examples of the compound include: $Li_{xa}La_{ya}TiO_3$ (xa satisfies $0.3\leq xa\leq0.7$ and ya satisfies $0.3\leq ya\leq0.7$) (LLT); $Li_{xb}La_{yb}Zr_{zb}M^{bb}_{mb}O_{nb}$ ($M^{bb}$ represents at least one element selected from Al, Mg, Ca, Sr, V, Nb, Ta, Ti, Ge, In, or Sn, xb satisfies $5\leq xb\leq10$, yb satisfies $1\leq yb\leq4$, zb satisfies $1\leq zb\leq4$, mb satisfies $0\leq mb\leq2$, and nb satisfies $5\leq nb\leq20$.); $Li_{xe}B_{ye}M^{cc}_{zc}O_{nc}$ ($M^{cc}$ represents at least one element selected from C, S, Al, Si, Ga, Ge, In, or Sn, xc satisfies $0<xc\leq5$, yc satisfies $0<yc\leq1$, zc satisfies $0<zc\leq1$, and nc satisfies $0<nc\leq6$); $Li_{xd}(Al, Ga)_{yd}(Ti, Ge)_{zd}Si_{ad}P_{md}O_{nd}$ (xd satisfies $1\leq xd\leq3$, yd satisfies $0\leq yd\leq1$, zd satisfies $0\leq zd\leq2$, ad satisfies $0\leq ad\leq1$, md satisfies $1\leq md\leq7$, and nd satisfies $3\leq nd\leq13$); $Li_{(3-2xe)}M^{ee}_{xe}D^{ee}O$ (xe represents a number of 0 to 0.1, $M^{ee}$ represents a divalent metal atom, and $D^{ee}$ represents a halogen atom or a combination of two or more halogen atoms); $Li_{xf}Si_{yf}O_{zf}$ (xf satisfies $1\leq xf\leq5$, yf satisfies $0<yf\leq3$, and zf satisfies $1\leq zf\leq10$); $Li_{xg}S_{yg}O_{zg}$ (xg satisfies $1\leq xg\leq3$, yg satisfies $0<yg\leq2$, and zg satisfies $1\leq zg\leq10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies $w<1$); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh represents $0\leq xh\leq1$, and yh represents $0\leq yh\leq1$); and $Li_7La_3Zr_2O_{12}$ (LLZ) having a garnet-type crystal structure. In addition, phosphorus compounds containing Li, P, and O are also desirable. Examples of the phosphorus compound include: lithium phosphate ($Li_3PO_4$); LiPON in which some of oxygen atoms in lithium phosphate are substituted with nitrogen atoms; and $LiPOD^1$ ($D^1$ preferably represents one or more elements selected from Ti, V, Cr, Mn, Fe, Co, Ni, Cu, Zr, Nb, Mo, Ru, Ag, Ta, W, Pt, or Au). Further, for example, $LiA^1ON$ ($A^1$ represents one or more elements selected from Si, B, Ge, Al, C, or Ga) can be preferably used.

(ii) Halide-Based Inorganic Solid Electrolyte

The halide-based inorganic solid electrolyte is preferably a compound that contains a halogen atom, has ion conductivity of a metal belonging to Group 1 or Group 2 in the periodic table, and has electron-insulating properties.

The halide-based inorganic solid electrolyte is not particularly limited, and examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or $Li_3YCl_6$ is preferable.

(iV) Hydride-Based Inorganic Solid Electrolyte

The hydride-based inorganic solid electrolyte is preferably a compound that contains a hydrogen atom, has ion conductivity of a metal belonging to Group 1 or Group 2 in the periodic table, and has electron-insulating properties.

The hydride-based inorganic solid electrolyte is not particularly limited, and examples thereof include $LiBH_4$, $Li_4(BH_4)_3I$, and $3LiBH_4$—LiCl.

The inorganic solid electrolyte is preferably in the form of particles. In this case, the volume average particle size of the inorganic solid electrolyte is not particularly limited, but is preferably 0.01 μm or more and more preferably 0.1 μm or more. The upper limit is preferably 100 μm or less and more preferably 50 μm or less. The volume average particle size of the inorganic solid electrolyte is measured in the following order. The inorganic solid electrolyte particles are diluted using water (heptane in a case where the inorganic solid electrolyte is unstable in water) in a 20 mL sample bottle to prepare 1 mass % of a dispersion liquid. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five specimens are prepared and the average value thereof is adopted.

As the inorganic solid electrolyte, one kind may be used alone, or two or more kinds may be used in combination.

In a case where a solid electrolyte layer is formed, the mass (mg) of the inorganic solid electrolyte per unit area ($cm^2$) of the solid electrolyte layer (weight per unit area) is not particularly limited. The mass (mg) of the inorganic solid electrolyte can be appropriately determined depending on the designed battery capacity and may be, for example, 1 to 100 $mg/cm^2$.

Here, in a case where the solid electrolyte composition includes an active material described below, regarding the weight of the inorganic solid electrolyte per unit area, the total amount of the active material and the inorganic solid electrolyte is preferably in the above-described range.

From the viewpoints of dispersibility, a reduction in interface resistance, and binding properties, the content of the inorganic solid electrolyte in the solid electrolyte composition is preferably 5 mass % or higher, more preferably 70 mass % or higher, and still more preferably 90 mass % or higher with respect to 100 mass % of the solid content. From the same viewpoint, the upper limit is preferably 99.9 mass % or lower, more preferably 99.5 mass % or lower, and particularly preferably 99 mass % or lower.

Here, in a case where the solid electrolyte composition contains an active material described below, regarding the content of the inorganic solid electrolyte in the solid electrolyte composition, the total content of the active material and the inorganic solid electrolyte is preferably in the above-described range.

In the present specification, the solid content (solid component) refers to components that neither volatilize nor evaporate and disappear in a case where the solid electrolyte composition is dried at 170° C. for 6 hours in a nitrogen atmosphere at a pressure of 1 mmHg. Typically, the solid content refers to components other than a dispersion medium described below.

<Binder Particles>

The solid electrolyte composition according to the embodiment of the present invention includes one kind or two or more kinds of binder particles, in which at least one kind, preferably, all the kinds of binder particles are binder particles (also referred to as "binder particles used in the present invention") including a resin represented by the following (Formula 1).

In an electrode sheet for an all-solid state secondary battery and an all-solid state secondary battery (constituent layer) according to the embodiment of the present invention, the binder particles, in particular, the binder particles including the resin represented by the following (Formula 1) function as a binder that strongly bind the solid particles (for example, particles of the inorganic solid electrolyte, the inorganic solid electrolyte and the active material, and particles of the active material) and further strongly bind the solid particles and the current collector. Further, in the solid electrolyte composition, solid particles can also be highly dispersed in the dispersion medium.

The binder particles used in the present invention are formed in a particle shape including the resin represented by the following (Formula 1). In the present invention, the binder particles can be obtained as particles (a dispersion liquid of the binder resin) by solidifying the resin obtained in the synthesis process of the resin in a particle shape in the dispersion medium. In this case, in the binder particles (dispersion liquid), the content of the resin represented by (Formula 1) described below is high even without performing special purification. Components in the binder particles other than the resin are not particularly limited, and examples thereof include a synthetic raw material (an unreacted material or a decomposition product of a polymerization initiator catalyst) of the resin, a dispersion medium, and water. The content of the synthetic raw material of the resin in the binder particles is not particularly limited within a range where strong binding properties between solid particles do not deteriorate, and is appropriately determined depending on the performance required for a sheet for an all-solid state secondary battery, an all-solid state secondary battery, or the like and the kind, content, and the like of solid particles that is further used in combination. For example, the content can be set to be 25 mass % or lower as the amount of the component dissolved in Examples described below.

The shape of the binder particles in the solid electrolyte composition is not particularly limited as long as they can bind the solid particles to each other as a binder. The shape of the binder particles may be a flat shape or an unstructured shape and is typically a spherical shape or a granular shape.

The average particle size of the binder particles is not particularly limited, and is preferably 1000 nm or less, more preferably 500 nm or less, and still more preferably 300 nm or less. The lower limit value is 1 nm or more, preferably 5 nm or more, more preferably 10 nm or more, and still more preferably 50 nm or more. By adjusting the size of the binder particles to be in the above-described range, within a range where the strong binding properties between solid particles do not deteriorate, the contact area between the binder particles and the solid particles or the like can be reduced, and the resistance of the sheet and the all-solid state secondary battery can be reduced. That is, an increase in the interface resistance of the solid particles can be suppressed while improving the binding properties between the solid particles.

Unless specified otherwise, the average particle size of the binder particles is limited to measurement conditions and a definition described below.

The binder particles are diluted using an appropriate solvent (for example, diisobutyl ketone) in a 20 mL sample bottle to prepare 1 mass % of a dispersion liquid. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. The obtained volume average particle size is set as the average particle size. Other detailed conditions and the like can be found in JIS Z8828: 2013 "Particle Size Analysis-Dynamic Light Scattering" as necessary. For each level, five samples are prepared and measured, and the average value thereof is adopted.

In a case where an all-solid state secondary battery is used, the average particle size of the binder particles can be measured for example, by disassembling the all-solid state secondary battery to peel off an active material layer or a solid electrolyte layer, measuring the average particle size of a material of the active material layer or the solid electrolyte layer using the above-described method of measuring the average particle size of the binder particles, and excluding the measured value of the average particle size of the particles other than the binder particles obtained in advance from the average particle size of the material.

The glass transition temperature of the binder particles is not particularly limited and is preferably 30° C. or lower. In a case where the glass transition temperature is 30° C. or lower, the dispersibility of the solid electrolyte composition is high, low resistance and strong binding properties for use in a sheet or a constituent layer are exhibited, and excellent battery performance is exhibited. The detailed reason for this is not clear but is presumed to be that, in a case where the solid particles are adhered to each other, the binder particles are deformed along fine unevenness of the solid particle surfaces such that the contact area is improved. From the viewpoints of dispersibility, resistance, and binding properties, the glass transition temperature is preferably 25° C. or lower, more preferably 15° C. or lower, and still more preferably 5° C. or lower. The lower limit of the glass transition temperature is not particularly limited, can be set to, for example, −200° C., and is preferably −150° C. or higher and more preferably −120° C. or higher.

The glass transition temperature (Tg) is measured using a dry sample of the binder particles as a measurement target with a differential scanning calorimeter "X-DSC7000" (trade name, manufactured by SII NanoTechnology Inc.) under the following conditions. The measurement is performed twice using the same sample, and the result of the second measurement is adopted.

Atmosphere in measuring chamber: nitrogen gas (50 mL/min)
Temperature increase rate: 5° C./min
Measurement start temperature: −100° C.
Measurement end temperature: 200° C.
Sample pan: aluminum pan
Mass of measurement sample: 5 mg Calculation of Tg: Tg is calculated by rounding off the decimal point of an intermediate temperature between a declination start point and a declination end point in a DSC chart.

In a case where an all-solid state secondary battery is used, the glass transition temperature can be measured, for example, by disassembling the all-solid state secondary battery to peel off an active material layer or a solid electrolyte layer, putting the active material layer or the solid electrolyte layer into water to disperse a material thereof, filtering the dispersion liquid, collecting the remaining solid, and measuring the glass transition temperature of the solid using the above-described measurement method.

It is preferable that the resin in the binder particles is amorphous. In the present invention, "amorphous resin" typically refers to a resin that shows no endothermic peak caused by crystal melting during measurement using the above-described measurement method of the glass transition temperature.

The mass average molecular weight of the resin forming the binder particles is not particularly limited. For example, the weight-average molecular weight is preferably 3,000 or higher, more preferably 5,000 or higher, and still more preferably 7,000 or higher. The upper limit is practically 1,000,000 or lower, and an aspect where the polymer is crosslinked is also preferable.

The mass average molecular weight of the resin represented by (Formula 1) can be measured as the mass average molecular weight in terms of standard polystyrene using the same method as that of the number-average molecular weight of the macromonomer.

In a case where the crosslinking of the resin progresses due to heating or voltage application, the molecular weight may be higher than the above-described molecular weight. At the start of using the all-solid state secondary battery, the mass average molecular weight of the resin forming the binder particles is preferably in the above-described range.

The moisture content of the resin (binder particles) represented by (Formula 1) is preferably 100 ppm (by mass) or lower. In addition, the resin (binder particles) may be dried by crystallization, or the resin dispersion liquid may be used as it is. As described above, the resin (binder particles) represented by (Formula 1) has a high purity and can strongly bond solid particles to each other even without being purified.

The resin in the binder particles is represented by the following (Formula 1).

In the resin, linking groups, polymer chains, and adsorption groups $A^1$ represented by the respective reference numerals may be the same as or different from each other, respectively. In addition, in a case where a plurality of the respective chains ($-S-R^2-P^1$, $-S-R^3-P^2$, and $-S-R^4-(A^1)p$) linked to $R^1$ are present, these chains may be the same as or different from each other.

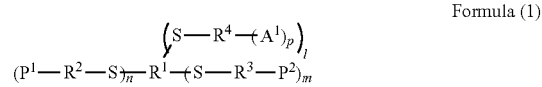

Formula (1)

in (Formula 1), $R^1$ represents a (l+m+n)-valent linking group. $A^1$ represents a hydrogen atom, an acidic group, a group having a basic nitrogen atom, a urea group, a urethane group, an alkoxysilyl group, an epoxy group, an isocyanate group, or a hydroxyl group. p represents an integer of 1 to 10. $R^2$, $R^3$, and $R^4$ each independently represent a single bond or a linking group. $P^1$ represents a polymer chain including 50 mass % or higher of a component having a SP value of 19.5 or higher. $P^2$ represents a polymer chain including a component derived from a macromonomer having a number-average molecular weight of 500 or higher. l represents an integer of 0 to 5, m represents an integer of 1 to 8, and n represents an integer of 1 to 9. l+m+n represents an integer of 3 to 10.

$R^1$ represents a (l+m+n)-valent linking group, which is typically a linking group (organic linking group) consisting of an organic group having a skeleton to which a carbon atom is linked through a covalent bond and preferably a linking group having an oxygen atom. The molecular weight of the linking group is not particularly limited and, for example, is preferably 200 or higher and more preferably 300 or higher. The upper limit of the molecular weight is preferably 5,000 or lower, more preferably 4,000 or lower, and still more preferably 3,000 or lower. It is preferable that the linking group does not consist of only one tetravalent carbon atom.

The valence of the linking group is 3 to 10 and has the same definition and the same preferable range as those of (l+m+n) described below.

It is preferable that the linking group has a group represented by the following Formula 1a. It is preferable that the number of groups represented by Formula 1a in the linking group $R^1$ is the same as (l+m+n) that is the valence of $R^1$. In a case where the linking group has a plurality of groups represented by Formula 1a, the groups may be the same as or different from each other.

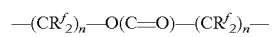 Formula 1a

In Formula 1a, n represents an integer of 0 to 10, preferably an integer of 1 to 6, and more preferably 1 or 2.

$R^f$ represents a hydrogen atom or a substituent and preferably a hydrogen atom. The substituent which may be used as $R^f$ is not particularly limited, and examples thereof include a halogen atom (for example, a fluorine atom, a chlorine atom, a bromine atom, or an iodine atom), an alkyl group (having preferably 1 to 12 carbon atoms, more preferably 1 to 6 carbon atoms, and still more preferably 1 to 3 carbon atoms), an alkoxy group (having preferably 1 to 12 carbon atoms, more preferably 1 to 6 carbon atoms, and still more preferably 1 to 3 carbon atoms), an acyl group (having preferably 2 to 12 carbon atoms, more preferably 2 to 6 carbon atoms, and still more preferably 2 or 3 carbon atoms), an aryl group (having preferably 6 to 22 carbon atoms and more preferably 6 to 10 carbon atoms), an alkenyl group (having preferably 2 to 12 carbon atoms and more preferably 2 to 5 carbon atoms), a hydroxyl group, a nitro group, a cyano group, a mercapto group, an amino group, an amido group, and an acidic group (for example, a carboxyl group, a phosphate group, or a sulfonate group). Each of the acidic groups may be a salt thereof. Examples of a counter ion include an alkali metal ion an alkali earth metal ion, an ammonium ion, and an alkylammonium ion.

It is preferable that the linking group $R^1$ is a linking group represented by the following Formula 1A or Formula 1B.

($-SiR^{S1}R^{S2}-$: $R^{S1}$ and $R^{S2}$ represent a hydrogen atom or an alkyl group having 1 to 6 carbon atoms), a carbonyl group, an imino group ($-NR^N-$: $R^N$ represents a binding site, a hydrogen atom, an alkyl group having 1 to 6 carbon atoms, or an aryl group having 6 to 10 carbon atoms), or a linking group including a combination of two or more (preferably 2 to 10) thereof. In particular, an alkylene group, an ether group, a sulfide group, a carbonyl group, or a linking group including a combination of two or more (preferably 2 to 5) thereof is preferable, and an ether group is more preferable. $R^{1B}$ represents a hydrogen atom or a substituent and preferably a hydrogen atom. The substituent which can be used as $R^{1B}$ is not particularly limited, and examples thereof include the respective substituents which can be used as R.

In Formula 1A and Formula 1B, groups represented by the same reference numeral may be the same as or different from each other.

In addition to the above-described linking groups, as the linking group $R^1$, for exaample, a linking group in Formula 1B in which one or two or more groups represented by Formula 1a are substituted with each of the substituents which can be used as $R^f$, in particular, hydroxymethyl is also a preferable aspect.

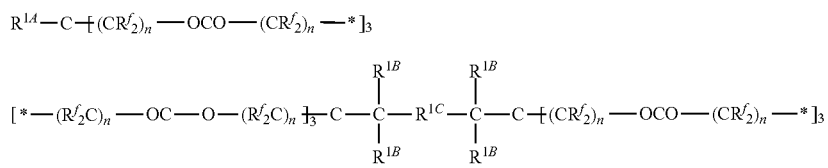

Formula (1A)

Formula (1B)

In both the formulae, $R^f$ and n have the same definitions and the same preferable ranges as those of $R^f$ and n in Formula 1a. * represents a binding site to a sulfur atom in (Formula 1).

In Formula 1A, $R^{1A}$ represents a hydrogen atom or a substituent. The substituent which can be used as $R^{1A}$ is not particularly limited, and examples thereof include the respective substituents which can be used as $R^f$ and the group represented by Formula 1a. In particular, an alkyl group or the group represented by Formula 1a is preferable. The number of carbon atoms in the alkyl group is preferably 1 to 12, more preferably 1 to 6, and still more preferably 1 to 3. The substituent which can be used as $R^{1A}$ may have one or two or more substituents, and the substituent which may be further included is not particularly limited, and examples thereof include the respective substituents which can be used as $R^f$. In particular, a hydroxyl group is preferable. Examples of the substituent which may further have one or two or more substituents include a hydroxyalkyl group (the number of carbon atoms is as described above). Specifically, hydroxymethyl is preferable.

In Formula 1B, $R^{1C}$ represents a linking group. The linking group that can be used as $R^{1C}$ is not particularly limited and is preferably an alkylene group having 1 to 30 carbon atoms, a cycloalkylene group having 3 to 12 carbon atoms, an arylene group having 6 to 24 carbon atoms, a heteroarylene group having 3 to 12 carbon atoms, an ether group ($-O-$), a sulfide group ($-S-$), a phosphinidene group ($-PR-$: R represents a hydrogen atom or an alkyl group having 1 to 6 carbon atoms), a silylene group As the linking group $R^1$, a linking group represented by any one of the following Formulae 1C to 1H is also preferable. In each of the formulae, * represents a binding site to S in Formula 1.

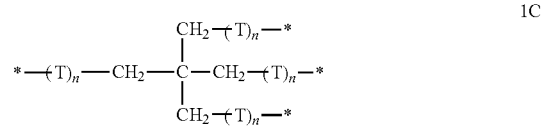

1C

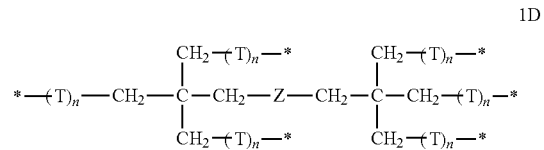

1D

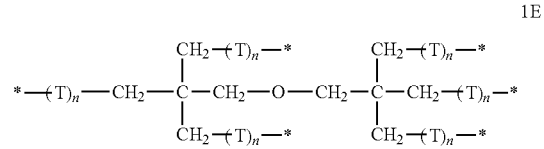

1E (1F)

(1G)

(1H)

In Formulae 1C to 1H, T represents a linking group and preferably a group represented by any one of the following Formulae (T1) to (T6) or a linking group including a combination of two or more (preferably two or three). Examples of the linking group including a combination include a linking group (—OCO-alkylene group) including a combination of the linking group represented by Formula (T6) and the linking group represented by Formula (T1). In the group represented by any one of Formulae (T1) to (T6), a sulfur atom in (Formula 1) may be bound to any binding site. However, in a case where T represents an oxyalkylene group (the group represented by any one of Formulae (T2) to (T5)) or an —OCO-alkylene group, it is preferable that a sulfur atom in (Formula 1) is bound to a carbon atom (binding site) at a terminal.

A plurality of T's present in each of the formulae may be the same as or different from each other.

Z represents a linking group and is preferably a group represented by the following Formula (Z1) or (Z2).

$-\!\!\left(\!\!\begin{array}{c}H_2\\C\end{array}\!\!\right)_{\!\!m}\!\!-$ (T1)

—OCH$_2$— (T2)

—OCH$_2$CH$_2$— (T3)

—OCH$_2$CH$_2$CH$_2$— (T4)

—OCH$_2$CH$_2$CH$_2$CH$_2$— (T5)

—OCO— (T6)

$-\!\!O\!\!-\!\!\underset{\underset{O}{\parallel}}{C}\!\!-\!\!\underset{H}{N}\!\!-\!\!(CH_2)_{\overline{m}}\!\!-\!\!\underset{H}{N}\!\!-\!\!\underset{\underset{O}{\parallel}}{C}\!\!-\!\!O\!\!-$ (Z1)

(Z2)

In each of Formula 1C to 1H, n represents an integer, preferably an integer of 0 to 14, more preferably an integer of 0 to 5, and still more preferably an integer of 0 to 3.

In each of Formula (T1) and Formula (Z1), m represents an integer of 1 to 8, more preferably an integer of 1 to 5, and still more preferably an integer of 1 to 3.

$Z^3$ represents a linking group, preferably an alkylene group having 1 to 12 carbon atoms, and more preferably an alkylene group having 1 to 6 carbon atoms. In particular, a 2,2-propanediyl group is still more preferable.

Hereinafter, specific examples of the linking group $R^1$ will be shown, but the present invention is not limited thereto. In each of the specific examples, * represents a binding site to a sulfur atom in (Formula 1).

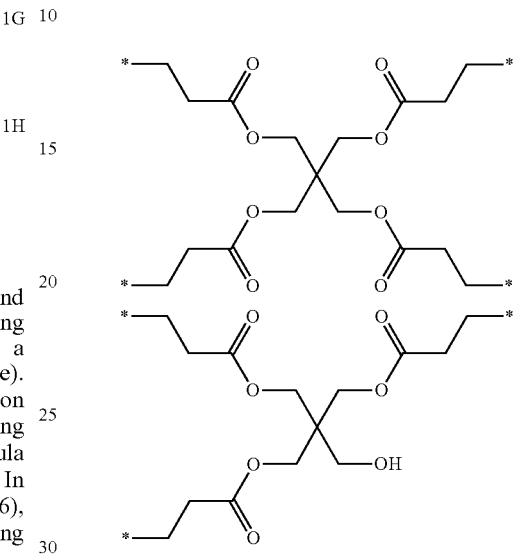

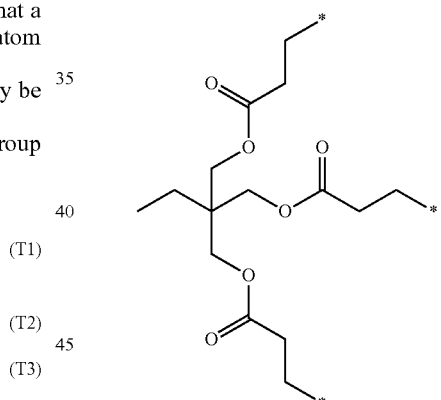

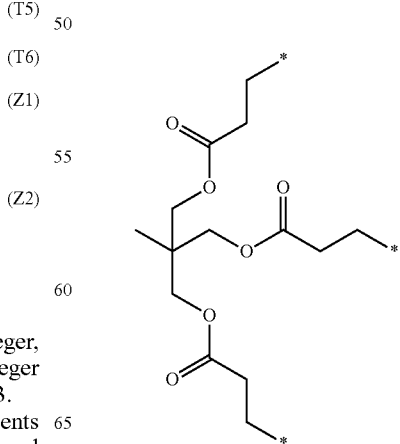

-continued

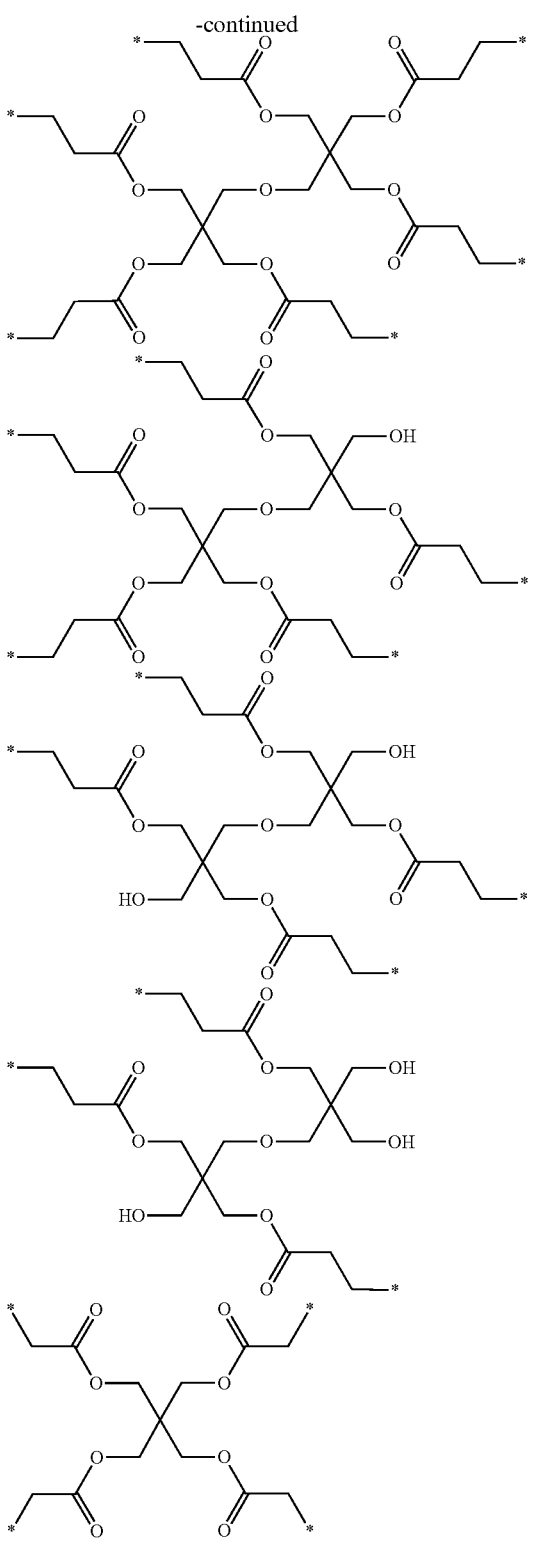

In (Formula 1), $R^2$, $R^3$, and $R^4$ each independently represent a single bond or a linking group. $R^2$ and $R^3$ represent preferably a single bond, and $R^4$ represents preferably a linking group.

The linking group that can be used as each of $R^2$, $R^3$, and $R^4$ is not particularly limited, and it is preferable that the linking group is not a linking group consisting of an oligomer or a polymer including two or more repeating units.

Examples of the linking group include the linking groups which can be used as $R^{1C}$ in Formula 1B.

However, as $—R^4\text{-}(A^1)p$ in the formula, a polymer chain can be used. For example, a polymer chain including a p number of A's described below can also be used as at least one component consisting of a polymerizable compound forming the polymer chain $P^1$ described below and preferably as each of the components. More specifically, for example, a poly(meth)acrylic chain including binder particles D-23 to D-27 synthesized in Examples can be used.

In (Formula 1), the polymer chain $P^1$ represents a polymer chain including 50 mass % or higher of a component having a SP value of 19.5 or higher. It is preferable that this component is incorporated into a main chain. In a case where the polymer chain $P^1$ is introduced into the resin in the binder particles, a function of improving a cohesive force of the resin required to form the binder particles is exhibited. As long as the polymer chain $P^1$ includes 50 mass % or higher of the component having a SP value of 19.5 or higher, the polymer chain $P^1$ may include one or two or more components having a SP value of 19.5 or higher. It is preferable that the polymer chain $P^1$ includes a component derived from the macromonomer. The macromonomer is not particularly limited, and examples thereof include the macromonomer forming the polymer chain $P^2$ described below.

The polymer chain $P^1$ is not particularly limited as long as it is a polymer chain that reacts with a sulfur atom or the linking group $R^2$ in (Formula 1) to be introduced into the resin represented by (Formula 1), and a chain consisting of a typical polymer can be used. Examples of the polymer chain include a chain consisting of a polymer of a polymerizable compound including one or two or more (preferably 1 to 4) ethylenically unsaturated bonds (addition polymerizable unsaturated bonds) at a terminal or a side chain of the molecular structure. Examples of the ethylenically unsaturated bond include a vinyl group and a (meth)acryloyl group. Preferable examples of the polymerizable compound forming the polymer chain $P^1$ include a styrene compound, a vinylnaphthalene compound, a vinylcarbazole compound, a (meth)acrylic acid compound, a (meth)acrylic acid ester compound (preferably an alkyl ester compound or an aryl ester compound), a (meth)acrylamide compound, a (meth)acrylonitrile compound, an allyl compound, a vinyl ether compound, a vinyl ester compound, and a dialkyl itaconate compound.

Among the components derived from the polymerizable compounds, it is preferable that, the polymer chain $P^1$ includes a component derived from a polymerizable compound selected from a (meth)acrylic acid compound, a (meth)acrylic acid ester compound, a (meth)acrylamide compound, or a (meth)acrylonitrile compound, (the polymer chain $P^1$ is a polymer chain consisting of a (meth)acrylic polymer), and it is more preferable that the polymer chain $P^1$ includes a component derived from a polymerizable compound selected from a (meth)acrylic acid compound, a (meth)acrylic acid ester compound, or a (meth)acrylonitrile compound.

The component having a SP value of 19.5 or higher in the polymer chain $P^1$ may be any component as long as it has a SP value of 19.5 or higher, and is preferably a component that is not derived from the macromonomer. As this component, a component derived from a polymerizable compound having a low molecular weight is preferable, a component derived from a polymerizable compound having a low molecular weight that has an ethylenically unsaturated bond is more preferable, and a component having a SP value of 19.5 or higher among the components derived from the polymerizable compounds is still more preferable. The molecular weight of the polymerizable compound having a low molecular weight is not uniquely determined and is, for example, preferably lower than 1000 and more preferably lower than 500.

In a case where the polymer chain $P^1$ includes a component having a SP value of 19.5 or higher, a dispersion liquid of the binder particles in which resin particles are dispersed in the synthesis process of the resin in a hydrophobic solvent (for example, preferably the dispersion medium described below) can be prepared, and further binding properties between solid particles or battery performance is excellent. The SP value of the component is preferably 20.0 or higher and more preferably 21.0 or higher. On the other hand, the upper limit is not particularly limited and is appropriately set. For example, the upper limit is preferably 45.0 or lower and more preferably 30.0 or lower.

Examples of a method of setting the SP value of the component to be 19.5 or higher include a method of introducing a functional group having high polarity, for example, a method of introducing a substituent such as a hydroxyl group.

In the present invention, a value calculated using the Okitsu method is used as the SP value of the component. The Okitsu method is specifically described in, for example, "Journal of the Adhesion Society of Japan", 1993, vol. 29, No. 6, pp. 249 to 259. As the SP value of a component in the present application, a value calculated based on a structure of the component incorporated into the polymer is used.

In addition, in a case where the component has an acidic group, and this acidic group is neutralized to disperse the binder particles in the solid electrolyte composition, the SP value of the component before neutralization is used.

In addition, the unit of the SP value is not shown but is $MPa^{1/2}$.

The compound forming the component having a SP value of 19.5 or higher is not particularly limited, and examples thereof include respective compounds such as (meth)acrylic acid, a (meth)acrylic acid ester, a hydroxyl alkyl (meth)acrylate, (meth)acrylic acid (polyoxyalkylene ester), N-mono or di(alkyl) (meth)acrylic acid amide, N-(hydroxyalkyl) (meth)acrylic acid amide, or α,β-unsaturated nitrile. Further, for example, a compound forming a component represented by (Formula 4) or (Formula 5) described below or a compound described in Examples described below can also be used.

In addition to the components described below in Examples, specific examples of the component having a SP value of 19.5 or higher include components derived from tetrahydrofurfuryl (meth)acrylate, 2-acrylamido-2-methylpropanesulfonic acid, diacetone acrylamide, 2-(meth)acryloyloxyethyl acid phosphate, N-(meth)acryloyloxyethyl-N,N-dimethylammonium-α-N-methylcarboxybetaine, and the like and components derived from compounds described as examples of a component having a SP value of 20 or higher regarding a polymer chain $P^3$ described below.

The polymer chain $P^1$ may include components other than the component having a SP value of 19.5 or higher, for example, a component having a SP value of lower than 19.5. As this component, a component derived from the macromonomer may be used, but a component derived from a polymerizable compound having a low molecular weight is preferable, a component derived from a polymerizable compound having a low molecular weight that has an ethylenically unsaturated bond is more preferable, and a component having a SP value of lower than 19.5 among the components derived from the polymerizable compounds is still more preferable. The molecular weight of the polymerizable compound having a low molecular weight is not uniquely determined and is, for example, preferably lower than 500 and more preferably lower than 300.

The SP value of the component having a SP value of lower than 19.5 only has to be lower than 19.5, and the lower limit thereof is appropriately set without any particular limitation. For example, the lower limit is preferably 15.0 or higher and more preferably 17.0 or higher.

The component having a SP value of lower than 19.5 is not particularly limited as long as it is a component derived from a polymerizable compound that is copolymerizable with the polymerizable compound as the component having a SP value of 19.5 or higher. For example, a component derived from a polymerizable compound having a low molecular weight that has an ethylenically unsaturated bond can be used, and specific examples thereof include components derived from an acrylic acid compound, a (meth)acrylic acid ester compound, a cyclic olefin compound, a diene compound, a styrene compound, a vinyl ether compound, a carboxylic acid vinyl ester compound, an unsaturated carboxylic anhydride, and the like. Examples of the copolymerizable compound include other macromonomer components described below and components having a SP value of lower than 19.5 among components derived from "vinyl monomer" described in paragraphs "0031" to "0035" of JP2015-088486A and "acrylic monomer" described in paragraphs "0036" to "0042" of JP2015-088486A.

The polymerization degree of all the components in the polymer chain $P^1$ is not particularly limited and is preferably 10 to 10000 and more preferably 20 to 2000.

The content of the component having a SP value of 19.5 or higher in the polymer chain $P^1$ is 50 mass % or higher. In a case where the polymer chain $P^1$ includes 50 mass % or higher of the component, the content of the resin represented by (Formula 1) in the binder particles is high, and binding properties between solid particles can be improved. From the viewpoint of binding properties between solid particles, the content is preferably 60 mass % or higher, more preferably 75 mass % or higher, and still more preferably 90 mass % or higher. The upper limit value of the content is not particularly limited and may be 100 mass % or may be lower than 100 mass %.

The content of the component having a SP value of lower than 19.5 in the polymer chain $P^1$ is 50 mass % or lower. It is preferable that the content of the component is set such that the total content of the component having a SP value of lower than 19.5 and the component having a SP value of 19.5 or higher is 100 mass %.

In (Formula 1), $P^2$ represents a polymer chain (polymer skeleton) including a component derived from a macromonomer having a number-average molecular weight of 500 or higher.

In the present invention, the polymer chain including a component derived from the macromonomer includes not only a chain consisting of a polymer to which a plurality of components derived from the macromonomer are bound but also a chain consisting of one component derived from the macromonomer. In a case where the polymer chain $P^2$ is introduced into the resin in the binder particles, high-purity binder particles having a predetermined average particle size can be synthesized in the synthesis process of the resin, and a function of improving binding properties between solid particles and dispersibility of solid particles can be exhibited. $P^2$ is not particularly limited as long as it is a polymer chain that reacts with a sulfur atom or a linking group $R^3$ in (Formula 1) to be introduced into the resin represented by (Formula 1), and a chain consisting of a typical polymer or a typical macromonomer can be used. Examples of the polymer chain include a chain consisting of a polymerizable compound (including at least the macromonomer) having an ethylenically unsaturated bond at a terminal or a side chain of the molecular structure and a polymer of the polymerizable compound. As the polymerizable compound forming the polymer chain $P^2$, the compound described as the polymerizable compound forming the polymer chain $P^1$ is preferable, and a methacrylic acid compound or a (meth) acrylic acid ester compound is more preferable (the polymer chain $P^2$ is a polymer chain consisting of a (meth)acrylic acid ester compound or a (meth)acrylic polymer).

The number-average molecular weight of the macromonomer only has to be 500 or higher, and from the viewpoint of binding properties between solid particles and dispersibility of solid particles, is preferably 1,000 or higher, more preferably 2,000 or higher, and still more preferably 3,000 or higher. The upper limit is not particularly limited and is preferably 500,000 or lower, more preferably 100,000 or lower, and still more preferably 30,000 or lower.

-Measurement of Molecular Weight-

In the present invention, as a number-average molecular weight of the macromonomer, a number-average molecular weight in terms of standard polystyrene is measured by gel permeation chromatography (GPC). Regarding a measurement method, basically, a value measured using a method under the following condition 1 or condition 2 (preferred) is used. In this case, an appropriate eluent may be selected and used depending on the kind of the macromonomer.

(Condition 1)
  Column: a column in which two TOSOH TSKgel Super AWM-H's are linked
  Carrier: 10 mM LiBr/N-methylpyrrolidone
  Measurement temperature: 40° C.
  Carrier flow rate: 1.0 ml/min
  Sample concentration: 0.1 mass %
  Detector: refractive index (RI) detector (Condition 2)
  Column: a column in which TOSOH TSK gel Super HZM-H, TOSOH TSK gel Super HZ4000, and TOSOH TSK gel Super HZ2000 are linked to each other
  Carrier: tetrahydrofuran
  Measurement temperature: 40° C.
  Carrier flow rate: 1.0 ml/min
  Sample concentration: 0.1 mass %
  Detector: refractive index (RI) detector The macromonomer is preferably a compound having an ethylenically unsaturated bond at a terminal or a side chain of the molecular structure, and examples thereof include a compound having a number-average molecular weight of 500 or higher among the respective compounds described as the polymerizable compound forming the polymer chain $P^1$. The number of ethylenically unsaturated bonds in one molecule of the macromonomer is as described above and is preferably one.

It is preferable that the macromonomer forming the component in the polymer chain $P^2$ is preferably a monomer represented by the following (Formula 3). That is, it is preferable that the component in the polymer chain $P^2$ is a component obtained by cleavage (polymerization) of an ethylenically unsaturated bond in the monomer represented by the following (Formula 3).

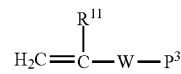

Formula (3)

In (Formula 3), $R^{11}$ represents a hydrogen atom or an alkyl group having 1 to 8 carbon atoms. The number of carbon atoms in the alkyl group is preferably 1 to 3 and more preferably 1. It is preferable that $R^{11}$ represents a hydrogen atom or methyl.

In (Formula 3), W represents a single bond or a linking group and preferably a linking group.

The linking group that can be used as W is not particularly limited and is preferably an alkylene group having 1 to 30 carbon atoms, a cycloalkylene group having 3 to 12 carbon atoms, an arylene group having 6 to 24 carbon atoms, a heteroarylene group having 3 to 12 carbon atoms, an ether group (—O—), a sulfide group (—S—), a phosphinidene group (—PR—: R represents a hydrogen atom or an alkyl group having 1 to 6 carbon atoms), a silylene group (—SiR$^{S1}$R$^{S2}$—: R$^{S1}$ and R$^{S2}$ represent a hydrogen atom or an alkyl group having 1 to 6 carbon atoms), a carbonyl group, an imino group (—NR$^{N}$—: R$^{N}$ represents a hydrogen atom, an alkyl group having 1 to 6 carbon atoms, or an aryl group having 6 to 10 carbon atoms), or a linking group including a combination of two or more (preferably 2 to 10) thereof. In particular, an alkylene group having 1 to 30 carbon atoms, an arylene group having 6 to 24 carbon atoms, an ether group, a carbonyl group, a sulfide group, or a linking group including a combination of two or more (preferably 2 to 10) thereof is more preferable.

In (Formula 3), $P^3$ represents a polymer chain, and a linking site to W is not particularly limited and may be a terminal or a side chain of the polymer chain. The polymer chain which can be used as $P^3$ is not particularly limited, and a polymer chain consisting of a typical polymer can be used. Examples of the polymer chain include a chain consisting of a (meth)acrylic polymer, polyether, polysiloxane, or polyester and a chain including a combination of two (preferably two or three) of the above-described chains. In particular, a chain including a (meth)acrylic polymer is preferable, and a chain consisting of a (meth)acrylic polymer is more preferable. In the chain including a combination, the combination of chains is not particularly limited and is appropriately determined.

The chain consisting of a (meth)acrylic polymer, polyether, polysiloxane, or polyester is not particularly limited as long as it is a chain consisting of a typical (meth) acrylic resin, a typical polyether resin, typical polysiloxane, or a typical polyester resin.

For example, as the (meth)acrylic polymer, a polymer including a component derived from a polymerizable compound selected from a (meth)acrylic acid compound, a (meth)acrylic acid ester compound (including a (meth) acrylic acid hydroxyalkyl ester compound), a (meth)acrylamide compound, or a (meth)acrylonitrile compound is preferable, and a polymer including a component derived from a polymerizable compound selected from a (meth) acrylic acid compound, a (meth)acrylic acid ester compound, or a (meth)acrylonitrile compound is more preferable. In particular, among the (meth)acrylic acid ester compounds, a polymer including a component derived from a long-chain alkyl ester compound of (meth)acrylic acid is preferable. For example, the number of carbon atoms in the long-chain alkyl group is preferably 4 or more, more preferably 4 to 24, and still more preferably 8 to 20.

The (meth)acrylic polymer may include a component derived from the polymerizable compound having an ethylenically unsaturated bond, for example, a styrene compound or a cyclic olefin compound.

It is preferable that the chain represented by $P^3$ in (Formula 3) consisting of a (meth)acrylic polymer includes a component derived from a polymerizable compound having a SP value of 20.0 or higher. It is more preferable that the chain represented by $P^3$ includes a component derived from a long-chain alkyl ester compound of (meth)acrylic acid (preferably a component derived from a (meth)acrylic acid ester compound that has an alkyl group having 4 or more carbon atoms) and a component derived from a polymerizable compound having a SP value of 20.0 or higher.

Examples of the component derived from a polymerizable compound having a SP value of 20.0 or higher include the component described above regarding the polymer chain $P^1$, a component represented by the following (Formula 4), a component represented by the following (Formula 5), and a component derived from a (meth)acrylic acid hydroxyalkyl ester compound. In particular, it is preferable that the chain represented by $P^3$ includes a component represented by the following (Formula 4), a component represented by the following (Formula 5), or a component derived from a (meth)acrylic acid hydroxyalkyl ester compound. The number of components derived from a polymerizable compound having a SP value of 20.0 or higher in the chain consisting of a (meth)acrylic polymer is preferably at least one, more preferably 1 to 3, and still more preferably 1. The number of carbon atoms in the hydroxyalkyl group of the (meth)acrylic acid hydroxyalkyl ester compound is preferably 1 to 10, more preferably 1 to 5, and still more preferably 1 to 3.

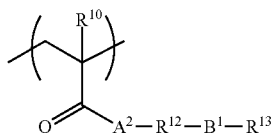

Formula (4)

In (Formula 4), $R^{10}$ represents a hydrogen atom or methyl and preferably methyl.

$A^2$ represents —O— or —$NR^A$—, and $R^A$ represents a hydrogen atom or an alkyl group (preferably having 1 to 6 carbon atoms).

$R^{12}$ represents a single bond or a linking group and preferably a linking group. The linking group that can be used as $R^{17}$ is not particularly limited and is preferably an alkylene group having preferably 1 to 30 carbon atoms (preferably 1 to 10 carbon atoms, more preferably 1 to 5 carbon atoms, and still more preferably 1 to 3 carbon atoms), a cycloalkylene group having 3 to 12 carbon atoms, an arylene group having 6 to 24 carbon atoms (preferably a phenylene group), a heteroarylene group having 3 to 12 carbon atoms, an ether group (—O—), a sulfide group (—S—), a phosphinidene group (—PR—: R represents a hydrogen atom or an alkyl group having 1 to 6 carbon atoms), a silylene group (—$SiR^{S1}R^{S2}$—: $R^{S1}$ and $R^{S2}$ represent a hydrogen atom or an alkyl group having 1 to 6 carbon atoms), a carbonyl group, an imino group (—$NR^N$—: $R^N$ represents a hydrogen atom, an alkyl group having 1 to 10 carbon atoms, or an aryl group having 6 to 10 carbon atoms), or a linking group including a combination of two or more (preferably 2 to 10) thereof. In particular, an alkylene group, an arylene group, an ether group, a carbonyl group, a sulfide group, or a linking group including a combination of two or more (preferably 2 to 10) thereof is more preferable, and an alkylene group or an arylene group is still more preferable.

In a case where an ether group, a sulfide group, an imino group (—$NR^N$—), or a carbonyl group which can be used as $R^{12}$ can correspond to the following $B^1$, the group is considered $B^1$ in the present invention.

$B^1$ represents a single bond or a linking group including —$CONR^C$— or —$SO_2NR^C$— as a partial structure. In the present invention, the linking group including —$CONR^C$— or —$SO_2NR^C$— includes a linking group consisting of —$CONR^C$— or —$SO_2NR^C$— and a linking group consisting of —$CONR^C$— or —$SO_2NR^C$— and another partial structure (group). The other partial structure is not particularly limited, and examples thereof include linking groups which can be used as $R^{12}$. In particular, an ether group, a sulfide group, an imino group (—$NR^C$—), or a carbonyl group is preferable. As the linking group, a linking group selected from —$CONR^C$—, —$SO_2NR^C$—, —$OCONR^C$—, —$NR^CCONR^C$—, or —$SO_2NR^CCO$— is preferable. $R^C$ represents a hydrogen atom or an alkyl group (having preferably 1 to 10 carbon atoms, more preferably 1 to 5 carbon atoms, still more preferably 1 to 3 carbon atoms, and still more preferably methyl or ethyl). It is preferable that $R^C$ represents a hydrogen atom.

A direction in which —$CONR^C$—, —$SO_2NR^C$—, —$SO_2NR^CCO$—, or —$OCONR^C$—, described above is incorporated into $B^1$ is not particularly limited. For example, in —$CONR^C$— in $B^1$, a carbon atom may be positioned on the $R^{12}$ side, or a nitrogen atom may be positioned on the $R^{12}$ side. In addition, in —$SO_2NR^C$—, a sulfur atom may be positioned on the $R^{12}$ side, or a nitrogen atom may be positioned on the $R^{12}$ side. Further, in —$SO_2NR^CCO$—, a sulfur atom may be positioned on the $R^{12}$ side, or a carbon atom may be positioned on the $R^{12}$ side. In —$OCONR^C$—, an oxygen atom may be positioned on the $R^{12}$ side (—$OCONR^C$— group), or a nitrogen atom may be positioned on the $R^{12}$ side (—$NR^CCOO$— group).

In the present invention, it is preferable that both $R^{12}$ and $B^1$ do not represent a single bond.

$R^{13}$ represents a hydrogen atom, an alkyl group having 1 to 20 carbon atoms (preferably 2 to 8 carbon atoms and more preferably 4 to 7 carbon atoms), an aralkyl group (preferably benzyl), an aromatic group (including an aryl group or a heteroaryl group; preferably phenyl, tolyl, xylyl, mesityl, or pyridyl), an aryloxy group (preferably phenoxy), or an aralkyloxy group (preferably benzyloxy).

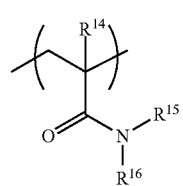

Formula (5)

In (Formula 5), $R^{14}$ represents a hydrogen atom or methyl and preferably a hydrogen atom.

$R^{15}$ and $R^{16}$ represent a hydrogen atom or an alkyl group. This alkyl group may be linear or branched. In addition, the number of carbon atom in the alkyl group is preferably 1 to 10, more preferably 1 to 6, and still more preferably 1 to 4, and isopropyl, ethyl, or methyl is still more preferable. An alkyl group which may be used as $R^{15}$ and $R^{16}$ may have a substituent. Examples of the substituent include the respective substituents which can be used as $R^f$. In particular, a hydroxyl group or a carboxyl group is preferable from the viewpoint of a SP value. However, the alkyl group which can be used as $R^{15}$ and $R^{16}$ does not have a group corresponding to "—$B^1$—$R^{13}$" in (Formula 4) as the substituent.

Hereinafter, specific preferable examples of the polymerizable compound having a SP value of 20.0 or higher will be shown, but the present invention is not limited thereto. In the following specific examples, Bu represents butyl, Ph represents phenyl, and Bn represents benzyl.

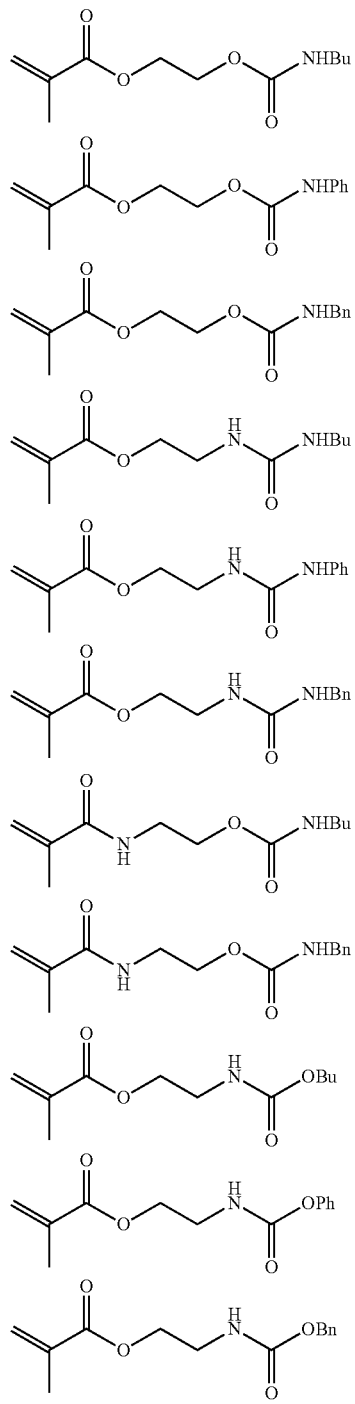

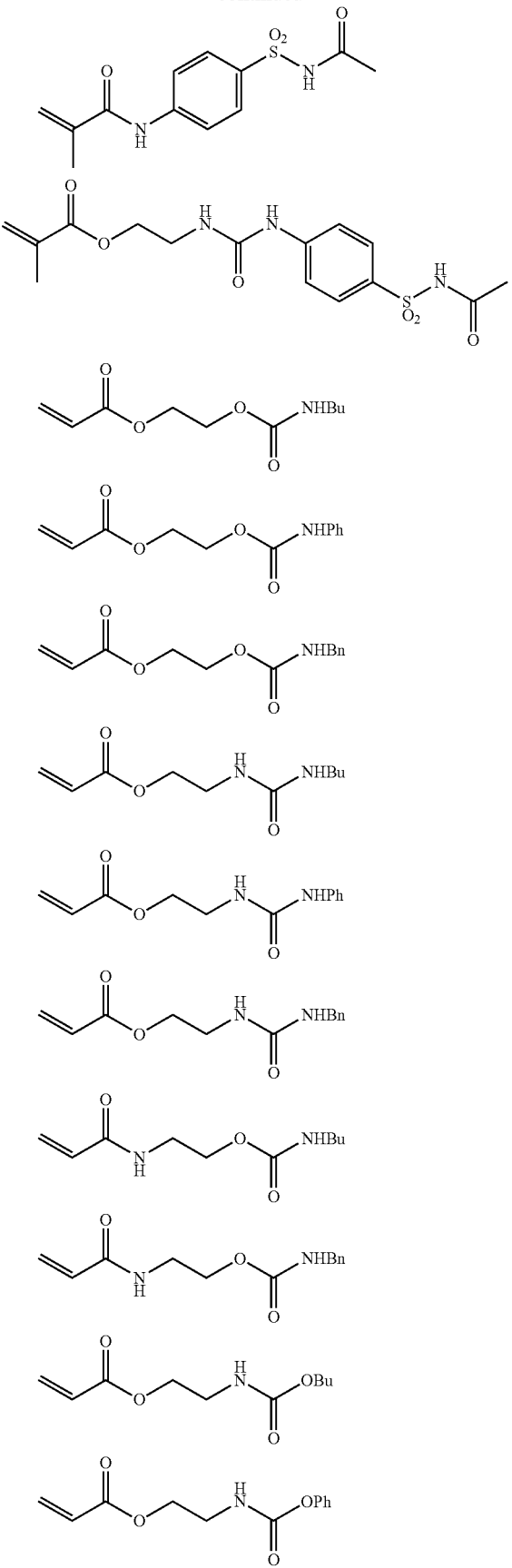

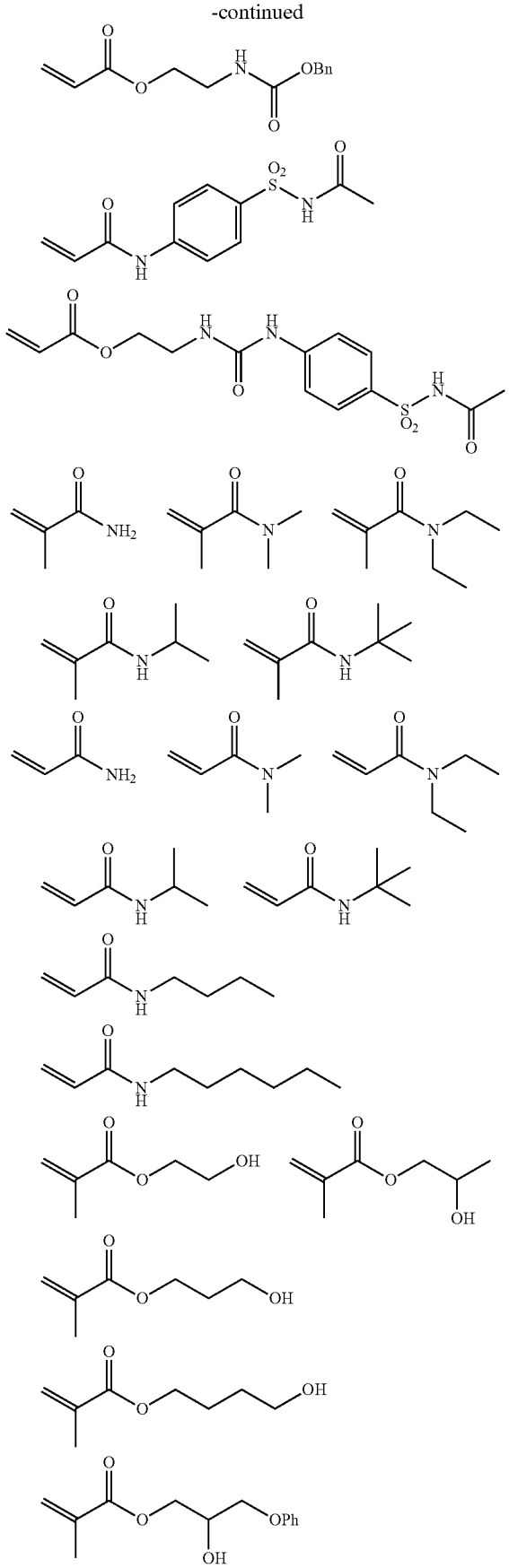

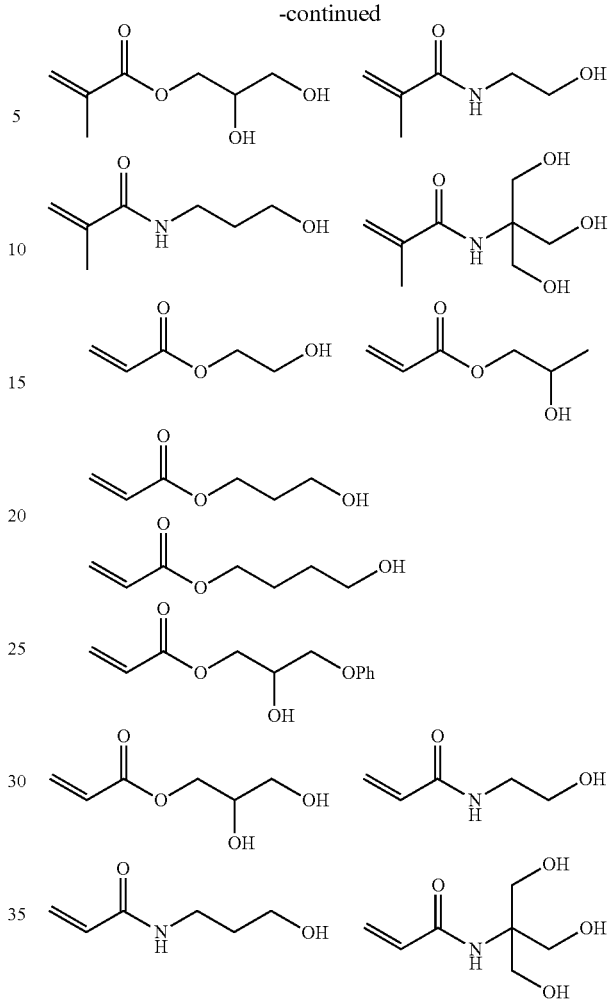

The total content of the components derived from the polymerizable compound having a SP value of 20.0 or higher in the chain represented by P³ consisting of a (meth)acrylic polymer is not particularly limited, is appropriately set in a range of 0% to 100 mass %, and is, for example, preferably 1% to 60 mass %, more preferably 3% to 40 mass %, and still more preferably 5% to 30 mass %.

In the chain represented by P³ consisting of a (meth)acrylic polymer, the content of each of the component represented by Formula (4), the component represented by Formula (5), and the component derived from a (meth)acrylic acid hydroxyalkyl ester compound among components derived from a polymerizable compound having a SP value of 20.0 or higher is not particularly limited and is, for example, preferably 1% to 40 mass %, more preferably 2% to 30 mass %, and still more preferably 4% to 25 mass %.

Typically, the resin forming the (meth)acrylic polymer represented by P³ in (Formula 3) includes a component (hereinafter, simply referred to as "other macromonomer component") other than the component derived from a polymerizable compound having a SP value of 20.0 or higher. In this case, the other macromonomer component is not particularly limited, and examples thereof include a component derived from the polymerizable compound forming the polymer chain P¹. A component derived from a (meth)acrylic acid ester other than the component derived from the polymerizable compound having a SP value of 20.0 or higher is preferable.

Specific examples of the other macromonomer component include: an alkyl (meth)acrylate having 1 to 20 carbon atoms; an aromatic ring-containing (meth)acrylate such as phenoxyethyl (meth)acrylate; a styrene such as styrene, α-methylstyrene, or chlorostyrene; and a (meth)acrylic acid ester compound having an alicyclic structure such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, cyclodecyl (meth)acrylate, isobornyl (meth)acrylate, norbornyl (meth)acrylate, adamantyl (meth)acrylate, dicyclopentanyl (meth)acrylate, or dicyclopentenyloxyethyl (meth)acrylate. As each of the (meth)acrylates, one kind may be used alone, or a mixture of two or more kinds may be used. In particular, an alkyl (meth)acrylate having 1 to 20 carbon atoms or a (meth)acrylic acid ester compound having an alicyclic structure is preferable. Among the alkyl (meth)acrylate having 1 to 20 carbon atoms, methyl (meth)acrylate, ethyl (meth)acrylate, t-butyl (meth)acrylate, lauryl (meth)acrylate, or dodecyl (meth)acrylate is more preferable. Among the (meth)acrylic acid ester compounds having an alicyclic structure, cyclohexyl (meth)acrylate, isobornyl (meth)acrylate, or dicyclopentanyl (meth)acrylate is more preferable.

Examples of the polyether which can be used as the polymer chain $P^3$ include polyalkylene ether and polyarylene ether. The number of carbon atoms in the alkylene group of the polyalkylene ether is preferably 1 to 10, more preferably 2 to 6, and still more preferably 2 to 4. The number of carbon atoms in the arylene group of the polyarylene ether is preferably 6 to 22 and more preferably 6 to 10. The alkylene groups and the arylene groups in the polyether chain may be the same as or different from each other. The terminal in the polyether chain is a hydrogen atom or a substituent, and examples of the substituent include an alkyl group (preferably having 1 to 20 carbon atoms).

Examples of the polysiloxane which can be used as the polymer chain $P^3$ include a chain including a repeating unit represented by $-O-Si(R^S_2)-$. In the repeating unit, $R^S$ represents a hydrogen atom or a substituent, the substituent is not particularly limited, and examples thereof include a hydroxyl group, an alkyl group (having preferably 1 to 12 carbon atoms, more preferably 1 to 6 carbon atoms, and still more preferably 1 to 3 carbon atoms), an alkenyl group (having preferably 2 to 12 carbon atoms, more preferably 2 to 6 carbon atoms, and still more preferably 2 or 3 carbon atoms), an alkoxy group (having preferably 1 to 24 carbon atoms, more preferably 1 to 12 carbon atoms, still more preferably 1 to 6 carbon atoms, and still more preferably 1 to 3 carbon atoms), an aryl group (having preferably 6 to 22 carbon atoms, more preferably 6 to 14 carbon atoms, and still more preferably 6 to 10 carbon atoms), and an aryloxy group (having preferably 6 to 22 carbon atoms, more preferably 6 to 14 carbon atoms, and still more preferably 6 to 10 carbon atoms), and an aralkyl group (having preferably 7 to 23 carbon atoms, more preferably 7 to 15 carbon atoms, and still more preferably 7 to 11 carbon atoms). In particular, an alkyl group having 1 to 3 carbon atoms, an alkoxy group having 1 to 12 carbon atom, a phenyl group is more preferable, and an alkyl group having 1 to 3 carbon atoms is still more preferable. A group positioned at the terminal of the polysiloxane is not particularly limited, and examples thereof include an alkyl group (having preferably 1 to 20 carbon atoms, more preferably 1 to 6 carbon atoms, and still more preferably 1 to 3 carbon atoms), an alkoxy group (having preferably 1 to 20 carbon atoms, more preferably 1 to 6 carbon atoms, and still more preferably 1 to 3 carbon atoms), an aryl group (preferably having 6 to 26 carbon atoms and more preferably having 6 to 10 carbon atoms), and a heterocyclic group (preferably having at least one of an oxygen atom, a sulfur atom, or a nitrogen atom; a heterocyclic group having 2 to 20 carbon atoms preferably a 5-membered ring or a 6-membered ring). The polysiloxane may be linear or branched.

The polyester which can be used as the polymer chain $P^3$ is not particularly limited as long as it consists of a polycondensate of a polycarboxylic acid and a polyhydric alcohol. As the polycarboxylic acid and the polyhydric alcohol, for example, a typically used polycarboxylic acid and a typically used polyhydric alcohol can be used, and examples thereof include an aliphatic or aromatic polycarboxylic acid and an aliphatic or aromatic polyhydric alcohol. The valence of the polycarboxylic acid and the polyhydric alcohol only has to be 2 or more and is typically 2 to 4.

As the macromonomer forming the component in the polymer chain $P^2$, a polymer chain selected from the group consisting of a (meth)acrylic polymer, polyether, polysiloxane, polyester, and a combination thereof or a monomer having an ethylenically unsaturated bond bound to the polymer chain is more preferable. The polymer chain in the macromonomer has the same definition and the same preferable range as those of the polymer chain which can be preferably used as the polymer chain $P^3$ in (Formula 3). In addition, the ethylenically unsaturated bond has the same definition as the ethylenically unsaturated bond in the polymerizable compound forming the polymer chain $P^1$, and a (meth)acryloyl group is preferable. The polymer chain and the ethylenically unsaturated bond may be bound to each other directly (without a linking group) or through a linking group. In this case, examples of the linking group include the linking group which can be used as W in (Formula 3).

The SP value of the macromonomer is not particularly limited and is, for example, preferably 21 or lower and more preferably 20 or lower. The lower limit value is practically 15 or more.

The polymerization degree of the polymer chain (corresponding to the polymer chain $P^3$ in (Formula 3)) in the macromonomer of the polymer chain $P^2$ is not particularly limited as long as the number-average molecular weight of the macromonomer is 500, and is preferably 5 to 5000 and more preferably 10 to 300.

In addition to the component derived from the macromonomer, the polymer chain $P^2$ may include another component (referred to as "other $P^2$ chain component"). The other $P^2$ chain component is not particularly limited, and examples thereof include the respective components forming the polymer chain $P^1$ (other than the macromonomer) and the other macromonomer component.

The polymerization degree of all the components forming the polymer chain $P^2$ is not particularly limited and is preferably 1 to 200 and more preferably 1 to 100.

The content of the component derived from the macromonomer in the polymer chain $P^2$ is not particularly limited as long as it exceeds 0 mass %. In a case where the polymer chain $P^2$ includes the component derived from the macromonomer, the content of the resin represented by (Formula 1) in the binder particles is high, and binding properties between solid particles can be improved. From the viewpoint of binding properties between solid particles, the content of the component is preferably 50 mass % or higher, more preferably 75 mass % or higher, and still more preferably 90 mass % or higher. The upper limit value of the content is not particularly limited and may be 100 mass % or may be lower than 100 mass %. In a case where the upper limit value is set to be lower than 100 mass %, the upper limit value can be set to be, for example, 50 mass % or lower.

In the polymer chain $P^2$, the content of the other $P^2$ chain component other than the component derived from the macromonomer is 0 mass % or higher and is preferably set such that the total content of the other $P^2$ chain component and the component derived from the macromonomer is 100 mass %.

In (Formula 1), $A^1$ represents a hydrogen atom, an acidic group, a group having a basic nitrogen atom, a urea group, a urethane group, an alkoxysilyl group, an epoxy group, an isocyanate group, or a hydroxyl group. In particular, an acidic group, a group having a basic nitrogen atom, a urea group, or a urethane group is preferable.

The acidic group which can be used as $A^1$ is not particularly limited, and examples thereof include a carboxylate group (—COOH), a sulfonate group (sulfo group: —$SO_3H$), a phosphate group (phospho group: —$OPO(OH)_2$), a phosphonate group, and a phosphinate group.

Examples of the group having a basic nitrogen atom which can be used as $A^1$ include an amino group, a pyridyl group, an imino group, and an amidine.

Preferable examples of the urea group which can be used as $A^1$ include —$NR^{15}CONR^{16}R^{17}$ (here, $R^1$, $R^{16}$, and $R^{17}$ each independently represent a hydrogen atom, an alkyl group having 1 to 20 carbon atoms, an aryl group having 6 or more carbon atoms, or an aralkyl group having 7 or more carbon atoms). As the urea group, —$NR^{15}CONHR^{17}$ (here, $R^{15}$ and $R^{17}$ each independently represent a hydrogen atom, an alkyl group having 1 to 10 carbon atoms, an aryl group having 6 or more carbon atoms, or an aralkyl group having 7 or more carbon atoms) is more preferable, and —$NHCONHR^{17}$ (here, $R^{17}$ represents a hydrogen atom, an alkyl group having 1 to 10 carbon atoms, an aryl group having 6 or more carbon atoms, or an aralkyl group having 7 or more carbon atoms) is still more preferable.

Preferable examples of the urethane group which can be used as $A^1$ include a group including at least an imino group and a carbonyl group such as —$NHCOR^{18}$, —$NR^{19}COOR^{20}$, —$OCONHR^{21}$, or —$OCONR^{22}R^{23}$ (here, $R^{18}$, $R^{19}$, $R^{20}$, $R^{21}$, $R^{22}$, and $R^{23}$ represent an alkyl group having 1 to 20 carbon atoms, an aryl group having 6 or more carbon atoms, or an aralkyl group having 7 or more carbon atoms). As the urethane group, —$NHCOOR^{18}$ or —$OCONHR^{21}$ (here, $R^{18}$ and $R^{21}$ represent an alkyl group having 1 to 20 carbon atoms, an aryl group having 6 or more carbon atoms, or an aralkyl group having 7 or more carbon atoms) is more preferable, and —$NHCOOR^{18}$ or —$OCONHR^{21}$ (here, $R^{18}$ and $R^{21}$ represent an alkyl group having 1 to 10 carbon atoms, an aryl group having 6 or more carbon atoms, an aralkyl group having 7 or more carbon atoms is still more preferable.

The alkoxysilyl group which can be used as $A^1$ is not particularly limited and is preferably an alkoxysilyl group having 1 to 6 carbon atoms, and examples thereof include methoxysilyl, ethoxysilyl, t-butoxysilyl, and cyclohexylsilyl.

$A^1$ interacts with the solid particles such that binding properties between solid particles exhibited by the binder particles can be further reinforced. The interaction is not particularly limited, and examples thereof include an interaction by a hydrogen bond, an interaction by an acid-base ionic bond, an interaction by a covalent bond, a π-π interaction by an aromatic ring, and a hydrophobic-hydrophobic interaction. The solid particles and the binder particles adsorb to each other due to one or two or more among the above-described interactions depending on the kind of the group which can be used as $A^1$ and the kind of the above-described solid particles.

In a case where the group which can be used as $A^1$ interacts, the chemical structure of the group which can be used as $A^1$ may or may not change. For example, in the above-described π-π interaction or the like, typically, the group which can be used as $A^1$ maintains the structure thereof without a change. On the other hand, in the interaction by a covalent bond or the like, typically, the functional group is converted into an anion (the group which can be used as $A^1$ changes) by desorption of active hydrogen such as a carboxylate group and is bound to the solid particles.

An acidic group, a hydroxyl group, or an alkoxysilyl group is suitably adsorbed to the positive electrode active material and the inorganic solid electrolyte. Among these, a carboxylate group is more preferable.

A group having a basic nitrogen atom is suitably adsorbed to a conductive auxiliary agent.

In (Formula 1), p represents an integer of 1 to 10, preferably an integer of 1 to 5, more preferably an integer of 1 to 3, and still more preferably 1.

In (Formula 1), l represents an integer of 0 to 5, preferably an integer of 0 to 4, more preferably an integer of 0 to 3, and still more preferably 0 to 2.

m represents an integer of 1 to 8, preferably an integer of 1 to 4, more preferably an integer of 1 to 3, and still more preferably 1 or 2.

n represents an integer of 1 to 9, preferably an integer of 2 to 5, and more preferably an integer of 3 to 5.

l+m+n represents an integer of 3 to 10, preferably an integer of 3 to 8, more preferably an integer of 3 to 6, and still more preferably an integer of 4 to 6.

The polymer chain in the resin represented by (Formula 1) may be any one of a homopolymer, a block copolymer, an alternating copolymer, or a random copolymer and may be a graft copolymer.

It is preferable that the resin represented by (Formula 1) is a reactant of a compound (polyvalent thiol compound) represented by the following (Formula 2), a polymerizable compound forming the polymer chain $P^1$, and a polymerizable compound forming the polymer chain $P^2$.

As the binder particles, a commercially available product can be used. However, the binder particles can be prepared, for example, by using a surfactant, an emulsifier, or a dispersant, the polymerizable compound forming the polymer chain $P^1$, the polymerizable compound forming the polymer chain $P^2$, the polymerizable compound having $A^1$ and $R^4$, a copolymerizable compound, and the like and performing an addition reaction of the polymerizable compound having $A^1$ and $R^4$, the polymerizable compound forming the polymer chain $P^1$, the polymerizable compound forming the polymer chain $P^2$, and a polyvalent thiol compound such that the polymer chain $P^1$ and the polymer chain $P^2$ are introduced into the thiol compound. Optionally, a polymerization (radical polymerization) reaction can also be performed using the polymerizable compound forming the polymer chain $P^1$ and the polymerizable compound forming the polymer chain $P^2$ according to a typical polymerization reaction or the like.

In order to prepare the binder particles, a step of causing the polymerizable compound having $A^1$ and $R^4$ to react with the thiol compound, a step of introducing the polymer chain $P^1$ into the thiol compound, and a step of introducing the polymer chain $P^2$ into the thiol compound can be performed simultaneously or separately. It is preferable that the step of introducing the polymer chain $P^1$ into the thiol compound and the step of introducing the polymer chain $P^2$ into the thiol compound are performed separately. Although any one of the steps is performed first, it is preferable that the step of introducing the polymer chain $P^2$ into the thiol compound is performed first. In this case, the reaction rate of each of the polymerizable compounds to all the mercapto groups in the thiol compound represented by (Formula 2) is set such that l, m, and n in (Formula 1) are satisfied in the step of causing the polymerizable compound having $A^1$ and $R^4$ to react and the step of introducing the polymer chain $P^1$ and the polymer chain $P^2$. Typically, the resin represented by (Formula 1) is formed as spherical or granular resin particles (binder particles). The average particle size of the obtained binder particles can be appropriately set to be in a predetermined range depending on the kinds of the compounds and the like to be used, a polymerization temperature, a dropping time, a dropping method, the amount of a polymerization initiator, and the like.

A solvent used for the polymerization of the resin (the preparation of the binder particles) is not particularly limited. It is preferable that a solvent that is not reactive with and does not decompose the inorganic solid electrolyte or the active material is used. For example, a hydrocarbon solvent (toluene, heptane, or xylene), an ester solvent (ethyl acetate, propylene glycol monomethyl ether acetate, butyl butyrate), an ether solvent (tetrahydrofuran, dioxane, or 1,2-diethoxyethane), a ketone solvent (acetone, methyl ethyl ketone, cyclohexanone, diisobutyl ketone), a nitrile solvent (acetonitrile, propionitrile, butyronitrile, or isobutyronitrile), or a halogen solvent (dichloromethane or chloroform) can be used.

Preferably, a polymerization method of the resin represented by (Formula 1) (preparation method of the binder particles) can be performed by causing a polyvalent thiol compound represented by the following (Formula 2), the polymerizable compound forming the polymer chain $P^1$, and the polymerizable compound forming the polymer chain $P^2$ to react (addition reaction and polymerization reaction) with each other.

Reaction conditions (polymerization conditions) are set to conditions for an addition reaction (thiol-ene reaction) or a polymerization reaction of the thiol compound represented by the following (Formula 2) and the polymerizable compound (including the macromonomer) forming the polymer chain $P^2$ or conditions for a polymerization reaction of the polymerizable compound forming the polymer chain $P^1$. The conditions are appropriately set according to the kind of the thiol compound or each of the polymerizable compounds, the kind or amount of a catalyst to be used, and the like. Examples of the conditions include conditions where the reaction is performed using the above-described solvent at a reaction temperature of 50° C. to 150° C. for 1 to 15 hours. In this reaction, a typically used polymerization catalyst such as an azo compound or an organic peroxide can be used without any particular limitation.

The thiol compound represented by the following (Formula 2), the polymerizable compound (including the macromonomer) forming the polymer chain $P^2$, and the polymerizable compound forming the polymer chain $P^1$ can be caused to react with each other simultaneously or sequentially and preferably are caused to react with each other sequentially. In a case where the reaction is performed sequentially, it is preferable that the thiol compound represented by the following (Formula 2) and the polymerizable compound (including the macromonomer) forming the polymer chain $P^2$ are caused to react with each other first and subsequently are caused to react with the polymerizable compound forming the polymer chain $P^1$.

In the above-described polymerization method, the polymerizable compounds used for the polymerization reaction, in particular, the polymerizable compound forming the polymer chain $P^2$, can be caused to react with high efficiency (conversion rate), the residual amount of an unreacted material can be reduced, and a high-purity resin (binder particles) can be synthesized.

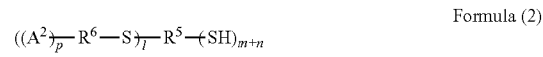

Formula (2)

$$((A^2)_{\overline{p}} R^6 - S)_{\overline{l}} - R^5 - (SH)_{m+n}$$

In (Formula 2), $R^5$ represents a (l+m+n)-valent linking group and has the same definition and the same preferable range as those of $R^1$ in (Formula 1). $R^6$ represents a single bond or a linking group and has the same definition and the same preferable range as those of $R^4$ in (Formula 1). In (Formula 1), $A^2$ represents a hydrogen atom, an acidic group, a group having a basic nitrogen atom, a urea group, a urethane group, an alkoxysilyl group, an epoxy group, an isocyanate group, or a hydroxyl group, and has the same definition and the same preferable range as those of $A^1$ in (Formula 1). p represents an integer of 1 to 10, and has the same definition and the same preferable range as those of p in (Formula 1).

In (Formula 2), l represents an integer of 0 to 5, and has the same definition and the same preferable range as those of l in (Formula 1). m+n represents an integer of 2 to 10, preferably an integer of 3 to 8, more preferably an integer of 3 to 6, and still more preferably an integer of 4 to 6. l+m+n represents an integer of 3 to 10, and has the same definition and the same preferable range as those of l+m+n in (Formula 1).

The compound represented by (Formula 2) is not particularly limited and can be synthesized, for example, by performing an addition reaction (ene-thiol reaction) of the polymerizable compound including $A^2$ and $R^6$ with the (l+m+n)-valent thiol compound. The ene-thiol reaction can also be performed at the same time as the step of introducing the polymer chain $P^2$, for example, as in a preparation method of binder particles D-22 described below. Examples of the polymerizable compound including $A^2$ and $R^6$ include the polymerizable compound having the above-described absorption group $A^1$ among the polymerizable compounds forming the polymer chain $P^1$ or the polymer chain $P^2$.

The content of the binder particles in the solid electrolyte composition is preferably 0.1 mass % or higher, more preferably 0.2 mass % or higher, and still more preferably 0.3 mass % or higher with respect to the solid content of the solid electrolyte composition. The upper limit of the concentration is preferably 30 mass % or lower, more preferably 20 mass % or lower, and still more preferably 10 mass % or lower.

By using the binder particles in the above-described range, binding properties between solid particles can be improved more effectively, and an increase in the interface resistance of solid particles can be suppressed.

<Dispersion Medium>

It is preferable that the solid electrolyte composition according to the embodiment of the present invention includes a dispersion medium.

The dispersion medium is not particularly limited as long as it disperses the above-described respective components, and examples thereof include various organic solvents.

Examples of the organic solvent include the respective solvents of an alcohol compound, an ether compound, an amide compound, an amine compound, a ketone compound, an aromatic compound, an aliphatic compound, a nitrile compound, and an ester compound. Specific examples of the dispersion medium are as follows.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of an ether compound include alkylene glycol alkyl ether (for example, ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, or diethylene glycol monobutyl ether), dialkyl ether (for example, dimethyl ether, diethyl ether, diisopropyl ether, or dibutyl ether), and cyclic ether (for example, tetrahydrofuran or dioxane (including respective isomers of 1,2-, 1,3, and 1,4-)).

Examples of the amide compound include N,N-dimethylformamide, N-methyl-2-pyrrolidone, 2-pyrrolidinone, 1,3-dimethyl-2-imidazolidinone, s-caprolactam, formamide, N-methylfornamide, acetamide, N-methylacetamide, N,N-dimethylacetamide, N-methylpropanamide, and hexamethylphosphorictriamide.

Examples of the amine compound include triethylamine, diisopropylethylamine, and tributylamine.

Examples of the ketone compound include acetone, methyl ethyl ketone, methyl isobutyl ketone, cyclohexanone, and diisobutyl ketone.

Examples of the aromatic compound include an aromatic hydrocarbon compound such as benzene, toluene, or xylene.

Examples of the aliphatic compound include an aliphatic hydrocarbon compound such as hexane, heptane, octane, or decane.

Examples of the nitrile compound include acetonitrile, propionitrile, and isobutyronitrile.

Examples of the ester compound include ethyl acetate, butyl acetate, propyl acetate, butyl butyrate, and butyl pentanoate.

Examples of a non-aqueous dispersion medium include the aromatic compound and the aliphatic compound described above.

In the present invention, in particular, a ketone compound, an aromatic compound, an aliphatic compound, or an ester compound is preferable, and a ketone compound, an aliphatic compound, or an ester compound is more preferable. In the present invention, it is preferable that the sulfide-based inorganic solid electrolyte is used and the above-described specific organic solvent is selected. By selecting this combination, a functional group that is active with the sulfide-based inorganic solid electrolyte is not included, and thus the sulfide-based inorganic solid electrolyte can be stably handled. In particular, a combination of the sulfide-based inorganic solid electrolyte and the aliphatic compound is preferable.

The boiling point of the dispersion medium under normal pressure (1 atm) is preferably 50° C. or higher and more preferably 70° C. or higher. The upper limit is more preferably 250° C. or lower and still more preferably 220° C. or lower.

As the dispersion medium, one kind may be used alone, or two or more kinds may be used in combination.

In the present invention, the content of the dispersion medium in the solid electrolyte composition is not particularly limited and can be appropriately set. For example, the content of the dispersion medium in the solid electrolyte composition is preferably 20% to 99 mass %, more preferably 25% to 70 mass %, and still more preferably 30% to 60 mass %.

<Active Material>

The solid electrolyte composition according to the embodiment of the present invention may include the active material capable of intercalating and deintercalating ions of a metal belonging to Group 1 or Group 2 in the periodic table. Although described below, examples of the active material include a positive electrode active material and a negative electrode active material.

In the present invention, the solid electrolyte composition including the active material (the positive electrode active material or the negative electrode active material) will be referred to as an electrode layer composition (a positive electrode layer composition or a negative electrode layer composition).

Positive Electrode Active Material

The positive electrode active material is preferably capable of reversibly intercalating and/or deintercalating lithium ions. The above-described material is not particularly limited as long as the material has the above-described characteristics and may be transition metal oxides, elements capable of being complexed with Li such as sulfur, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element Ma. It is more preferable that the transition metal oxide is synthesized by mixing the above components such that a molar ratio Li/Ma is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as LiCoPO$_4$, and monoclinic nasicon type vanadium phosphate salt such as Li$_3$V$_2$(PO$_4$)$_3$ (lithium vanadium phosphate).

Examples of the lithium-containing transition metal halogenated phosphate compounds (MD) include iron fluorophosphates such as Li$_2$FePO$_4$F, manganese fluorophosphates such as Li$_2$MnPO$_4$F, cobalt fluorophosphates such as Li$_2$CoPO$_4$F.

Examples of the lithium-containing transition metal silicate compounds (ME) include Li$_2$FeSiO$_4$, Li$_2$MnSiO$_4$, and Li$_2$CoSiO$_4$.

In the present invention, the transition metal oxides having a layered rock salt structure (MA) is preferable, and LCO, NCA, or NMC is more preferable.

The shape of the positive electrode active material is not particularly limited, but is preferably a particle shape. The volume average particle size (sphere-equivalent average particle size) of positive electrode active material particles is not particularly limited. For example, the volume average particle diameter can be set to 0.1 to 50 μm. The average particle size of the positive electrode active material particles can be measured using the same method as that of the average particle size of the inorganic solid electrolyte. In order to allow the positive electrode active material to have a predetermined particle size, an ordinary pulverizer or classifier may be used. For example, a mortar, a ball mill, a sand mill, a vibration ball mill, a satellite ball mill, a planetary ball mill, a swirling air flow jet mill, or a sieve is preferably used. During the pulverization, wet pulverization of causing water or an organic solvent such as methanol to coexist with the negative electrode active material can be performed. In order to obtain a desired particle size, it is preferable to perform classification. Classification is not particularly limited and can be performed using, for example, a sieve or an air classifier can be appropriately used. The classification can be used using a dry method or a wet method.

Positive electrode active materials obtained using a calcination method may be used after being washed with water, an acidic aqueous solution, an alkaline aqueous solution, or an organic solvent.

As the positive electrode active material, one kind may be used alone, or two or more kinds may be used in combination.

In the case of forming a positive electrode active material layer, the mass (mg) of the positive electrode active material per unit area (cm$^2$) of the positive electrode active material layer (weight per unit area) is not particularly limited. The mass (mg) of the inorganic solid electrolyte can be appropriately determined depending on the designed battery capacity and may be, for example, 1 to 100 mg/cm$^2$.

The content of the positive electrode active material in the solid electrolyte composition is not particularly limited, but is preferably 10% to 97 mass %, more preferably 30% to 95 mass %, still more preferably 40% to 93 mass %, and particularly preferably 50% to 90 mass % with respect to a solid content of 100 mass %.

(Negative Electrode Active Material)

The negative electrode active material is preferably capable of reversibly intercalating and/or deintercalating lithium ions. The material is not particularly limited as long as it has the above-described properties, and examples thereof include a carbonaceous material, an oxide (including a composite oxide) of a metal or a metalloid element, lithium, a lithium alloy, and an active material capable of alloying with lithium (forming an alloy with lithium). In particular, from the viewpoint of reliability, a carbonaceous material an oxide of a metalloid element, a metal composite oxide, or lithium is preferable. From the viewpoint of increasing the capacity of an all-solid state secondary battery, an active material capable of forming an alloy with lithium is preferable. In the solid electrolyte layer formed of the solid electrolyte composition according to the embodiment of the present invention, solid particles can be strongly bound to each other. Therefore, an active material capable of forming an alloy with lithium can be used as the negative electrode active material.

The carbonaceous material which is used as the negative electrode active material is a material substantially containing carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into nongraphitizable carbonaceous materials (also referred to as "hard carbon") and graphitizable carbonaceous materials based on the graphitization degree. In addition, it is preferable that the carbonaceous material has the lattice spacing, density, and crystallite size described in JP1987-022066A (JP-S62-022066A), JP1990-006856A (JP-H2-006856A), and JP1991-045473A (JP-H3-045473A). The carbonaceous material is not necessarily a single material and, for example, may be a mixture of natural graphite and artificial graphite described in JP1993-090844A (JP-H5-090844A) or graphite having a coating layer described in JP1994-004516A (JP-H6-004516A).

As the carbonaceous material, hard carbon or graphite is preferably used, and graphite is more preferably used.

The oxide of a metal or a metalloid element that can be used as the negative electrode active material is not particularly limited as long as it is an oxide capable of intercalating and deintercalating lithium, and examples thereof include an oxide of a metal element (metal oxide), a composite oxide of a metal element or a composite oxide of a metal element and a metalloid element (collectively referred to as "metal composite oxide), and an oxide of a metalloid element (metalloid oxide). The oxides are more preferably amorphous oxides, and preferable examples thereof include chalcogenides which are reaction products between metal elements and elements in Group 16 of the periodic table). In the present invention, the metalloid element refers to an element having intermediate properties between those of a metal element and a non-metal element. Typically, the metalloid elements include six elements including boron, silicon, germanium, arsenic, antimony, and tellurium and further includes three elements including selenium, polonium, and astatine. In addition, "Amorphous" represents an oxide having a broad scattering band with a peak in a range of 20° to 40° in terms of 2θ in case of being measured by an X-ray diffraction method using CuKα rays, and the oxide may have a crystal diffraction line. The highest intensity in a crystal diffraction line observed in a range of 40° to 70° in terms of 2θ is preferably 100 times or less and more preferably 5 times or less relative to the intensity of a diffraction peak line in a broad scattering band observed in a range of 20° to 40° in terms of 2θ, and it is still more preferable that the oxide does not have a crystal diffraction line.

In a compound group consisting of the amorphous oxides and the chalcogenides, amorphous oxides of metalloid elements and chalcogenides are more preferable, and (composite) oxides consisting of one element or a combination of two or more elements selected from elements (for example, Al, Ga, Si, Sn, Ge, Pb, Sb, and Bi) belonging to Groups 13 (IIIB) to 15 (VB) in the periodic table or chalcogenides are more preferable. Specific preferable examples of the amorphous oxides and the chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$.

Preferable examples of the negative electrode active material which can be used in combination with the amorphous oxide as negative electrode active material containing Sn, Si, or Ge as a major component include carbonaceous materials that can intercalate and/or deintercalate lithium ions or lithium metal; lithium; lithium alloys; and an active material that can form an alloy with lithium.

It is preferable that the oxide of a metal or a metalloid element, in particular, the metal (composite) oxide and the chalcogenide include at least one of titanium or lithium as components from the viewpoint of high current density charging-discharging characteristics. Examples of the metal composite oxide (lithium composite metal oxide) including lithium include a composite oxide consisting of lithium oxide and the metal (composite) oxide or the chalcogenide, specifically, $Li_2SnO_2$.

As the negative electrode active material, for example, a metal oxide (titanium oxide) having a titanium atom is also preferable. Specifically, $Li_4Ti_5O_{12}$ (lithium titanium oxide [LTO]) is preferable since the volume fluctuation during the intercalation and deintercalation of lithium ions is small, and thus the high-speed charging-discharging characteristics are excellent, and the deterioration of electrodes is suppressed, whereby it becomes possible to improve the service lives of lithium ion secondary batteries.

The lithium alloy as the negative electrode active material is not particularly limited as long as it is typically used as a negative electrode active material for a secondary battery, and examples thereof include a lithium aluminum alloy.

The active material capable of forming an alloy with lithium is not particularly limited as long as it is typically used as a negative electrode active material for a secondary battery, and examples thereof include each metal such as Sn, Si, Al, or In, a metalloid, and a silicon material such as Si or SiO. SiO itself can be used as the negative electrode active material (metalloid oxide). In addition, Si is produced along with the operation of an all-solid state secondary battery, and thus SiO can be used as an active material (or a precursor thereof) capable of forming an alloy with lithium.

In a negative electrode active material layer that is formed using the active material capable of forming an alloy with lithium, expansion and contraction increases during charging and discharging. On the other hand, in general, a larger amount of Li ions can be intercalated as compared to a negative electrode active material layer (carbon negative electrode) that is formed using a carbon material such as graphite or acetylene black. That is, the amount of Li ions intercalated per unit mass increases. Therefore, the battery capacity can be increased, and there is an advantage that the battery driving duration can be extended.

The chemical formulae of the compounds obtained using a calcination method can be calculated using inductively coupled plasma (ICP) optical emission spectroscopy as a measurement method from the mass difference of powder before and after calcinating as a convenient method.

The shape of the negative electrode active material is not particularly limited, but is preferably a particle shape. The average particle size of the negative electrode active material is not particularly limited is preferably 0.1 to 60 μm. The average particle size of the negative electrode active material can be measured using the same method as that of the average particle size of the inorganic solid electrolyte. In order to allow the negative electrode active material to have a predetermined particle size, an ordinary pulverizer or classifier may be used as in the positive electrode active material.

As the negative electrode active material, one kind may be used alone, or two or more kinds may be used in combination.

In the case of forming a negative electrode active material layer, the mass (mg) of the negative electrode active material per unit area ($cm^2$) in the negative electrode active material layer (weight per unit area) is not particularly limited. The mass (mg) of the inorganic solid electrolyte can be appropriately determined depending on the designed battery capacity and may be, for example, 1 to 100 $mg/cm^2$.

The content of the negative electrode active material in the solid electrolyte composition is not particularly limited and is preferably 10% to 90 mass %, more preferably 20% to 85 mass %, still more preferably 30% to 80 mass %, and still more preferably 40% to 75 mass % with respect to 100 mass % of the solid content.

In the present invention, in a case where a negative electrode active material layer is formed by charging a secondary battery, ions of a metal belonging to Group 1 or Group 2 in the periodic table produced in the all-solid state secondary battery can be used instead of the negative electrode active material. By binding the ions to electrons and precipitating a metal, a negative electrode active material layer can be formed.

(Coating of Active Material)

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an actinic ray or an active gas (plasma or the like) before or after the coating of the surfaces.

<Conductive Auxiliary Agent>

The solid electrolyte composition according to the embodiment of the present invention may appropriately include a conductive auxiliary agent used for improving, for example, the electron conductivity of the active material. As the conductive auxiliary agent, a general conductive auxiliary agent can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, among these, one kind may be used, or two or more kinds may be used.

In the present invention, in a case where the negative electrode active material and the conductive auxiliary agent are used in combination, among the above-described conductive auxiliary agents, a conductive auxiliary agent that does not intercalate and deintercalate Li and does not function as a negative electrode active material during charging and discharging of the battery is classified as the conductive auxiliary agent. Therefore, among the conductive auxiliary agents, a conductive auxiliary agent that can function as the active material in the active material layer during charging and discharging of the battery is classified as an active material not as a conductive auxiliary agent. Whether or not the conductive auxiliary agent functions as the negative electrode active material during charging and discharging of the battery is not uniquely determined but is determined based on a combination of the conductive auxiliary agent with the negative electrode active material.

In a case where the solid electrolyte composition according to the embodiment of the present invention includes a conductive auxiliary agent, the content of the conductive auxiliary agent is preferably 0% to 10 mass %.

<Lithium Salt>

It is also preferable that the solid electrolyte composition according to the embodiment of the present invention includes a lithium salt (supporting electrolyte).

The lithium salt is preferably a lithium salt typically used for this kind of product and is not particularly limited. For example, a lithium salt described in paragraphs "0082" to "0085" of JP2015-088486A is preferable.

In a case where the solid electrolyte composition according to the embodiment of the present invention includes a lithium salt, the content of the lithium salt is preferably 0.1 parts by mass or more and more preferably 5 parts by mass or more with respect to 100 parts by mass of the solid electrolyte. The upper limit is preferably 50 parts by mass or less and more preferably 20 parts by mass or less.

<Dispersant>

The solid electrolyte composition according to the embodiment of the present invention includes binder particles that also function as a dispersant (emulsifier) of the solid particles. Therefore, the solid electrolyte composition according to the embodiment of the present invention may not include a dispersant other than the binder particles and may appropriately include a dispersant. As the dispersant, a dispersant that is generally used for an all-solid state secondary battery can be appropriately selected and used. Generally, a compound intended for particle adsorption and steric repulsion and/or electrostatic repulsion is preferably used.

<Other Additives>

As components other than the respective components described above, the solid electrolyte composition according to the embodiment of the present invention may appropriately include an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant.

The ionic liquid is added to improved the ion conductivity, and a well-known material can be used without any particular limitation.

(Preparation of Solid Electrolyte Composition)

The solid electrolyte composition according to the embodiment of the present invention can be prepared, preferably, as a slurry by mixing the inorganic solid electrolyte, the binder particles, and preferably the dispersion medium and appropriately other components, for example using various mixers that are typically used.

A mixing method is not particularly limited, and the components may be mixed at once or sequentially. The binder particles are typically used as a dispersion liquid of the binder particles obtained by the synthesis of the resin represented by (Formula 1), but the present invention is not limited thereto. A mixing environment is not particularly limited, and examples thereof include a dry air environment and an inert gas environment.

In a case where the solid electrolyte composition according to the embodiment of the present invention includes a dispersant, reaggregation of solid particles can be suppressed, and a dispersion liquid including highly dispersed solid particles can be obtained.

[Sheet for all-Solid State Secondary Battery]

A sheet for an all-solid state secondary battery according to the embodiment of the present invention is a sheet-shaped molded body with which a constituent layer of an all-solid state secondary battery can be formed, and includes various aspects depending on uses thereof. Examples of the sheet for an all-solid state secondary battery include a sheet that is preferably used in a solid electrolyte layer (also referred to as a solid electrolyte sheet for an all-solid state secondary battery), and a sheet that is preferably used in an electrode or a laminate of an electrode and a solid electrolyte layer (an electrode sheet for an all-solid state secondary battery). In the present invention, these various sheets will also be collectively referred to as a sheet for an all-solid state secondary battery.

The solid electrolyte sheet for an all-solid state secondary battery according to the embodiment of the present invention is not particularly limited as long as it is a sheet including a solid electrolyte layer, and may be a sheet in which a solid electrolyte layer is formed on a substrate or may be a sheet that is formed of a solid electrolyte layer without including a substrate. The solid electrolyte sheet for an all-solid state secondary battery may include other layers in addition to the solid electrolyte layer. Examples of the other layers include a protective layer (release sheet), a current collector, and a coating layer.

Examples of the solid electrolyte sheet for an all-solid state secondary battery according to the embodiment of the present invention include a sheet including a layer formed of the solid electrolyte composition according to the embodiment of the present invention, a typical solid electrolyte layer, and a protective layer on a substrate in this order.

The substrate is not particularly limited as long as it can support the solid electrolyte layer, and examples thereof include a sheet body (plate-shaped body) formed of materials described below regarding the current collector, an organic material, an inorganic material, or the like. Examples of the organic materials include various polymers, and specific examples thereof include polyethylene terephthalate, polypropylene, polyethylene, and cellulose. Examples of the inorganic materials include glass and ceramic.

The configuration and thickness of the solid electrolyte layer in the sheet for an all-solid state secondary battery are the same as the configuration and thickness of the solid electrolyte layer described below regarding the all-solid state secondary battery according to the embodiment of the present invention.

An electrode sheet for an all-solid state secondary battery according to the embodiment of the present invention (simply also referred to as "electrode sheet according to the embodiment of the present invention") is not particularly limited as long as it is an electrode sheet including an active material layer, and may be a sheet in which an active material layer is formed on a substrate (current collector) or may be a sheet that is formed of an active material layer without including a substrate. The electrode sheet is typically a sheet including the current collector and the active material layer, and examples of an aspect thereof include an aspect including the current collector, the active material layer, and the solid electrolyte layer in this order and an aspect including the current collector, the active material layer, the solid electrolyte layer, and the active material layer in this order. The electrode sheet according to the embodiment of the present invention may include the above-described other layers. The thickness of each of the layers forming the electrode sheet according to the embodiment of the present invention is the same as the thickness of each of layers described below regarding the all-solid state secondary battery.

In the sheet for an all-solid state secondary battery according to the embodiment of the present invention, at least one of the solid electrolyte layer or the active material layer is formed of the solid electrolyte composition according to the embodiment of the present invention, solid particles in the layer are strongly bound to each other. In addition, in the electrode sheet for an all-solid state secondary battery, the active material layer that is formed of the solid electrolyte composition according to the embodiment of the present invention is strongly bound to the current collector. In the present invention, an increase in the interface resistance of solid particles can also be effectively suppressed. Accordingly, the sheet for an all-solid state secondary battery according to the embodiment of the present invention can be suitably used as a sheet with which a constituent layer of an all-solid state secondary battery can be formed.

For example, in a case where the sheet for an all-solid state secondary battery is manufactured in-line in an elongated shape (is wound during transport) and used as a wound battery, strong binding properties between solid particles in the solid electrolyte layer and the active material layer can be maintained. In a case where an all-solid state secondary battery is manufactured using the sheet for an all-solid state secondary battery manufactured, excellent battery performance can be exhibited, and high productivity and yield (reproducibility) can be realized.

[Method of Manufacturing Sheet for all-Solid State Secondary Battery]

A method of manufacturing a sheet for an all-solid state secondary battery according to the embodiment of the present invention is not particularly limited. The sheet for an all-solid state secondary battery according to the embodiment of the present invention can be manufactured by forming the respective layers using the solid electrolyte composition according to the embodiment of the present invention. Examples of the method include a method of forming a film (drying and applying) of the solid electrolyte composition to form a layer (applied and dried layer) formed of the solid electrolyte composition preferably on a substrate or a current collector (other layers may be interposed therebetween). As a result, the sheet for an all-solid state secondary battery including the substrate or the current collector and the applied and dried layer can be prepared. Here, the applied and dried layer refers to a layer formed by applying the solid electrolyte composition according to the embodiment of the present invention and drying the dispersion medium (that is, a layer formed using the solid electrolyte composition according to the embodiment of the present invention and made of a composition obtained by removing the dispersion medium from the solid electrolyte composition according to the embodiment of the present invention). In the active material layer and the applied and dried layer, the dispersion medium may remain within a range where the effects of the present invention do not deteriorate, and the residual amount thereof, for example, in each of the layers may be 3 mass % or lower.

Each of steps of application, drying, or the like in the method of manufacturing a sheet for an all-solid state secondary battery according to the embodiment of the present invention will be described below regarding a method of manufacturing an all-solid state secondary battery.

In the method of manufacturing a sheet for an all-solid state secondary battery according to the embodiment of the present invention, it is also possible to pressurize the applied and dried layer obtained as described above. Pressurization conditions or the like will be described below regarding the method of manufacturing an all-solid state secondary battery.

In addition, in the method of manufacturing a sheet for an all-solid state secondary battery according to the embodiment of the present invention, it is also possible to peel the substrate, the protective layer (particularly, the release sheet), or the like.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The positive electrode active material layer is formed preferably on a positive electrode current collector to configure a positive electrode. The negative electrode active material layer is formed preferably on a negative electrode current collector to configure a negative electrode.

It is preferable that at least one of the negative electrode active material layer, the positive electrode active material layer, or the solid electrolyte layer is formed of the solid electrolyte composition according to the embodiment of the present invention, and it is more preferable that all the layers are formed of the solid electrolyte composition according to the embodiment of the present invention. In the active material layer or the solid electrolyte layer formed of the solid electrolyte composition according to the embodiment of the present invention, it is preferable that the kinds of components to be included and the content ratio thereof are the same as those of the solid content of the solid electrolyte composition according to the embodiment of the present invention. In a case where the active material layer or the solid electrolyte layer is not formed of the solid electrolyte composition according to the embodiment of the present invention, a well-known material can be used.

The thicknesses of the negative electrode active material layer, the solid electrolyte layer, and the positive electrode active material layer are not particularly limited respectively. In consideration of the dimension of a general all-solid state secondary battery, each of the thicknesses of the respective layers is preferably 10 to 1,000 µm and more preferably 20 µm or more and less than 500 µm. In the all-solid state secondary battery according to the embodiment of the present invention, the thickness of at least one layer of the positive electrode active material layer or the negative electrode active material layer is still more preferably 50 µm or more and less than 500 µm.

Each of the positive electrode active material layer and the negative electrode active material layer may include the current collector opposite to the solid electrolyte layer.

[Case]

Depending on uses, the all-solid state secondary battery according to the embodiment of the present invention may be used as the all-solid state secondary battery having the above-described structure as it is but is preferably sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short-circuit prevention.

Hereinafter, an all-solid state secondary battery according to a preferred embodiment of the present invention will be described with reference to FIG. 1, but the present invention is not limited thereto.

FIG. 1 is a cross-sectional view schematically illustrating the all-solid state secondary battery (lithium ion secondary battery) according to the preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers are in contact with one another and adjacent to each other. In a case in which the above-described structure is employed, during charging, electrons ($e^-$) are supplied to the negative electrode side, and lithium ions ($Li^+$) are accumulated in the negative electrode side. On the other hand, during discharging, the lithium ions ($Li^+$) accumulated in the negative electrode side return to the positive electrode, and electrons are supplied to an operation portion 6. In an example illustrated in the drawing, an electric bulb is employed as a model of the operation portion 6 and is lit by discharging.

In a case where the all-solid state secondary battery having a layer configuration illustrated in FIG. 1 is put into a 2032-type coin case, the all-solid state secondary battery will be referred to as "battery laminate", and a battery prepared by putting this battery laminate into a 2032-type coin case will be referred to as "all-solid state secondary battery", thereby referring to both batteries distinctively in some cases.

(Positive Electrode Active Material Layer, Solid Electrolyte Layer, and Negative Electrode Active Material Layer)

In the all-solid state secondary battery 10, all of the positive electrode active material layer, the solid electrolyte layer, and the negative electrode active material layer are formed using the solid electrolyte composition according to the embodiment of the present invention. This all-solid state secondary battery 10 exhibits excellent battery performance. The inorganic solid electrolyte and the binder particles in the positive electrode active material layer 4, the solid electrolyte layer 3, and the negative electrode active material layer 2 may be the same as or different from each other.

In the present invention, either or both of the positive electrode active material layer and the negative electrode active material layer will also be simply referred to as the active material layer or the electrode active material layer. In addition, either or both of the positive electrode active material and the negative electrode active material will also be simply referred to as the active material or the electrode active material.

In the present invention, in a case where the above-described binder particles are used in combination with the solid particles such as the inorganic solid electrolyte or the active material, as described above, binding properties between solid particles can be improved, and poor contact between the solid particles and peeling of the solid particles from the current collector can be suppressed. In a more preferable aspect, an increase in interface resistance between the solid particles and an increase in interface resistance between the solid particles and the current collector can also be suppressed. Therefore, the all-solid state secondary battery according to the embodiment of the present invention exhibits excellent battery performance.

In the all-solid state secondary battery 10, the negative electrode active material layer can be formed as a lithium metal layer. Examples of the lithium metal layer include a layer formed by deposition or forming of lithium metal powder, a lithium foil, and a lithium deposited film. The thickness of the lithium metal layer is not limited to the above-described thickness of the above-described negative electrode active material layer and may be, for example, 1 to 500 µm.

The positive electrode current collector 5 and the negative electrode current collector 1 are preferably an electron conductor.

In the present invention, either or both of the positive electrode current collector and the negative electrode current collector will also be simply referred to as the current collector.

As a material for forming the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material for forming the negative electrode current collector, not only aluminum, copper, a copper alloy, stainless steel, nickel, or titanium but also a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, typically, current collectors having a film sheet-like shape are used, but it is also possible to use net-shaped collectors, punched collectors, compacts of lath bodies, porous bodies, foaming bodies, or fiber groups, and the like.

The thickness of the current collector is not particularly limited, but is preferably 1 to 500 μm. In addition, it is also preferable that the surface of the current collector is made to be uneven through a surface treatment.

In the present invention, a functional layer, a member, or the like may be appropriately interposed or disposed between the respective layers of the negative electrode current collector, the negative electrode active material layer, the solid electrolyte layer, the positive electrode active material layer, and the positive electrode current collector or on the outside thereof. In addition, each of the layers may have a single-layer structure or a multi-layer structure.

[Manufacturing of all-Solid State Secondary Battery]

The all-solid state secondary battery can be manufactured using an ordinary method. Specifically, the all-solid state secondary battery can be manufactured by forming the respective layers using the solid electrolyte composition according to the embodiment of the present invention and the like. As a result, an all-solid state secondary battery having excellent battery performance and having a low electrical resistance in a more preferable aspect can be manufactured. Hereinafter, the details will be described in detail.

The all-solid state secondary battery according to the embodiment of the present invention can be manufactured through a method (the method of manufacturing a sheet for an all-solid state secondary battery according to the embodiment of the present invention) including (through) a step of appropriately applying (forming a film using) the solid electrolyte composition according to the embodiment of the present invention to the substrate (for example, the metal foil as the current collector) to form a coating film.

For example, the solid electrolyte composition including the positive electrode active material is applied as a positive electrode material (positive electrode layer composition) to a metal foil which is a positive electrode current collector so as to form a positive electrode active material layer. As a result, a positive electrode sheet for an all-solid state secondary battery is prepared. Next, the solid electrolyte composition for forming a solid electrolyte layer is applied to the positive electrode active material layer so as to form the solid electrolyte layer. Further, the solid electrolyte composition including the negative electrode active material is applied as a negative electrode material (negative electrode layer composition) to the solid electrolyte layer so as to form a negative electrode active material layer. By laminating the negative electrode current collector (metal foil) on the negative electrode active material layer, an all-solid state secondary battery having a structure in which the solid electrolyte layer is sandwiched between the positive electrode active material layer and the negative electrode active material layer can be obtained. By sealing the laminate in a case, a desired all-solid state secondary battery can also be obtained. The respective compositions may be applied separately (sequential application method) or may be applied simultaneously (simultaneous application method).

In addition, an all-solid state secondary battery can also be manufactured by forming the negative electrode active material layer, the solid electrolyte layer, and the positive electrode active material layer on the negative electrode current collector in order reverse to that of the method of forming the respective layers and laminating the positive electrode current collector thereon.

As another method, for example, the following method can be used. That is, the positive electrode sheet for an all-solid state secondary battery is prepared as described above. In addition, the solid electrolyte composition including the negative electrode active material is applied as a negative electrode material (negative electrode layer composition) to a metal foil which is a negative electrode current collector so as to form a negative electrode active material layer. As a result, a negative electrode sheet for an all-solid state secondary battery is prepared. Next, the solid electrolyte layer is formed on the active material layer in any one of the sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. This way, an all-solid state secondary battery can be manufactured.

As still another method, for example, the following method can be used. That is, the positive electrode sheet for an all-solid state secondary battery and the negative electrode sheet for an all-solid state secondary battery are prepared as described above. In addition, separately from the electrode sheets, the solid electrolyte composition is applied to a substrate to prepare a solid electrolyte sheet for an all-solid state secondary battery including the solid electrolyte layer. Furthermore, the positive electrode sheet for an all-solid state secondary battery and the negative electrode sheet for an all-solid state secondary battery are laminated such that the solid electrolyte layer removed from the substrate is sandwiched therebetween. This way, an all-solid state secondary battery can be manufactured.

In the above-described manufacturing method, the solid electrolyte composition according to the embodiment of the present invention may be used as any one of the positive electrode layer composition, the solid electrolyte composition, or the negative electrode layer composition, and is preferably used as all of the compositions.

<Formation of Respective Layers (Film Formation)>

The method for applying the solid electrolyte composition is not particularly limited and can be appropriately selected. Examples thereof include coating (preferably wet-type coating), spray coating, spin coating, dip coating, slit coating, stripe coating, and bar coating.

In this case, the solid electrolyte composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (applied and dried layer). In addition, the temperature is not excessively increased, and the respective members of the all-solid state secondary battery are not impaired, which is preferable. Therefore, in the all-solid state secondary battery, excellent total performance can be exhibited, and excellent binding properties and excellent ion conductivity can be obtained even under no pressure.

As described above, in a case where the solid electrolyte composition according to the embodiment of the present invention is applied and dried, an applied and dried layer in which solid particles are strongly bound and, in a more preferable aspect, the interface resistance between the solid particles is low can be formed.

After the application of the solid electrolyte composition, after the lamination of the constituent layer, or after the preparation of the all-solid state secondary battery, the respective layers or the all-solid state secondary battery is preferably pressurized. In addition, the respective layers are also preferably pressurized in a state where they are laminated. Examples of the pressurization method include a method using a hydraulic cylinder pressing machine. The pressure is not particularly limited, but is, generally, preferably in a range of 5 to 1,500 MPa.

In addition, the applied solid electrolyte composition may be heated while being pressurized. The heating temperature is not particularly limited, but is generally in a range of 30° C. to 300° C. The respective layers or the all-solid state secondary battery can also be pressed at a temperature higher than the glass transition temperature of the inorganic solid electrolyte. On the other hand, in a case where the inorganic solid electrolyte and the binder particles are present together, the respective layers or the all-solid state secondary battery can also be pressed at a temperature higher than the glass transition temperature of the above-described resin forming the binder particles. In general, the pressing temperature does not exceed the melting point of the above-described resin represented by (Formula 1).

The pressurization may be carried out in a state in which a coating solvent or the dispersion medium has been dried in advance or in a state in which the solvent or the dispersion medium remains.

The respective compositions may be applied at the same time, and the application, the drying, and the pressing may be carried out simultaneously and/or sequentially. The respective compositions may be applied to separate substrates and then laminated by transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be homogeneous or variable with respect to a pressed portion such as a sheet surface.

The pressing pressure may be variable depending on the area or the thickness of the pressed portion. In addition, the pressure may also be variable stepwise for the same portion.

A pressing surface may be smooth or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery according to the embodiment of the present invention can be applied to a variety of usages. Application aspects are not particularly limited, and, in the case of being mounted in electronic apparatuses, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, and backup power supplies. In addition, examples of an electronic apparatus for consumer use include an automobile, an electromotive vehicle, a motor, a lighting device, a toy, a game device, a load conditioner, a timepiece, a strobe, a camera, a medical device (for example, a pacemaker, a hearing aid, or a shoulder massager). Further, the all-solid state secondary battery can be used as various cells for use in military or aerospace applications. In addition, the all-solid state secondary battery can also be combined with solar batteries.

EXAMPLES

Hereinafter, the present invention will be described in more detail based on Examples but is not limited to these examples. "Parts" and "%" that represent compositions in the following examples are mass-based unless particularly otherwise described. In the present invention, "room temperature" refers to 25° C.

Resins D-01 to D-38 and cD-01 to cD-05 including binder particles used in Examples and Comparative Examples will be shown below. In each of the resins shown below, a numerical value added to the lower right of a component represents a mass ratio. In the respective formulae, Et represents ethyl, Bu represents butyl, Ph represents phenyl, and Bn represents benzyl.

D-01

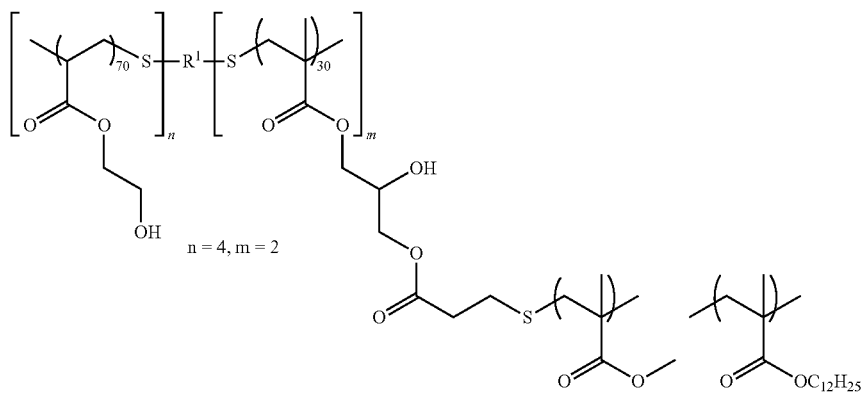

-continued
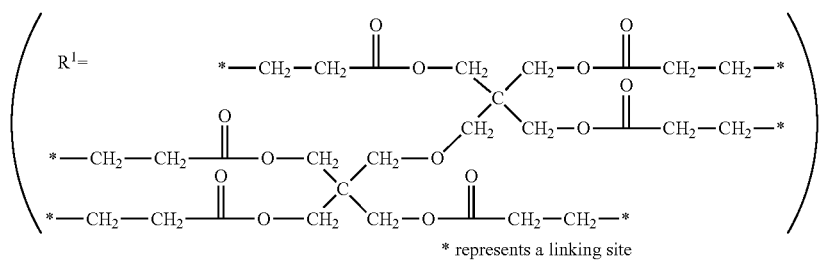
MMA/LMA = 28/72 wt %
MMA = Methyl Methacrylate
LMA = Lauryl Methacrylate
D-02
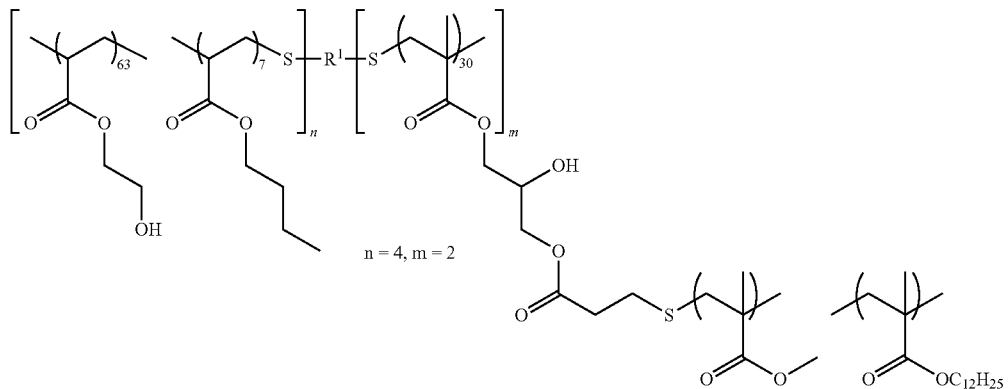
MMA/LMA = 28/72 wt %
D-03
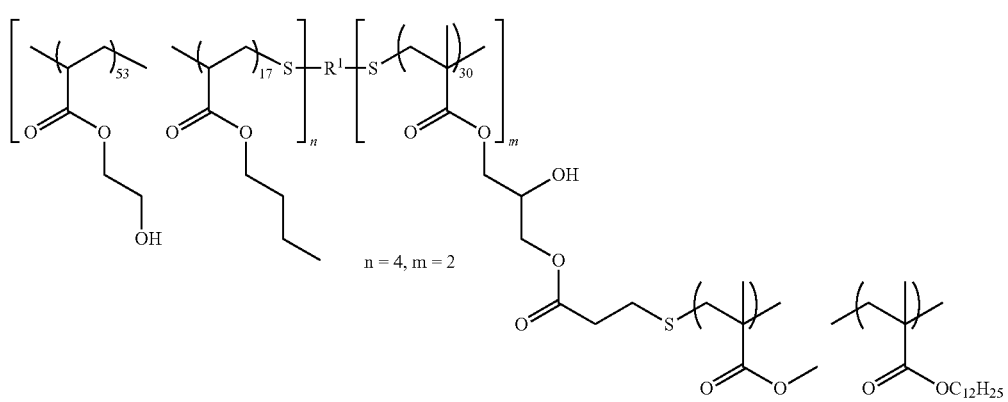

-continued
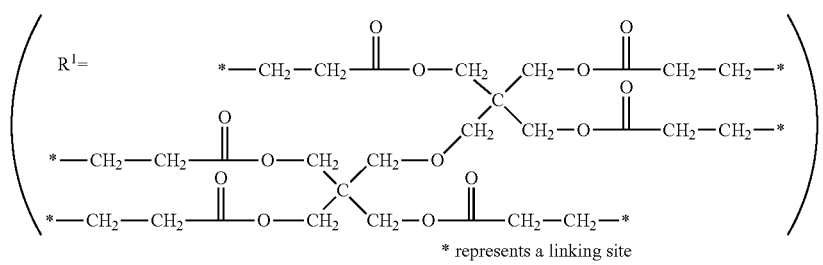
MMA/LMA = 28/72 wt %
D-04
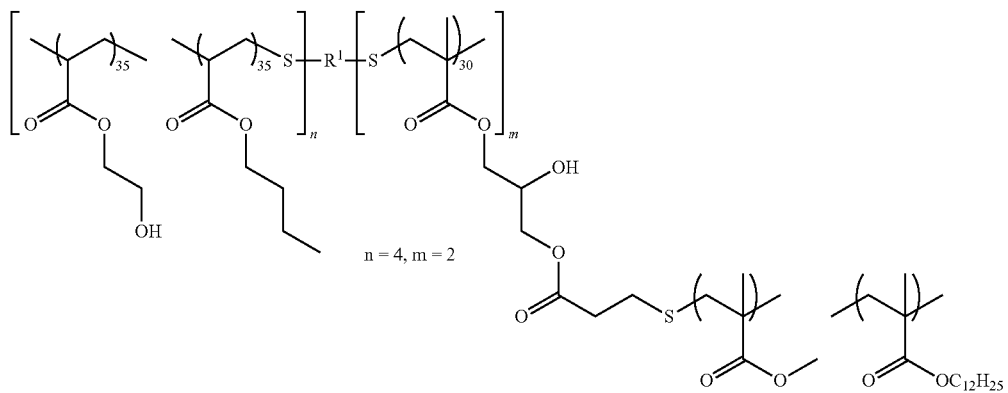
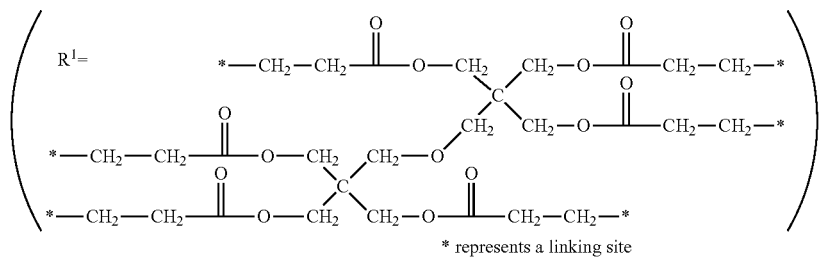
MMA/LMA = 28/72 wt %
D-05
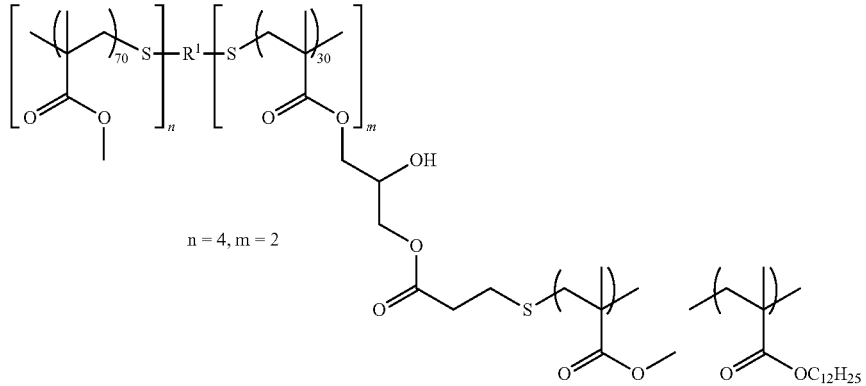

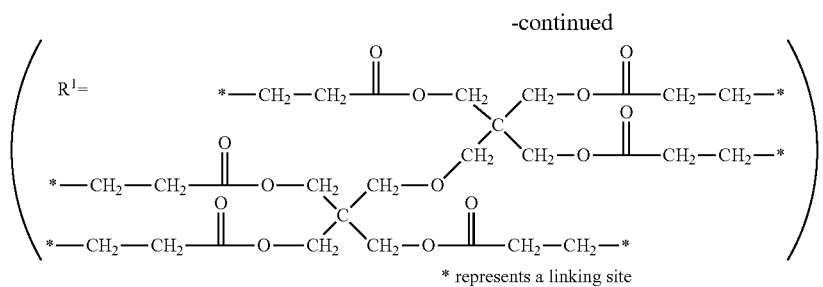
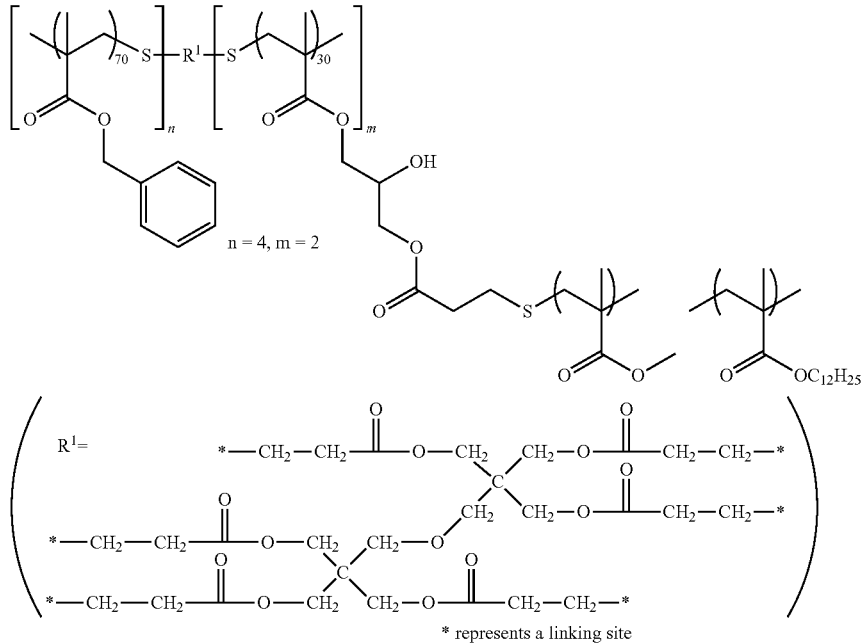
D-06
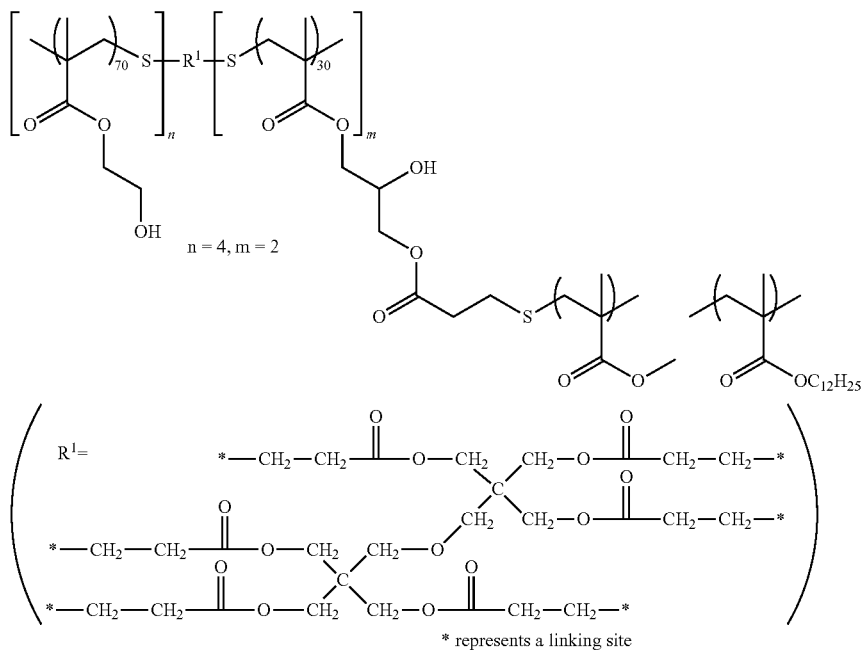
D-07

-continued
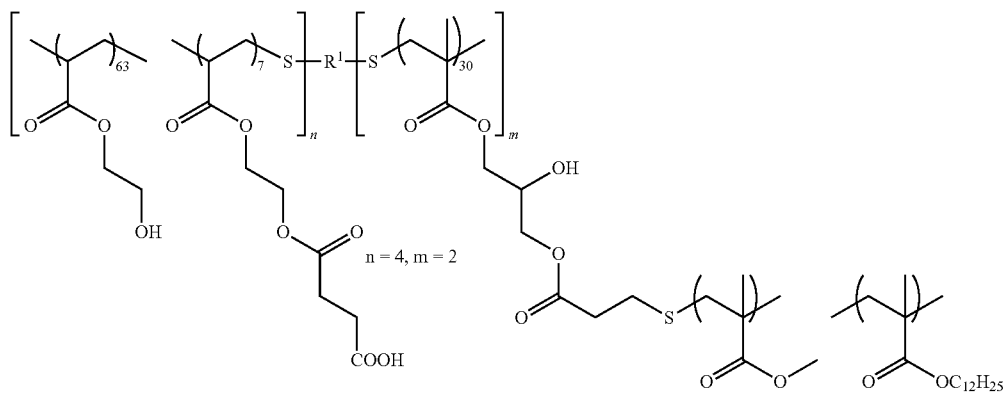
D-08
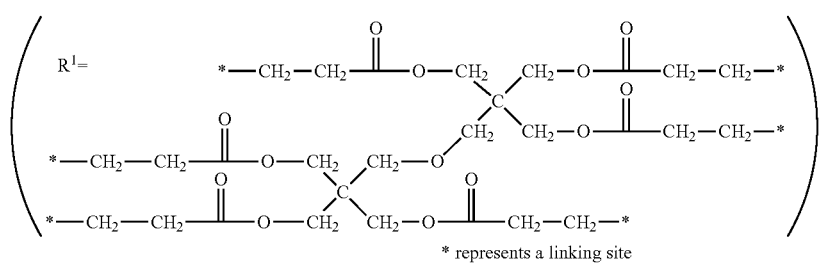
MMA/LMA = 28/72 wt %
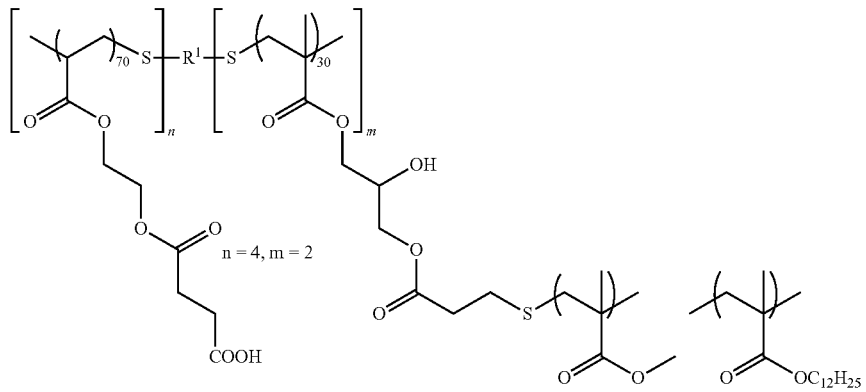
D-09
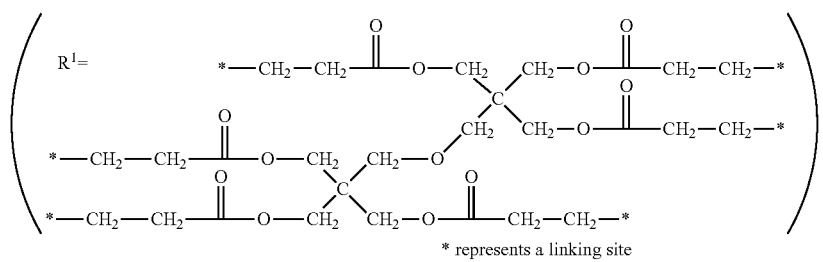
MMA/LMA = 28/72 wt %

D-10
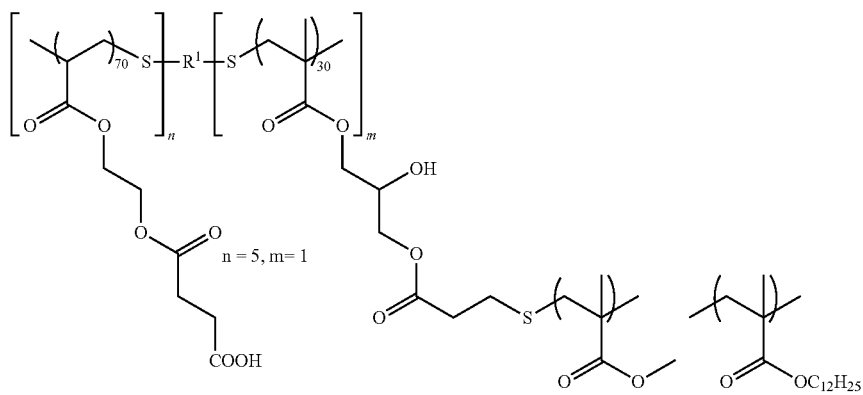
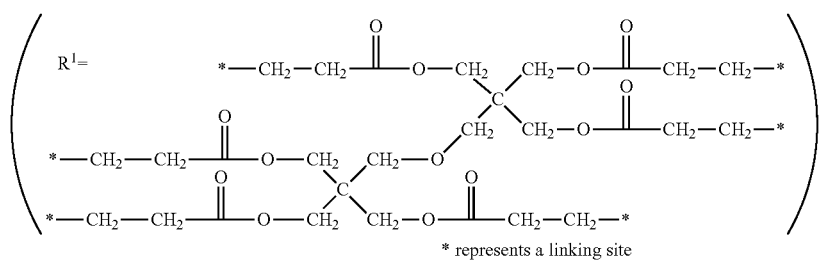
MMA/LMA = 28/72 wt %
D-11
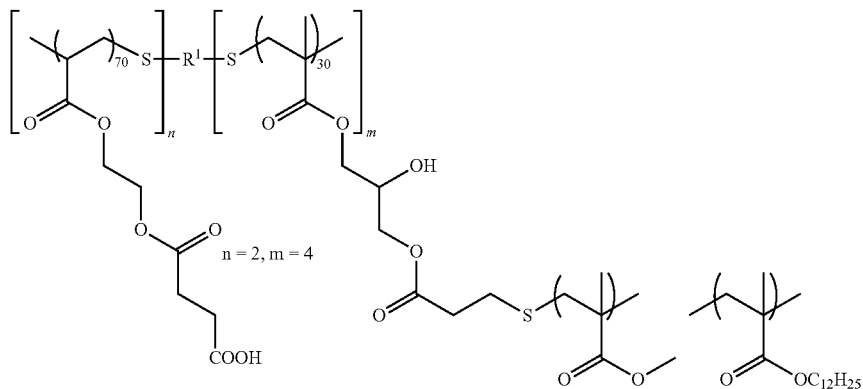
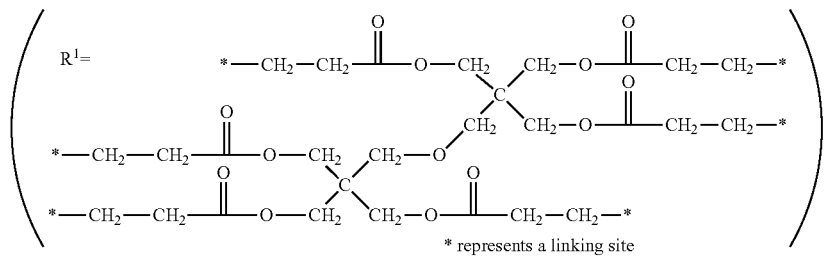
MMA/LMA = 28/72 wt%

-continued
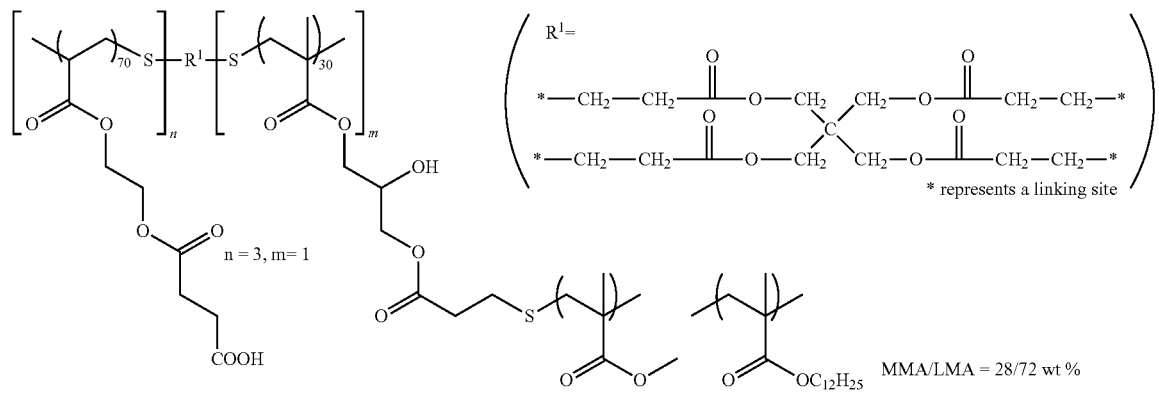
D-12
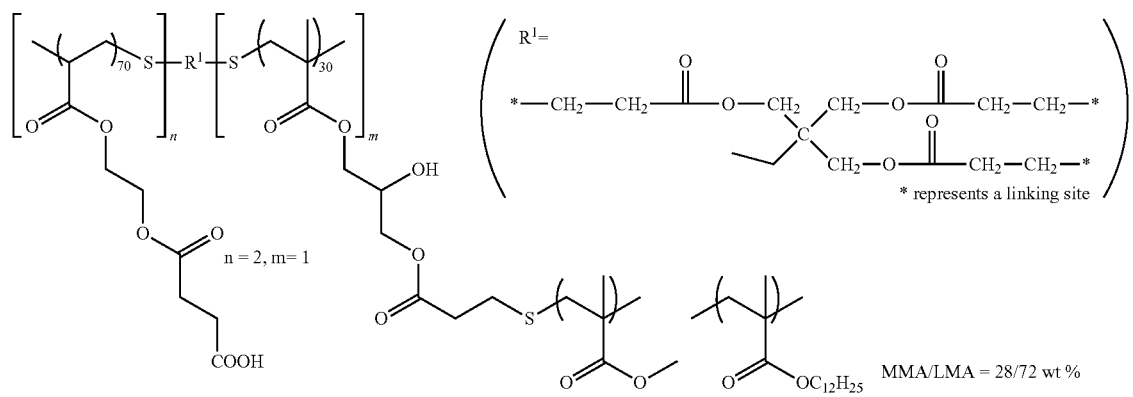
D-13
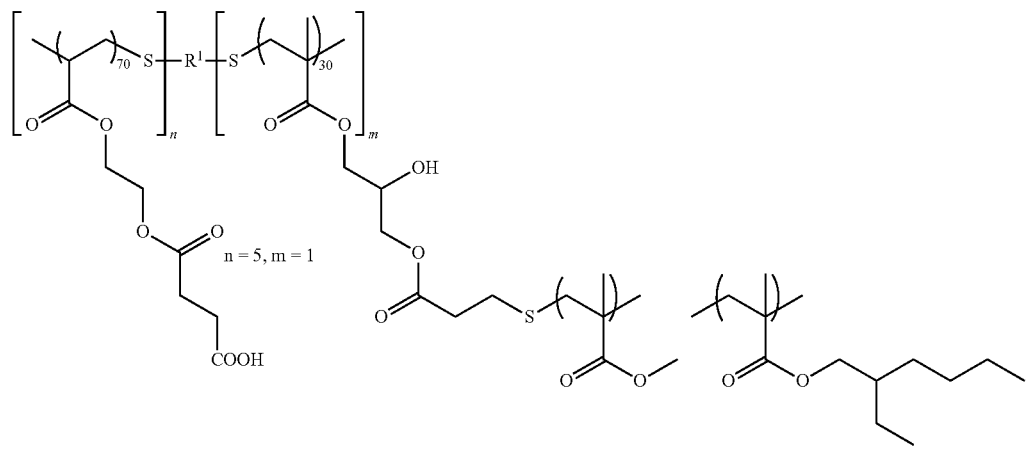
D-14
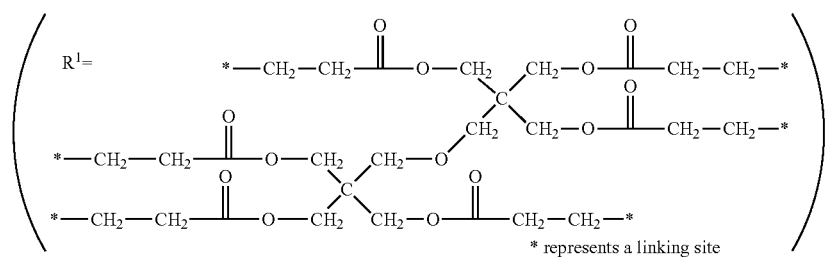
MMA/LMA = 28/72 wt %
EHMA = 2-Ethylexyl Methacrylate D-15
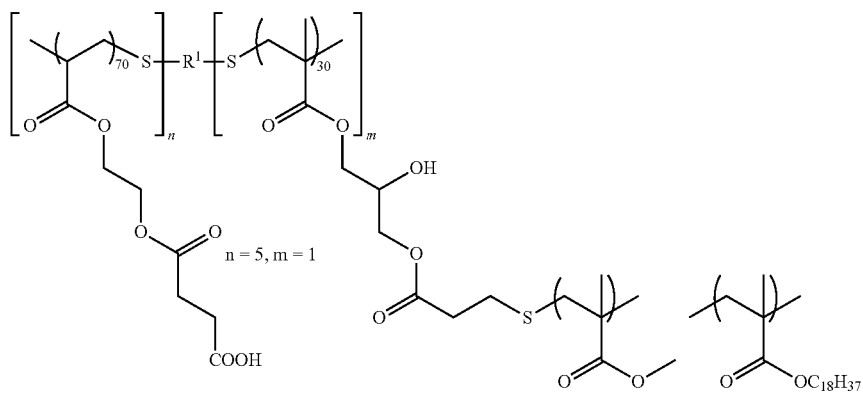
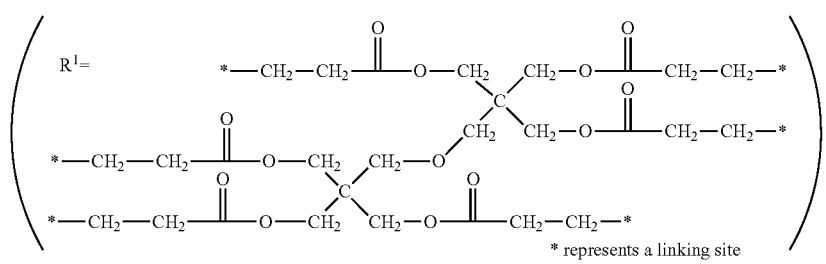
MMA/SMA = 40/60 wt %
SMA = Stearyl Methacrylate
D-16
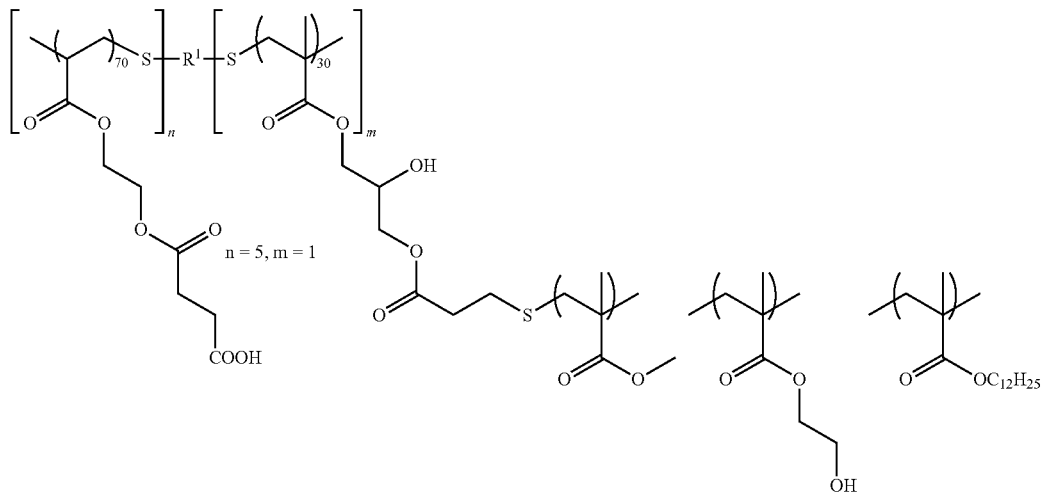
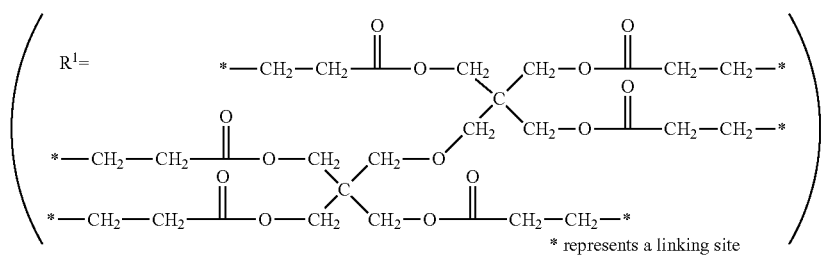
MMA/HEMA/LMA = 27/20/53 wt %
HEMA = Hydroxyethyl Methacrylate

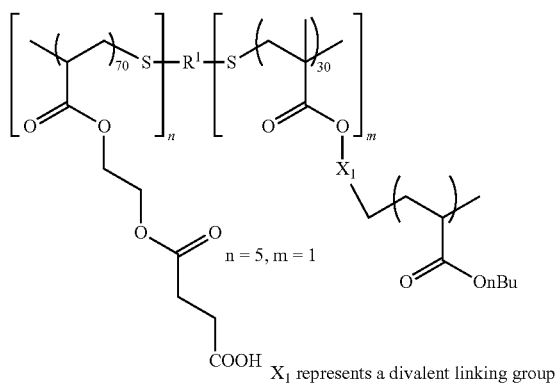
D-17
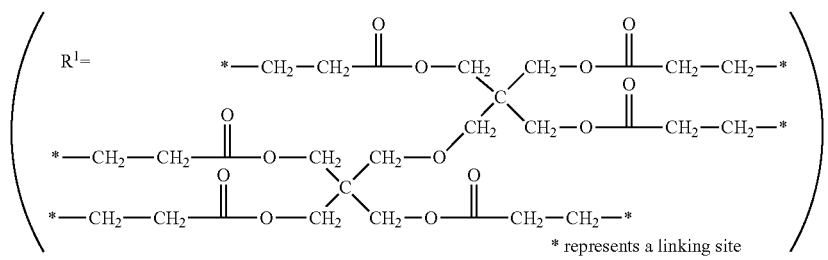
BA = 100 wt %
BA = Normal Butyl Acrylate
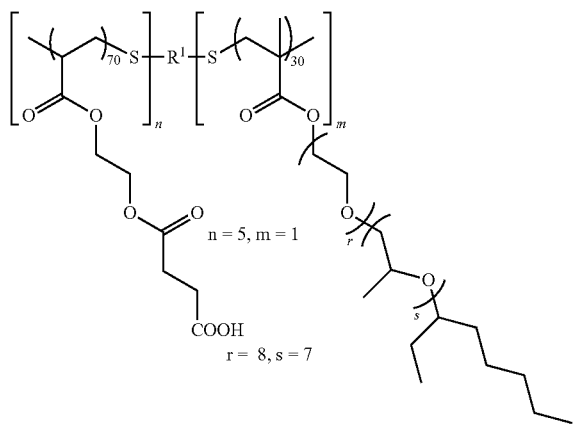
D-18
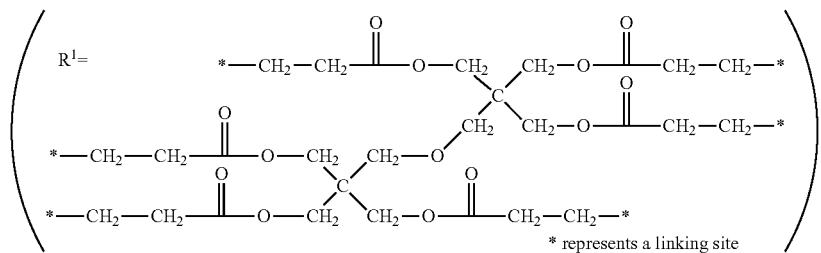

-continued
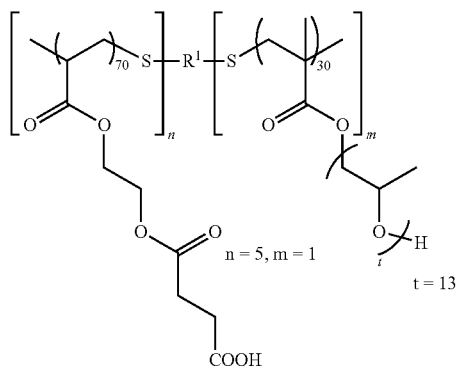
D-19
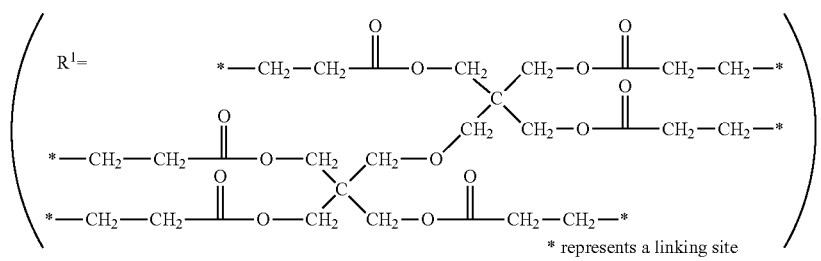
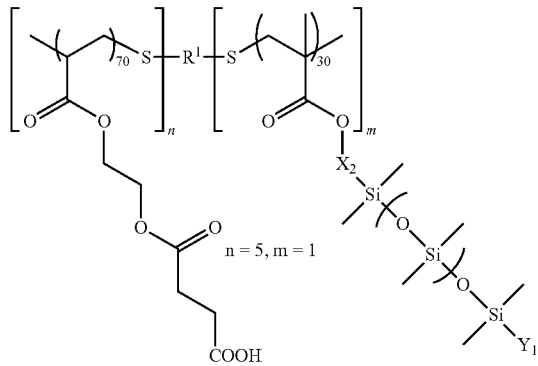
D-20
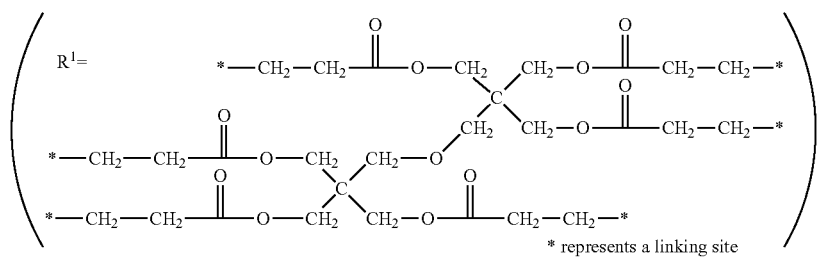
$X_2$ represents a divalent linking group, and $Y_1$ represents an organic group -continued
D-21
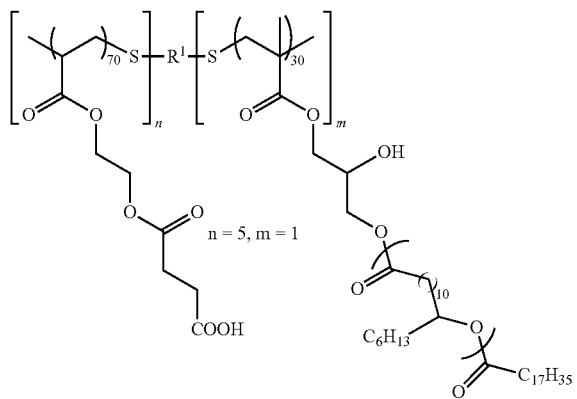
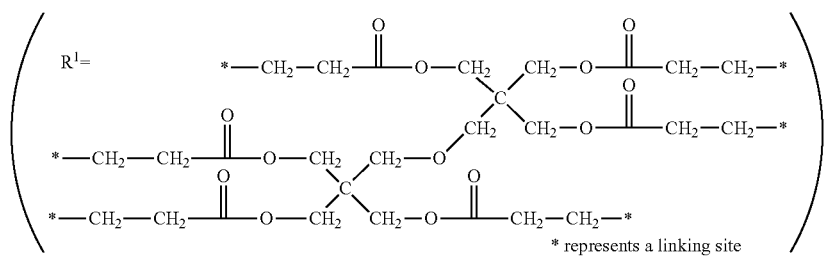
D-22
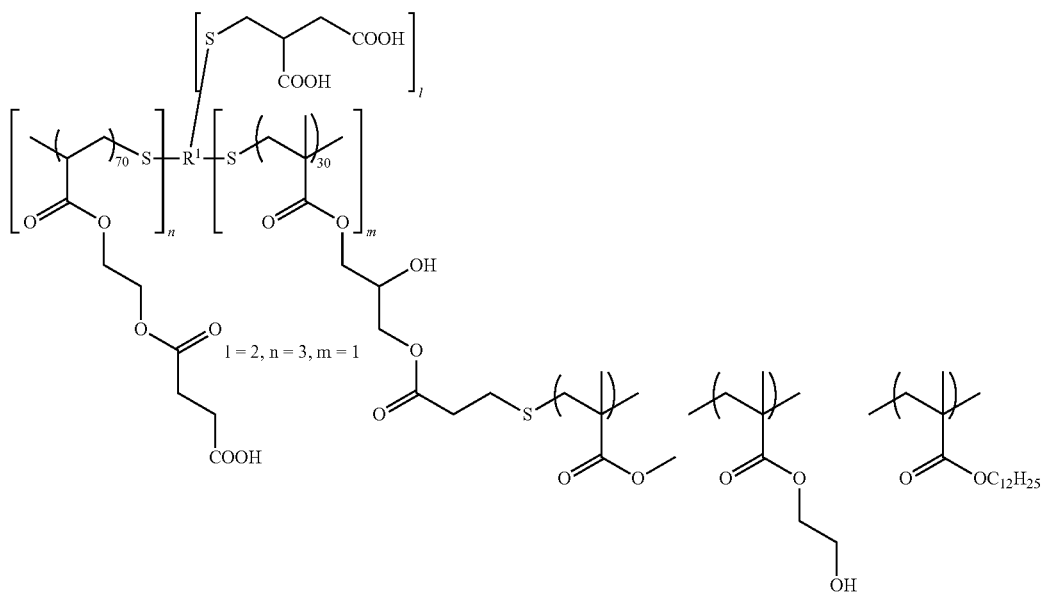
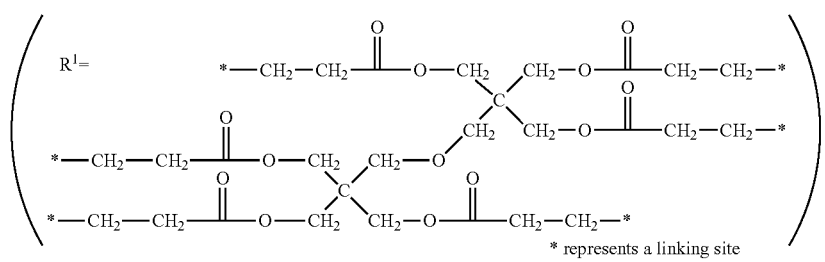
MMA/HEMA/LMA = 27/20/53 wt %

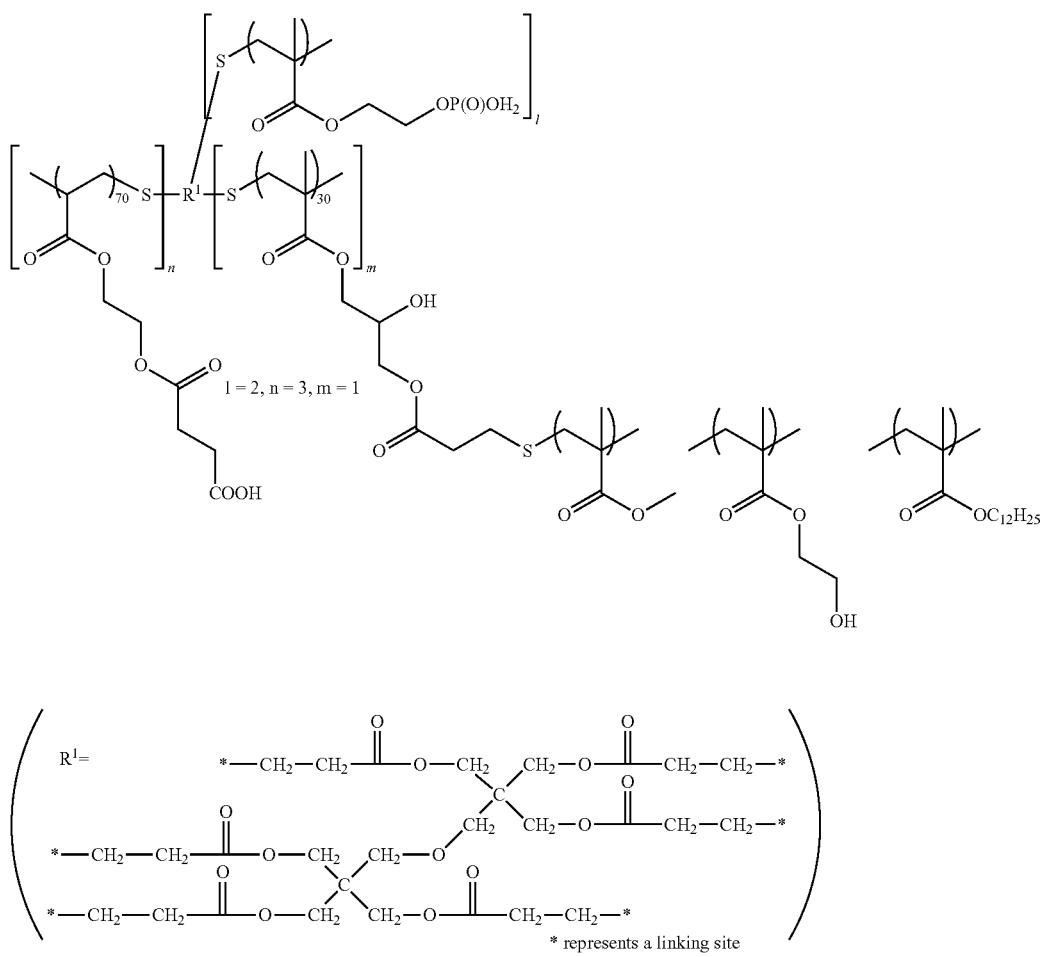
D-23
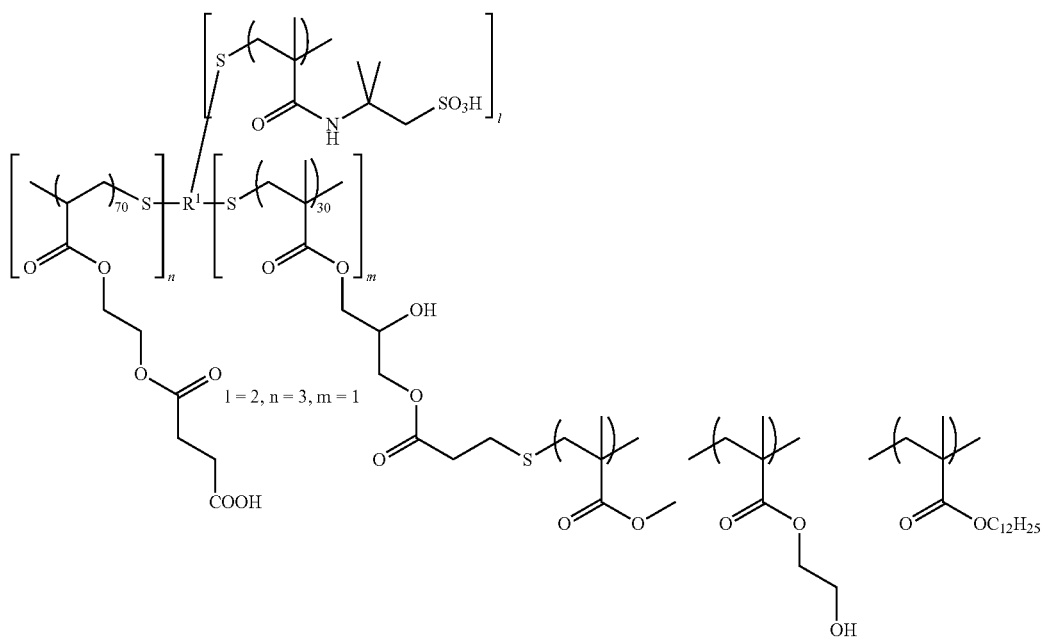
D-24

-continued
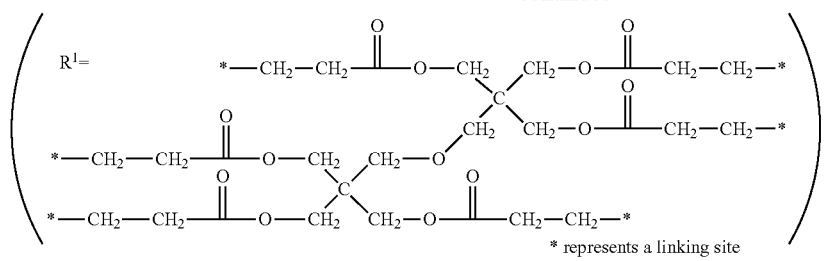
MMA/HEMA/LMA = 27/20/53 wt %
D-25
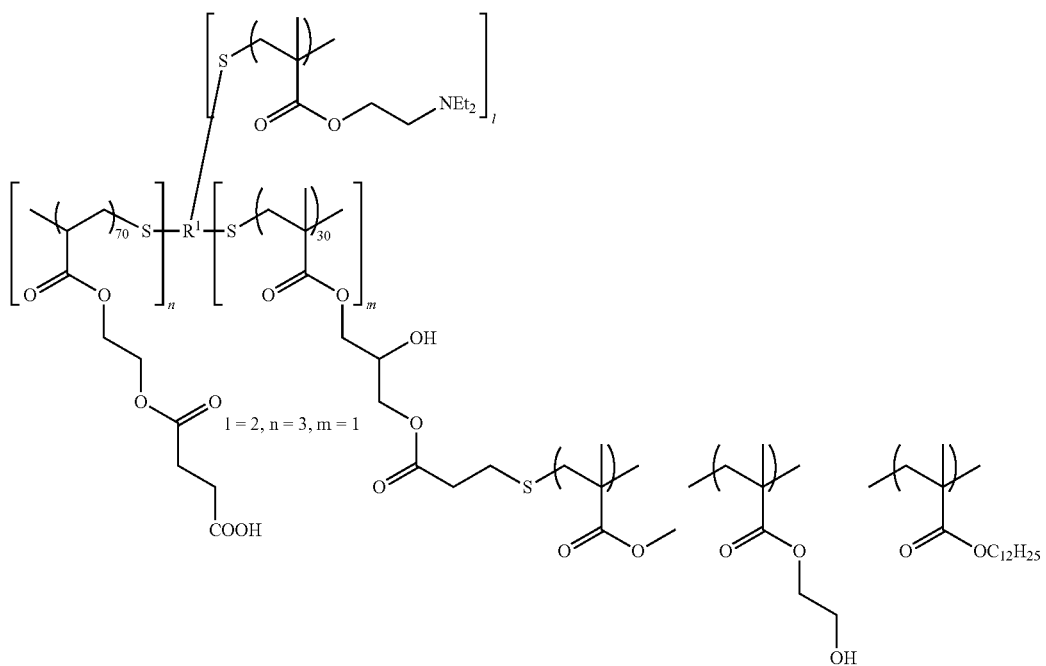
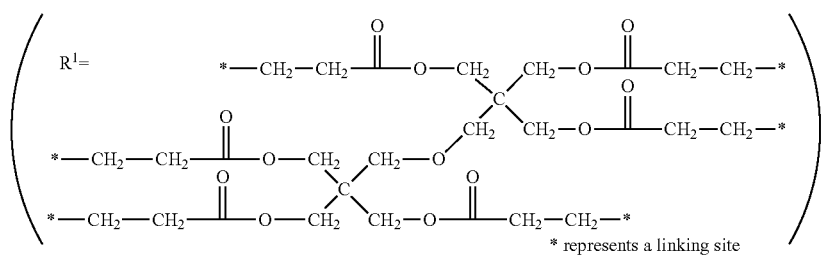
MMA/HEMA/LMA = 27/20/53 wt %

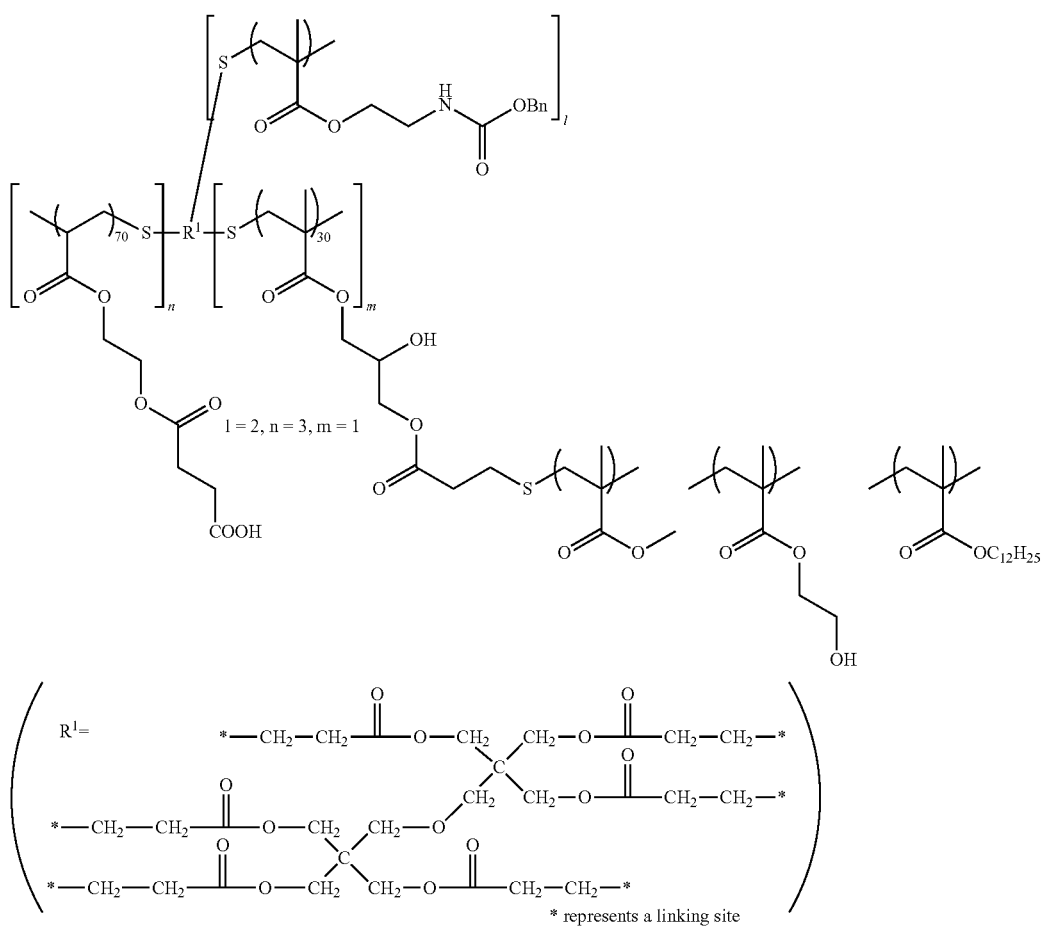
D-26
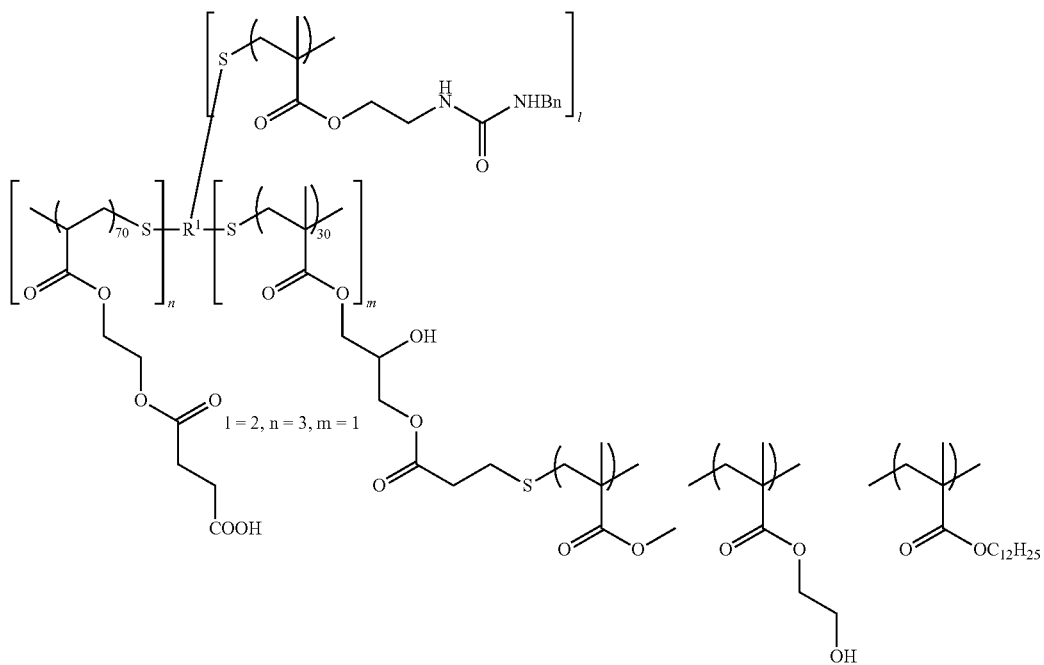
D-27

-continued
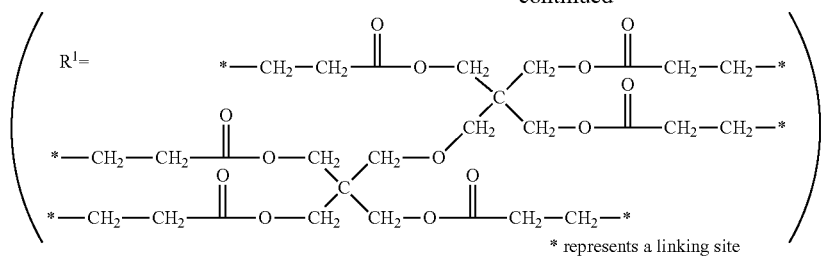
MMA/HEMA/LMA = 27/20/53 wt %
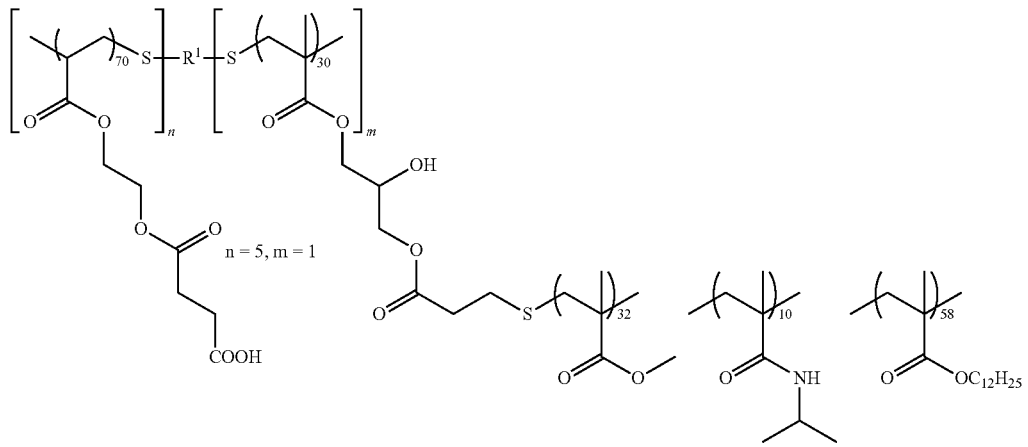
D-28
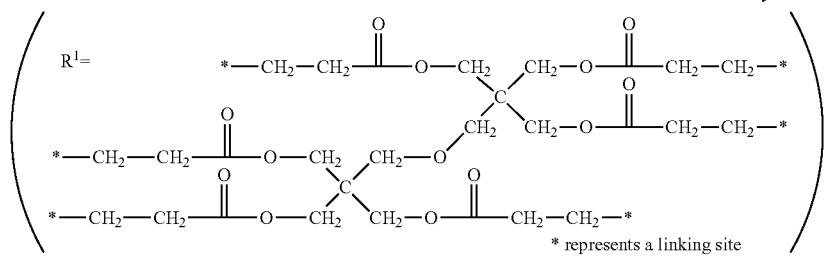
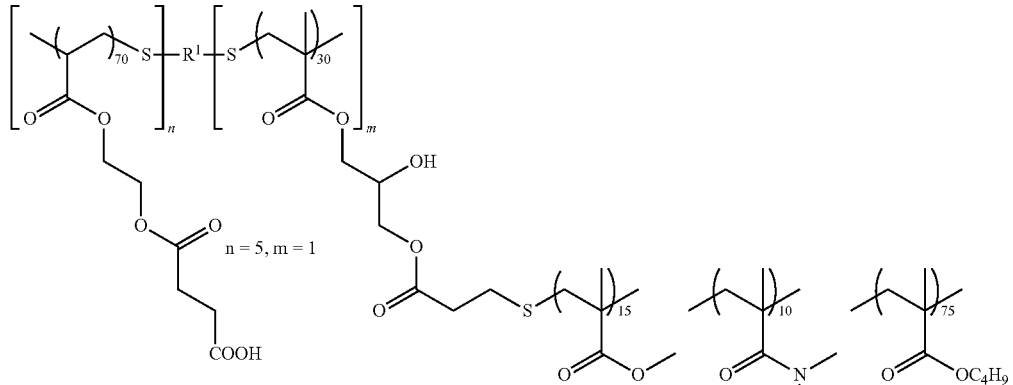
D-29
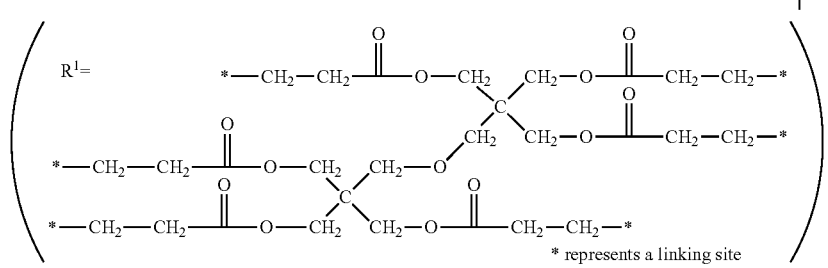

-continued
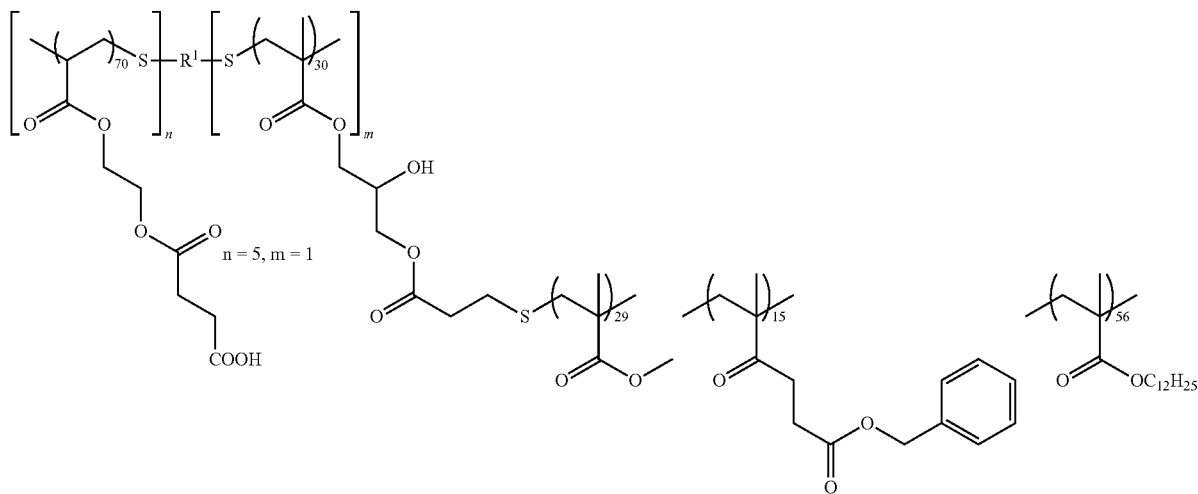
D-30
Component A
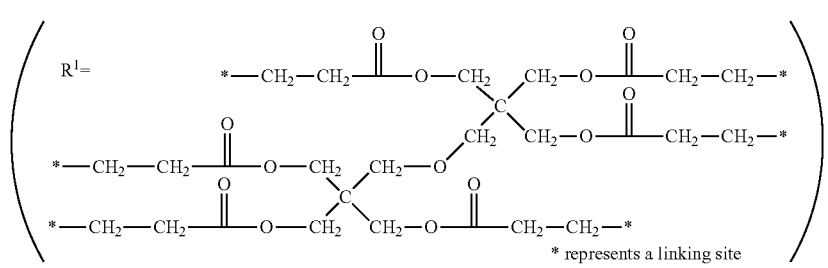
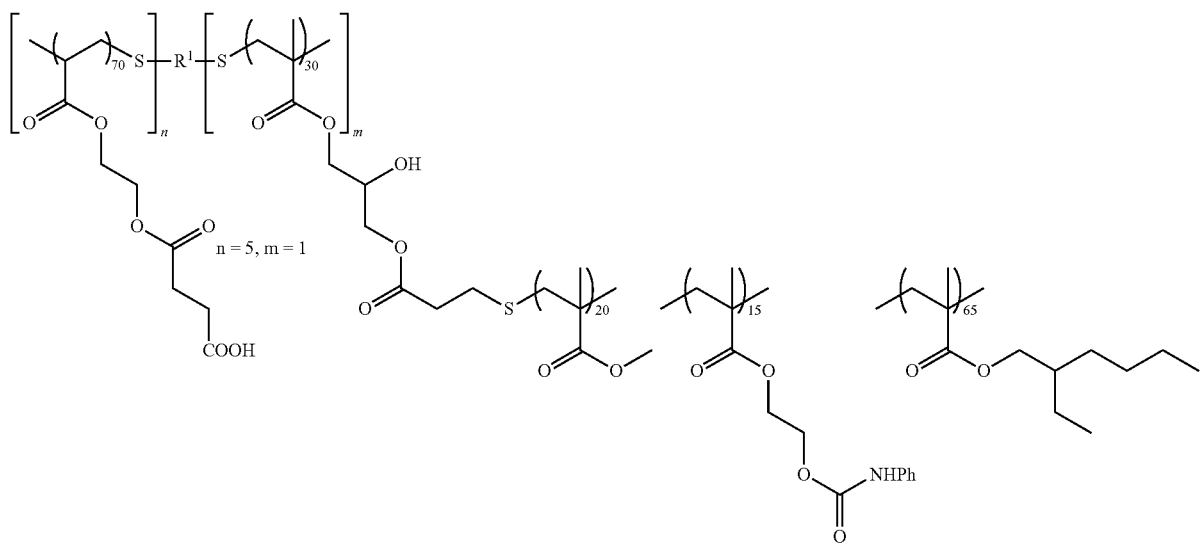
D-31
Component B
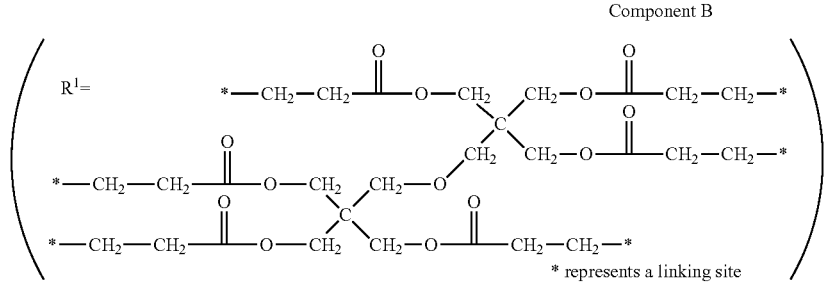

-continued
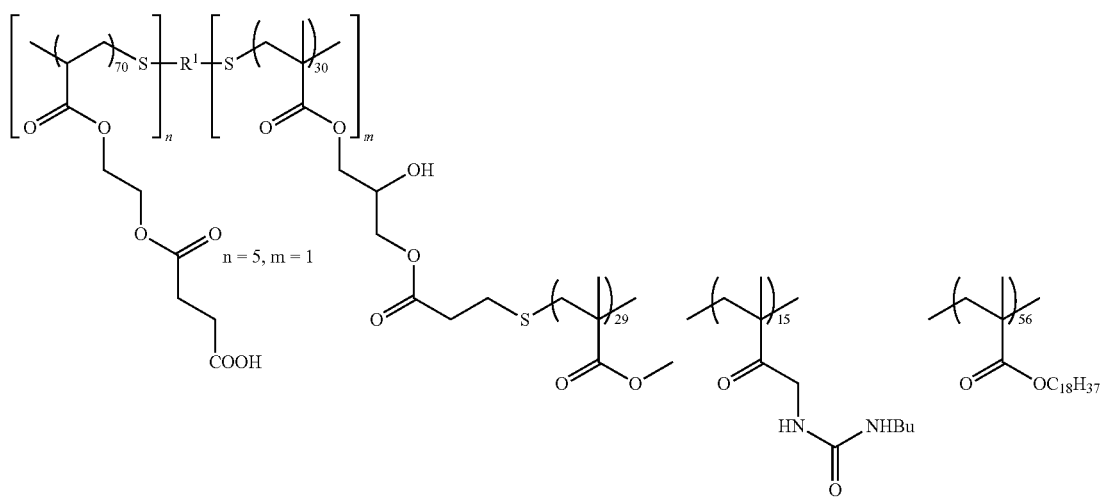
Component C
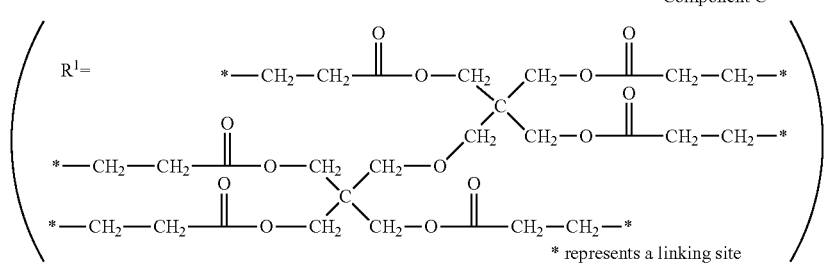
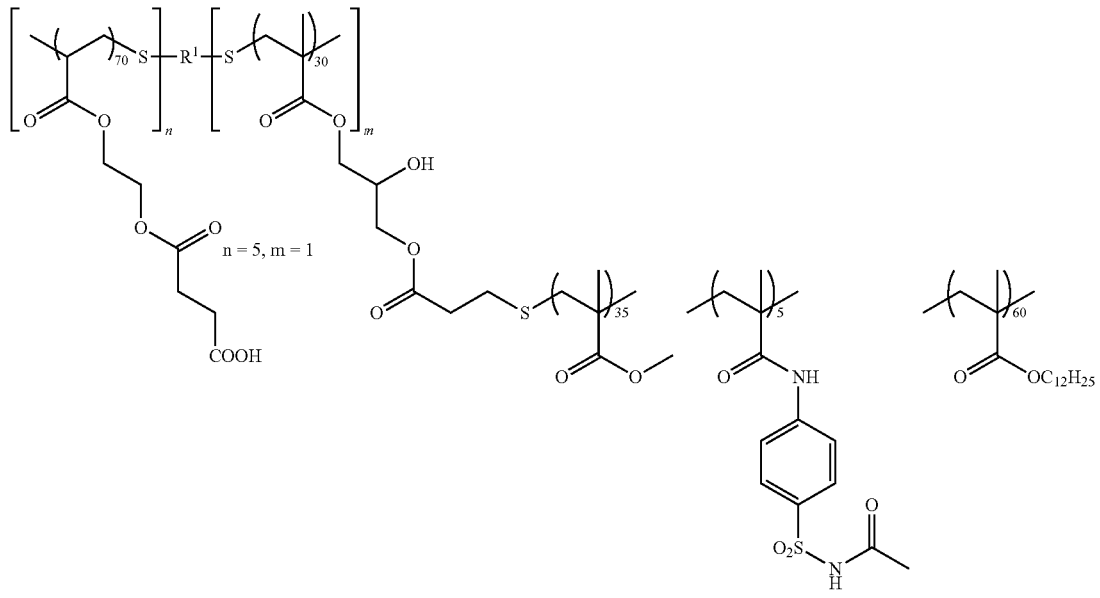
Component D
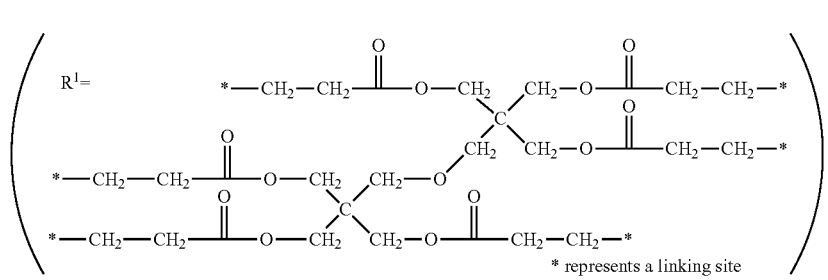

-continued
D-34
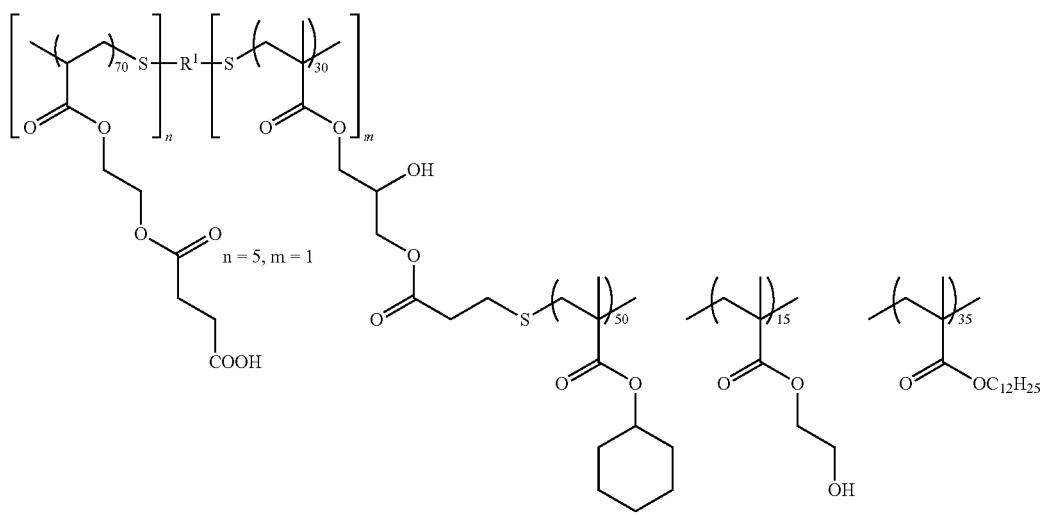
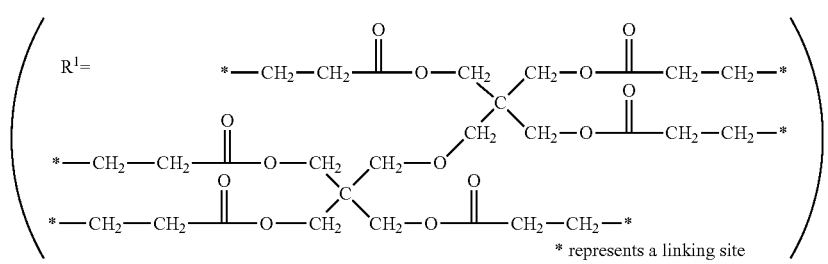
D-35
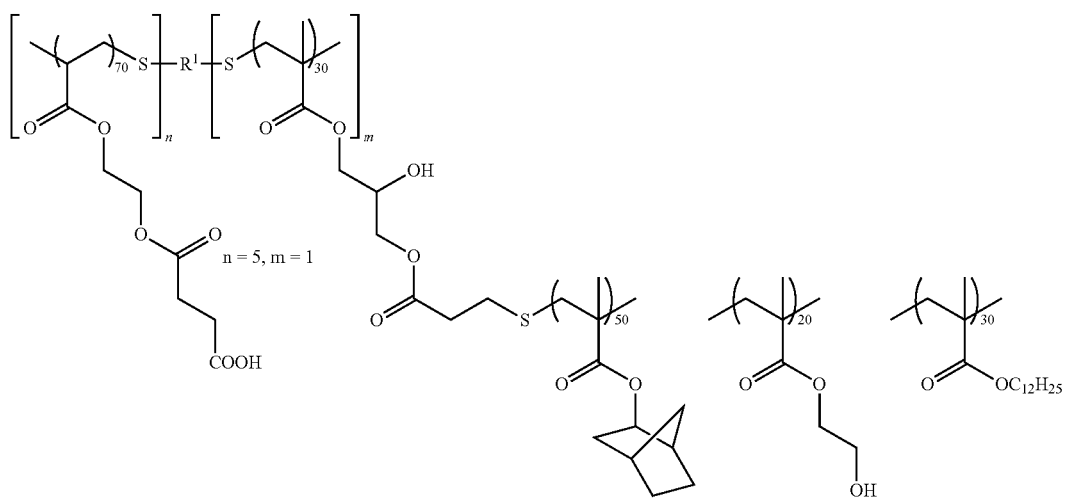
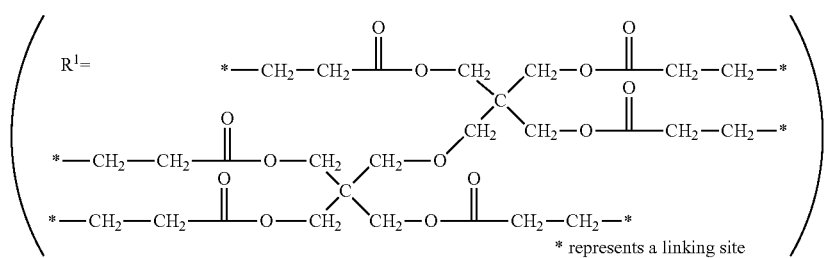

-continued
D-36
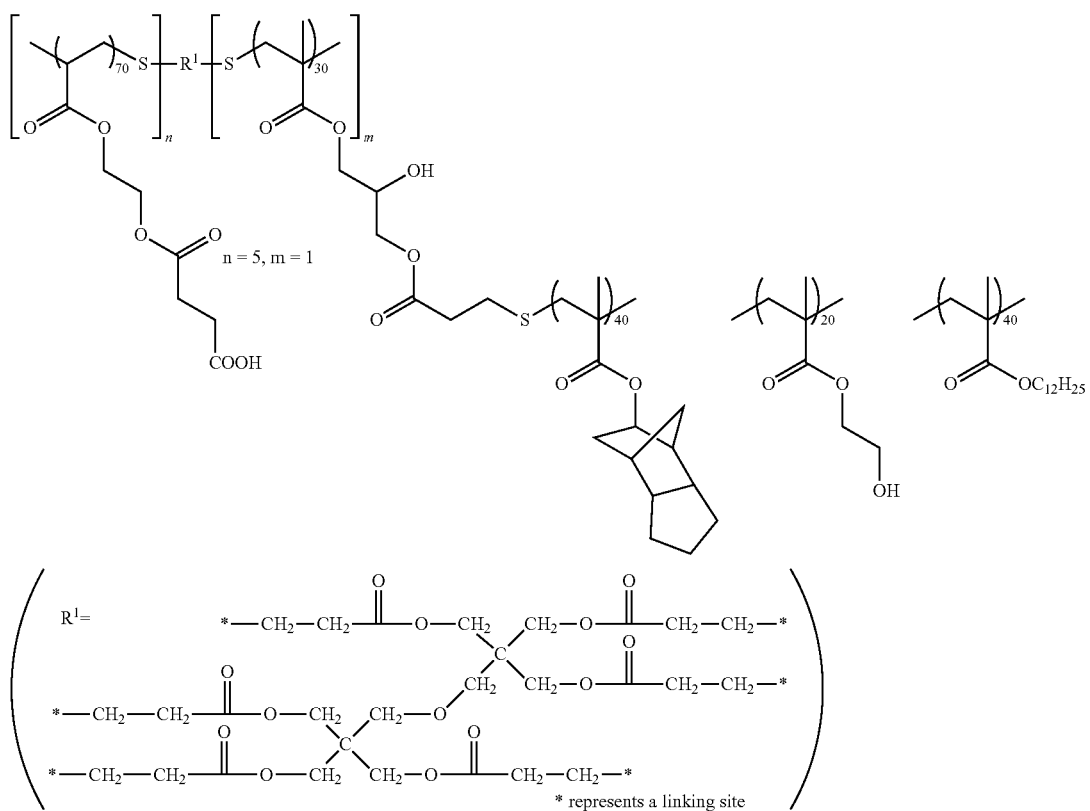
D-37
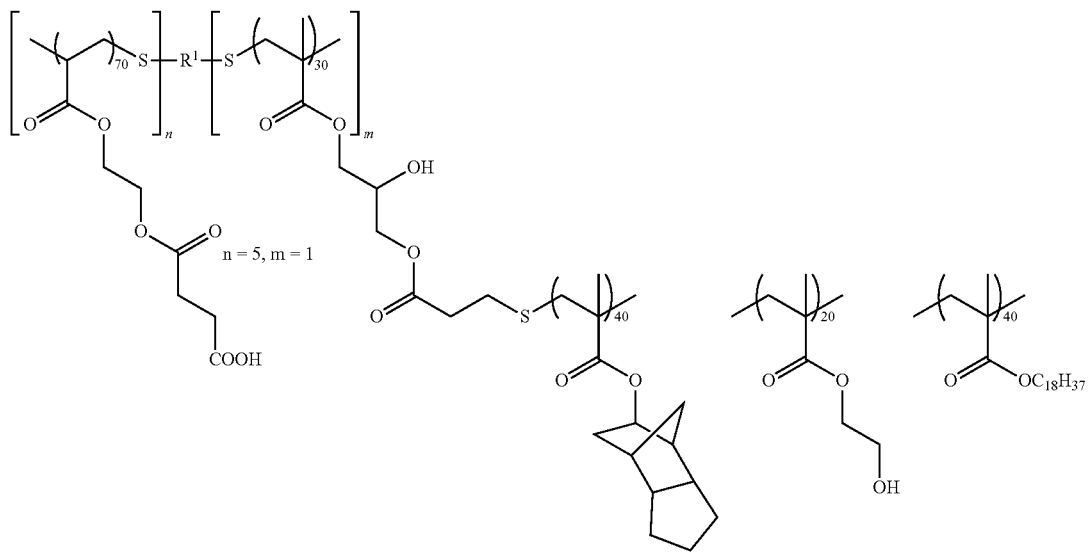
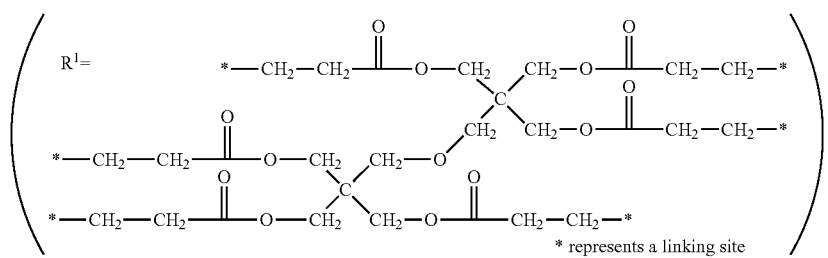

-continued
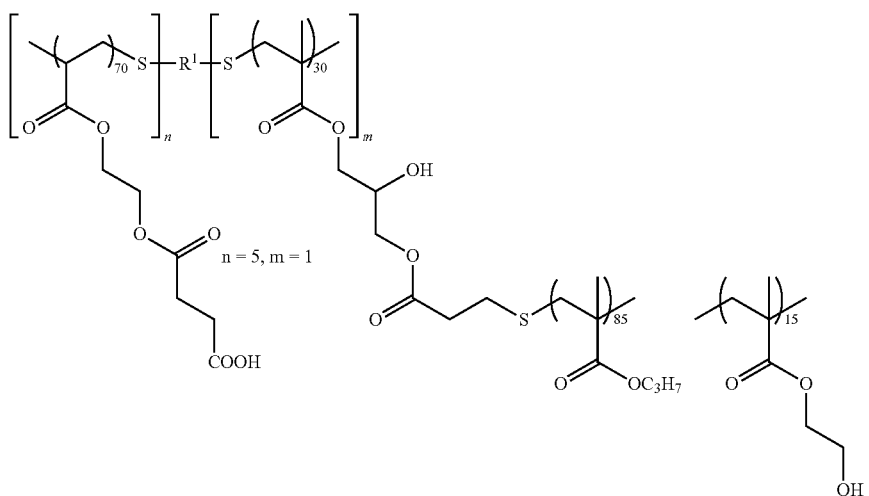
D-38
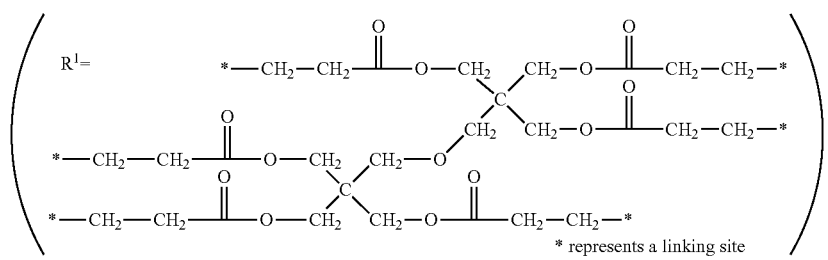
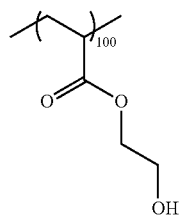
cD-01
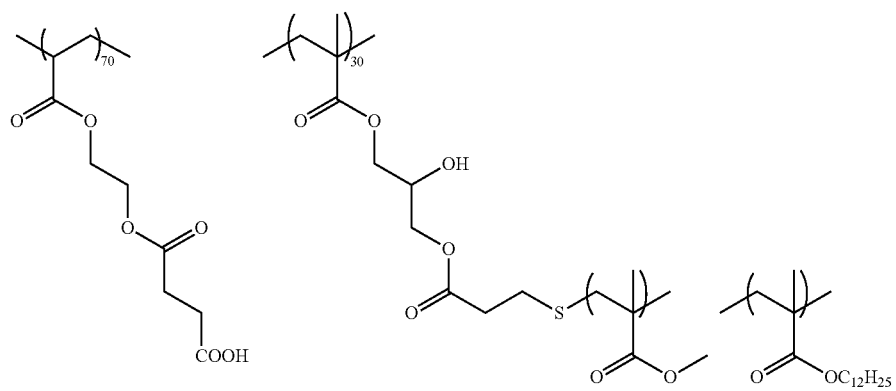
cD-02

-continued
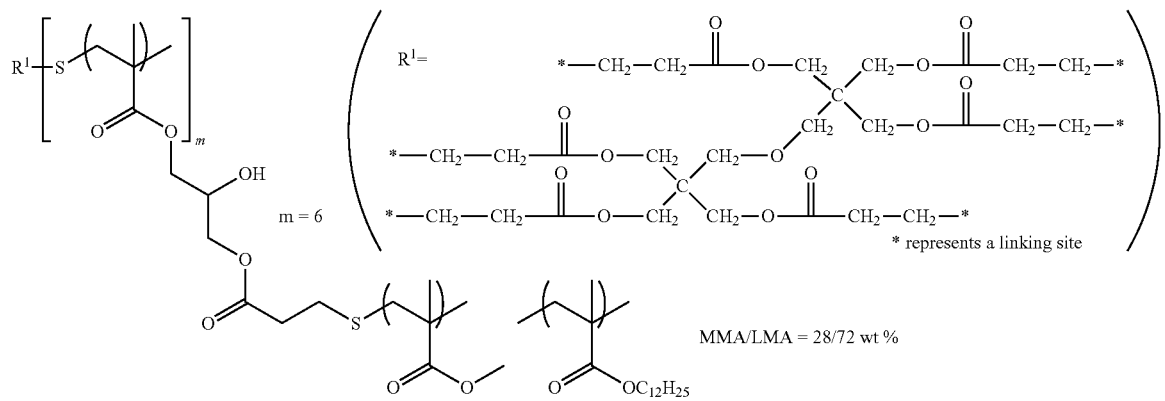
cD-03
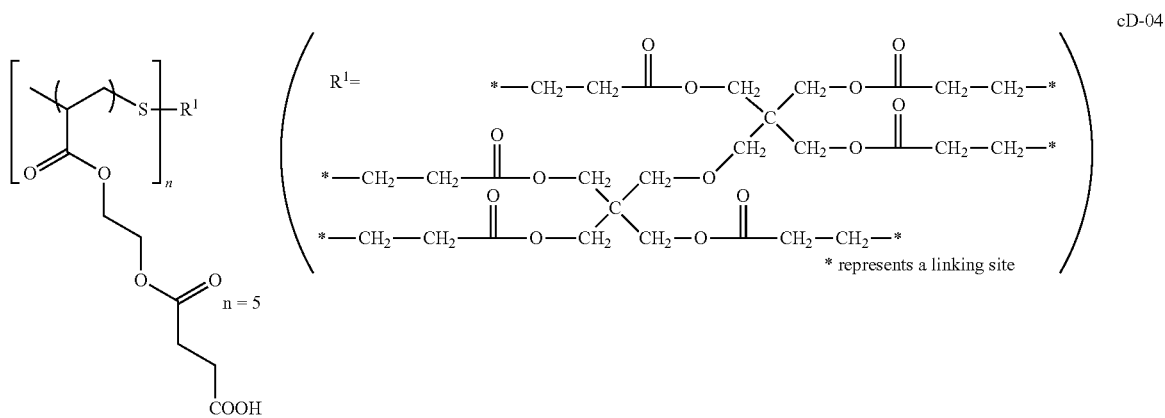
cD-04
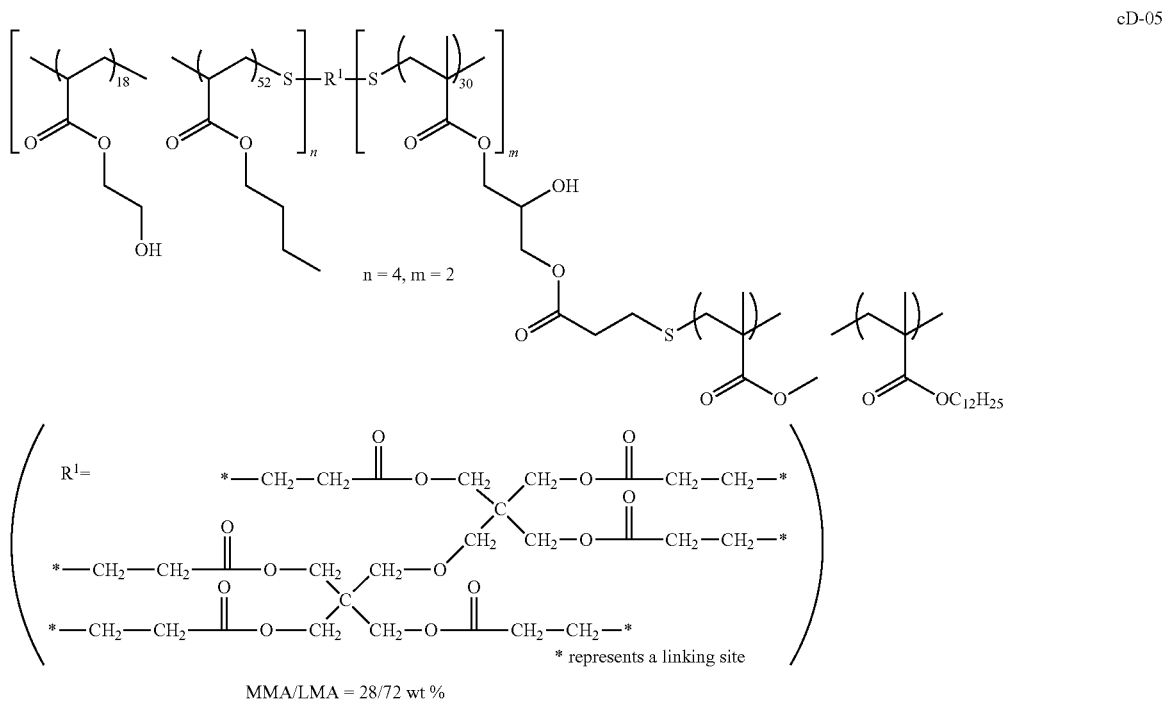
cD-05

Preparation Example 1: Preparation of Dispersion Liquid of Binder Particles D-01

First, a macromonomer solution was prepared. That is, toluene (269.0 g) was charged into a 1 L three-neck flask equipped with a stirrer, a thermometer, a reflux cooling pipe, and a nitrogen gas introduction pipe and was heated to 80° C. in a nitrogen stream. Next, a monomer solution consisting of methyl methacrylate (150.2 g), lauryl methacrylate (381.6 g), V-601 (5.3 g, an azo polymerization initiator, manufactured by Wako Pure Chemical Industries, Ltd.), and 3-mercaptopropionic acid (4.7 g) was added dropwise to the three-neck flask at a constant speed until the dropwise addition was completed after 2 hours. After completion of the dropwise addition of the monomer solution, the solution was stirred for 2 hours, was heated to 95° C., and was further stirred for 2 hours. Next, p-methoxyphenol (0.3 g), glycidyl methacrylate (31.8 g), and tetrabutylammonium bromide (6.4 g) were added to the obtained reaction mixture, and the solution was heated to 120° C. and was stirred for 3 hours. Next, the reaction solution was cooled to room temperature, was poured into methanol (2 L) under stirring, and was left to stand for a while. A solid obtained by decantation of the supernatant liquid was dissolved in heptane (1200 g), and the solvent was removed by distillation under reduced pressure until the solid content reached 40%. As a result, a macromonomer solution was obtained.

The number-average molecular weight of the macromonomer measured using the above-described measurement method was 10000.

Next, a macromonomer adduct solution was prepared. That is, the obtained macromonomer solution (287 g, solid content: 40%), dipentaerythritol hexakis(3-mercaptopropionate) (5.0 g), and toluene (305.0 g) were charged into a 2 L three-neck flask equipped with a stirrer, a thermometer, a reflux cooling pipe, and a nitrogen gas introduction pipe and were heated to 80° C. in a nitrogen stream. Next, V-601 (0.1 g) was added to the three-neck flask, and the solution was stirred for 2 hours. As a result, a macromonomer adduct solution was obtained (solid content: 20.0%).

The obtained macromonomer adduct was an adduct (m=2) obtained by a reaction of the macromonomer with two mercapto groups on average in dipentaerythritol hexakis (3-mercaptopropionate).

Using the macromonomer adduct solution obtained as described above, a dispersion liquid of the binder particles D-01 was prepared. That is, diisobutyl ketone (54.5 g) and the macromonomer adduct solution (225.0 g, solid content: 20.0%) were charged into a 1 L three-neck flask equipped with a stirrer, a thermometer, a reflux cooling pipe, and a nitrogen gas introduction pipe, and the solution was heated to 80° C. in a nitrogen stream. Next, a monomer solution consisting of hydroxyethyl acrylate (105.0 g), diisobutyl ketone (115.5 g), and V-601 (1.5 g) was added dropwise to the three-neck flask at a constant speed until the dropwise addition was completed after 2 hours. After completion of the dropwise addition of the monomer solution, the solution was stirred for 2 hours, was heated to 90° C., and was further stirred for 2 hours. The obtained reaction mixture was filtered through a mesh having a pore size of 50 μm. This way, a dispersion liquid of the binder particles D-01 having a solid content concentration of 30 mass % was prepared.

Preparation Examples 2 to 21 and 38: Preparation of Dispersion Liquids of Binder Particles D-02 to D-21 and D-38

Dispersion liquids of binder particles D-02 to D-21 and D-38 were prepared using the same method as that of Preparation Example 1, except that hydroxyethyl acrylate and/or the macromonomer adduct solution were changed to the polymerizable compound forming the polymer chain $P^1$, the thiol compound (compound represented by (Formula 2)), and/or the macromonomer corresponding to each of the resins D-02 to D-21 and D-38 shown in the above-described chemical formulae were used and optionally the amounts thereof used were changed.

The macromonomer solution and the macromonomer adduct solution used for the preparation of each of the dispersion liquids of the binder particles were prepared using the same methods as those of the macromonomer solution and the macromonomer adduct solution used for the preparation of the dispersion liquid of the binder particles D-01.

During the preparation of the dispersion liquid of the binder particles D-17, Macromonomer AB-6 (trade name, manufactured by Toagosei Co., Ltd.) was used as the macromonomer. During the preparation of the dispersion liquid of the binder particles D-18, BLEMMER 50POEP-800B (trade name, manufactured by NOF Corporation) was used as the macromonomer. During the preparation of the dispersion liquid of the binder particles D-19, BLEMMER PP-800 (trade name, manufactured by NOF Corporation) was used as the macromonomer. During the preparation of the dispersion liquid of the binder particles D-20, a methacrylic modified silicone oil: KF-2012 (trade name, manufactured by Shin-Etsu Chemical Co., Ltd.) was used as the macromonomer. Further, during the preparation of the dispersion liquid of the binder particles D-21, a macromonomer synthesized by a reaction of a condensate of 12-hydroxystearic acid and glycidyl methacrylate according to a method described in JP2015-088486A was used as the macromonomer.

The number-average molecular weight of the macromonomer in each of the dispersion liquids is shown in Table 2.

Preparation Example 22: Preparation of Dispersion Liquid of Binder Particles D-22

A macromonomer solution was prepared as follows. That is, toluene (269.0 g) was charged into a 1 L three-neck flask equipped with a stirrer, a thermometer, a reflux cooling pipe, and a nitrogen gas introduction pipe and was heated to 80° C. in a nitrogen stream. Next, a monomer solution consisting of methyl methacrylate (135.0 g), lauryl methacrylate (297.0 g), hydroxyethyl methacrylate (103.1 g), V-601 (5.3 g), and mercaptopropionic acid (4.7 g) was added dropwise to the three-neck flask at a constant speed until the dropwise addition was completed after 2 hours. After completion of the dropwise addition of the monomer solution, the solution was stirred for 2 hours, was heated to 95° C., and was further stirred for 2 hours. Next, p-methoxyphenol (0.3 g), glycidyl methacrylate (31.8 g), and tetrabutylammonium bromide (6.4 g) were added to the obtained reaction mixture, and the solution was heated to 120° C. and was stirred for 3 hours. Next, the reaction solution was cooled to room temperature, was poured into methanol (2 L) under stirring, and was left to stand for a while. A solid obtained by decantation of the supernatant liquid was dissolved in butyl butyrate (540 g), and the solvent was removed by distillation under reduced pressure. As a result, a macromonomer solution was obtained. The solid content of the obtained macromonomer solution was 42%.

The number-average molecular weight of the macromonomer is shown in Table 2.

Next, a macromonomer adduct solution was prepared. That is, the obtained macromonomer solution (274 g, solid content: 42%), dipentaerythritol hexakis(3-mercaptopropionate) (10.0 g), toluene (340 g), and itaconic acid (3.3 g) were charged into a 2 L three-neck flask equipped with a stirrer, a thermometer, a reflux cooling pipe, and a nitrogen gas introduction pipe and were heated to 80° C. in a nitrogen stream. Next, V-601 (0.3 g) was added to the three-neck flask, and the solution was stirred for 2 hours. As a result, a macromonomer adduct solution was obtained.

Further, a dispersion liquid of binder particles D-22 was prepared using the same method as that of Preparation Example 1 (the preparation of the dispersion liquid of the binder particles D-1), except that hydroxyethyl acrylate was changed to the polymerizable compound (mono(2-acryloyloxyethyl) succinate) forming the polymer chain $P^1$ corresponding to the resin D-22 shown in the above-described chemical formula.

Preparation Examples 23 to 27: Preparation of Dispersion Liquids of Binder Particles D-23 to D-27

Dispersion liquids of binder particles D-23 to D-27 were prepared using the same method as that of the preparation example 22, except that itaconic acid was changed to the polymerizable compound including $A^2$ and $R^6$ corresponding to each of the resins D-23 to D-27 shown in the above-described chemical formulae and the amount used was adjusted such that a molar ratio thereof was the same as that of itaconic acid in Preparation Example 22.

The number-average molecular weight of the macromonomer in each of the dispersion liquids is shown in Table 2.

Preparation Examples 28 to 37: Preparation of Dispersion Liquids of Binder Particles D-28 to D-37

Dispersion liquids of binder particles D-28 to D-37 were prepared using the same method as that of Preparation Example 1, except that hydroxyethyl acrylate and/or the macromonomer were changed to the polymerizable compound forming the polymer chain $P^1$, and the macromonomer corresponding to each of the resins D-28 to D-37 shown in the above-described chemical formulae were used and optionally the amounts thereof used were changed.

The macromonomer solution and the macromonomer adduct solution used for the preparation of each of the dispersion liquids of the binder particles were prepared using the same methods as those of the macromonomer solution and the macromonomer adduct solution used for the preparation of the dispersion liquid of the binder particles D-01.

Comparative Preparation Example 1: Preparation of Dispersion Liquid of Binder Particles cD-01

Diisobutyl ketone (138.5 g) was charged into a 1 L three-neck flask equipped with a stirrer, a thermometer, a reflux cooling pipe, and a nitrogen gas introduction pipe and was heated to 80° C. in a nitrogen stream. Next, a monomer solution consisting of hydroxyethyl acrylate (100.0 g), diisobutyl ketone (95.5 g), and V-601 (1.0 g) was added dropwise to the three-neck flask at a constant speed until the dropwise addition was completed after 2 hours. After completion of the dropwise addition of the monomer solution, the solution was stirred for 2 hours, was heated to 90° C., and was further stirred for 2 hours.

However, a dispersion liquid was not able to be prepared because the synthesized resin (binder particles) aggregated.

Comparative Preparation Example 2: Preparation of Dispersion Liquid of Binder Particles cD-02

Toluene (269.0 g) was charged into a 1 L three-neck flask equipped with a stirrer, a thermometer, a reflux cooling pipe, and a nitrogen gas introduction pipe and was heated to 80° C. in a nitrogen stream. Next, a monomer solution consisting of methyl methacrylate (150.2 g), lauryl methacrylate (381.6 g), V-601 (5.3 g), and mercaptopropionic acid (4.7 g) was added dropwise to the three-neck flask at a constant speed until the dropwise addition was completed after 2 hours. After completion of the dropwise addition of the monomer solution, the solution was stirred for 2 hours, was heated to 95° C., and was further stirred for 2 hours. Next, p-methoxyphenol (0.3 g), glycidyl methacrylate (31.8 g), and tetrabutylammonium bromide (6.4 g) were added to the obtained reaction mixture, and the solution was heated to 120° C. and was stirred for 3 hours. Next, the reaction solution was cooled to room temperature, was poured into methanol (2 L) under stirring, and was left to stand for a while. A solid obtained by decantation of the supernatant liquid was dissolved in heptane (1200 g), and the solvent was removed by distillation under reduced pressure until the solid content reached 40%. As a result, a macromonomer solution was obtained. The number-average molecular weight of the macromonomer is shown in Table 2.

Next, diisobutyl ketone (167 g) and the macromonomer solution (112.5 g, solid content: 40.0%) were charged into a 1 L three-neck flask equipped with a stirrer, a thermometer, a reflux cooling pipe, and a nitrogen gas introduction pipe, and the solution was heated to 80° C. in a nitrogen stream. Next, a monomer solution consisting of mono(2-acryloyloxyethyl) succinate (105.0 g), diisobutyl ketone (115.5 g), and V-601 (1.5 g) was added dropwise to the three-neck flask at a constant speed until the dropwise addition was completed after 2 hours. After completion of the dropwise addition of the monomer solution, the solution was stirred for 2 hours, was heated to 90° C., and was further stirred for 2 hours. The obtained reaction mixture was filtered through a mesh having a pore size of 50 μm. This way, a dispersion liquid of the binder particles cD-02 having a solid content concentration of 30 mass % was prepared.

Comparative Preparation Example 3: Preparation of Dispersion Liquid of Binder Particles cD-03

A solution of binder particles cD-03 was prepared using the same method as that of Preparation Example 1, except that 2-hydroxyethyl acrylate was not used and the amount of the macromonomer adduct used was adjusted such that the solid content concentration was 30%. In Comparative Preparation Example 3, the synthesized resin was dissolved in the dispersion medium, and a dispersion liquid was not able to be prepared.

Comparative Preparation Example 4: Preparation of Dispersion Liquid of Binder Particles cD-04

Diisobutyl ketone (55.0 g) and dipentaerythritol hexakis (3-mercaptopropionate) (0.2 g) were charged into a 500 mL three-neck flask equipped with a stirrer, a thermometer, a reflux cooling pipe, and a nitrogen gas introduction pipe, and the solution was heated to 80° C. in a nitrogen stream. Next, a monomer solution consisting of mono(2-acryloyloxyethyl) succinate (40.0 g), diisobutyl ketone (38.0 g), and V-601 (0.4 g) was added dropwise to the three-neck flask at a constant speed until the dropwise addition was completed after 2 hours. After completion of the dropwise addition of the monomer solution, the solution was stirred for 2 hours, was heated to 90° C., and was further stirred for 2 hours. However, a dispersion liquid was not able to be prepared because the synthesized resin (binder particles) aggregated.

Comparative Preparation Example 5: Preparation of Dispersion Liquid of Binder Particles cD-05

A solution of binder particles cD-05 was prepared using the same method as that of Preparation Example 2, except that the amount (polymerization ratio) of 2-hydroxyethyl acrylate and butyl acrylate used was changed to 25:75 by mass ratio. In Comparative Preparation Example 5, the synthesized resin was dissolved in the dispersion medium, and a dispersion liquid was not able to be prepared.

<Method of Calculating SP (Solubility Parameter) Value>

The SP value of the polymer chain of each of the binder particles or the component forming the polymer chain was calculated using the above-described method. The results are shown in Table 1.

TABLE 1

| Polymerizable Compound | SP Value | Polymerizable Compound | SP Value |
|---|---|---|---|
| MMA (Methyl Methacrylate) | 19.5 | BA (Butyl Acrylate) | 18.4 |
| BzMA (Benzyl Methacrylate) | 20.2 | BzA (Benzyl Acrylate) | 21.1 |
| CyHMA (Cyclohexyl Methacrylate) | 19.1 | HEA (Hydroxyethyl Acrylate) | 23.5 |
| HEMA (Hydroxyethyl Methacrylate) | 22.9 | AA (Acrylic Acid) | 25.5 |
| MAA (Methyl Acrylate) | 24.0 | MeOEA (Methoxyethyl Acrylate) | 20.0 |
| EA (Ethyl Acrylate) | 19.1 | AEHS (Mono(2-Acryloyloxyethyl) Succinate) | 23.1 |
| LMA (Lauryl Methacrylate) | 17.3 | SMA (Stearyl Methacrylate) | 17.1 |
| EHMA (Ethylhexyl Methacrylate) | 17.3 | N-Isopropylmethacrylamide | 25.0 |
| N,N-Dimethylacrylamide | 25.7 | Polymerizable Compound Forming Component A | 25.4 |
| Polymerizable Compound Forming Component B | 26.2 | Polymerizable Compound Forming Component C | 25.3 |
| Polymerizable Compound Forming Component D | 36.4 | Cyclohexyl Methacrylate | 19.1 |
| Norbornyl Methacrylate | 18.1 | Dicyclopentanyl Methacrylate | 18.4 |

Regarding each of the prepared binder particles or the dispersion liquids thereof, the following respective tests were performed, and the results thereof were shown in Table 2 or 3.

<Measurement of Amount of Dissolved Component>

The amount of dissolved components (the content of unreacted polymerizable compounds and the like) in each of the prepared binder particles was evaluated. That is, the dispersion liquid of the binder particles was diluted to 1% with diisobutyl ketone, and centrifugal separation was performed using a ultracentrifuge (himacCS-150FNX (trade name), manufactured by Hitachi Koki Co., Ltd.) under conditions of rotation speed: 100,000 rpm, temperature: 20° C., and 1 hour to collect the obtained supernatant liquid. Regarding the supernatant liquid, the residual amount of monomers (the amount of dissolved components) was determined by gel permeation chromatography (GPC) and high-performance liquid chromatography (HPLC) and was determined based on the following evaluation standards.

In this test, an evaluation standard of "D" or higher is an acceptable level. mass % represents a mass ratio relative to the total amount of the binder solid content.

-Evaluation Standards-
A: the amount of dissolved components was 5 mass % or lower
B: the amount of dissolved components was higher than 5 mass % and 10 mass % or lower
C: the amount of dissolved components was higher than 10 mass % and 15 mass % or lower
D: the amount of dissolved components was higher than 15 mass % and 25 mass % or lower
E: the amount of dissolved components was higher than 25 mass % and 30 mass % or lower
F: the amount of dissolved components was higher than 30 mass %

<Measurement of Average Particle Size of Binder Particles>

The average particle size of the binder particles was measured in the following order. Using the dispersion liquid of the binder particles prepared as described above and diisobutyl ketone, an 0.1 mass % dispersion liquid was prepared. This dispersion liquid sample was irradiated with 1 kHz ultrasonic waves for 10 minutes, and the volume average particle size of the binder particles was measured using a laser diffraction/scattering particle size distribution analyzer LA-920 (trade name, manufactured by Horiba Ltd.).

<Measurement of Mass Average Molecular Weight>

The mass average molecular weight of the resin forming the binder particles was measured using the above-described method (condition 1).

<Measurement Method of Glass Transition Temperature (Tg)>

The glass transition temperature (Tg) of the resin forming the binder particles was measured using the above-described method.

<Method of Calculating SP Value of Macromonomer>

The SP value of the macromonomer was calculated based on the mass ratio (mass %) between monomer components in the polymer chain.

Synthesis Example 1: Synthesis of Sulfide-Based Inorganic Solid Electrolyte

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, put into an agate mortar, and mixed using an agate muddler for five minutes. The mixing ratio between $Li_2S$ and $P_2S_5$($Li_2S:P_2S_5$) was set to 75:25 in terms of molar ratio.

66 zirconia beads having a diameter of 5 mm were put into a 45 mL zirconia container (manufactured by Fritsch Japan Co., Ltd.), the full amount of the mixture of the lithium sulfide and the diphosphorus pentasulfide was put thereinto, and the container was completely sealed in an argon atmosphere. The container was set in a planetary ball mill P-7 (trade name; manufactured by Fritsch Japan Co., Ltd.), mechanical milling was carried out at a temperature of 25° C. and a rotation speed of 510 rpm for 20 hours. As a result, 6.20 g of a yellow powder of a sulfide-based inorganic solid electrolyte (Li/P/S-based glass; hereinafter, referred to as LPS) was obtained.

Example 1

In Example 1, using a solid electrolyte composition prepared using the dispersion liquid of the binder particles D-01, a sheet for an all-solid state secondary battery and an all-solid state secondary battery having a layer configuration shown in FIG. 1 were prepared, and the performance thereof was evaluated. The results are shown in Table 2.

<Preparation of Solid Electrolyte Composition D-01>

180 zirconia beads having a diameter of 5 mm were put into a 45 mL zirconia container (manufactured by Fritsch Japan Co., Ltd.), and 9.5 g of LPS synthesized as described above and 12.3 g of butyl butyrate as a dispersion medium were put thereinto. Next, 0.5 g (corresponding to the solid content) of the dispersion liquid of the binder particles D-01 was put into the container, and the container was set in a planetary ball mill P-7 (trade name, manufactured by Fritsch Japan Co., Ltd.). The components were mixed at a temperature of 25° C. and a rotation speed of 300 rpm for 3 hours. As a result, a solid electrolyte composition D-01 was prepared.

<Preparation of Positive Electrode Sheet D-01 for all-Solid State Secondary Battery>

180 zirconia beads having a diameter of 5 mm were put into a 45 mL zirconia container (manufactured by Fritsch Japan Co., Ltd.), and 1.9 g (corresponding to the solid content) of the solid electrolyte composition D-01 prepared as described above and 12.3 g of butyl butyrate as the total amount of the dispersion medium were put thereinto. Further, 8.0 g of $LiNi_{0.85}Co_{0.10}Al_{0.05}O_2$ (NCA) as a positive electrode active material and 0.1 g of acetylene black were put thereinto. Next, the container was continuously set in a planetary ball mill P-7 and the components were mixed together at a temperature of 25° C. and a rotation speed of 200 rpm for 20 minutes. This way, a positive electrode composition (slurry) D-01 was prepared.

The positive electrode composition D-01 prepared as described above was applied to an aluminum foil as a current collector having a thickness of 20 μm using a Baker Type applicator (trade name: SA-201, manufactured by Tester Sangyo Co., Ltd.), and was heated at 80° C. for 1 hour and heated at 110° C. for 1 hour to dry the positive electrode composition D-01. Next, the dried positive electrode layer composition D-01 was pressurized (20 MPa, 1 minute) while being heated (120° C.) using a heat press machine. As a result, a positive electrode sheet D-01 for an all-solid state secondary battery having a laminate structure of positive electrode active material layer having a thickness of 60 μm/aluminum foil was prepared.

<Preparation of Negative Electrode Sheet D-01 for all-Solid State Secondary Battery>

Next, 180 zirconia beads having a diameter of 5 mm were put into a 45 mL zirconia container (manufactured by Fritsch Japan Co., Ltd.), and 5.0 g (corresponding to the solid content) of the solid electrolyte composition D-01 prepared as described above and 12.3 g of butyl butyrate as the dispersion medium were put thereinto. Next, the container was set in a planetary ball mill P-7 (trade name, manufactured by Fritsch Japan Co., Ltd.), and the components were stirred for 3 hours at a temperature of 25° C. and a rotation speed of 300 rpm. Next, 5.0 g of graphite as a negative electrode active material was put into the container, the container was set in a planetary ball mill P-7 again, and the components were continuously mixed at a temperature of 25° C. and a rotation speed of 100 rpm for 15 minutes. This way, a negative electrode layer composition (slurry) D-01 was obtained.

The negative electrode layer composition D-01 obtained as described above was applied to a stainless steel foil having a thickness of 10 μm using the Baker Type applicator and was heated at 80° C. for 2 hours to dry the negative electrode layer composition D-01. Next, the dried negative electrode layer composition D-01 was pressurized (600 MPa, 1 minute) while being heated (120° C.) using a heat press machine. As a result, a negative electrode sheet D-01 for an all-solid state secondary battery having a laminate structure of negative electrode active material layer having a thickness of 120 μm/stainless steel foil was prepared.

<Manufacturing of All-solid State Secondary Battery D-01>

Next, the prepared solid electrolyte composition D-01 was applied to the negative electrode active material layer of the prepared negative electrode sheet D-01 for an all-solid state secondary battery using the Baker Type applicator, was heated at 80° C. for 1 hour and further heated at 110° C. for 6 hours to dry the solid electrolyte composition D-01. Next, the negative electrode sheet D-01 in which the solid electrolyte layer (applied and dried layer) was formed on the negative electrode active material layer was pressurized (30 MPa, 1 minute) while being heated (120° C.) using a heat press machine. As a result, the negative electrode sheet D-01 having a laminate structure of solid electrolyte layer having a thickness of 60 μm/negative electrode active material layer/stainless steel foil was prepared.

This negative electrode sheet was cut in a circular plate shape having a diameter of 15 mm. On the other hand, the positive electrode sheet D-01 for an all-solid state secondary battery prepared as described above was cut in a circular plate shape having a diameter of 13 mm. The positive electrode active material layer D-01 in the positive electrode sheet for an all-solid state secondary battery and the solid electrolyte layer formed on the negative electrode sheet D-01 were disposed (laminated) to face each other. Next, the sheet was pressurized (40 MPa, 1 minute) while being heated (120° C.) using a heat press machine. As a result, a battery laminate having a laminate structure of aluminum foil/positive electrode active material layer/solid electrolyte layer/negative electrode active material layer/stainless steel foil was prepared.

Figure 2:
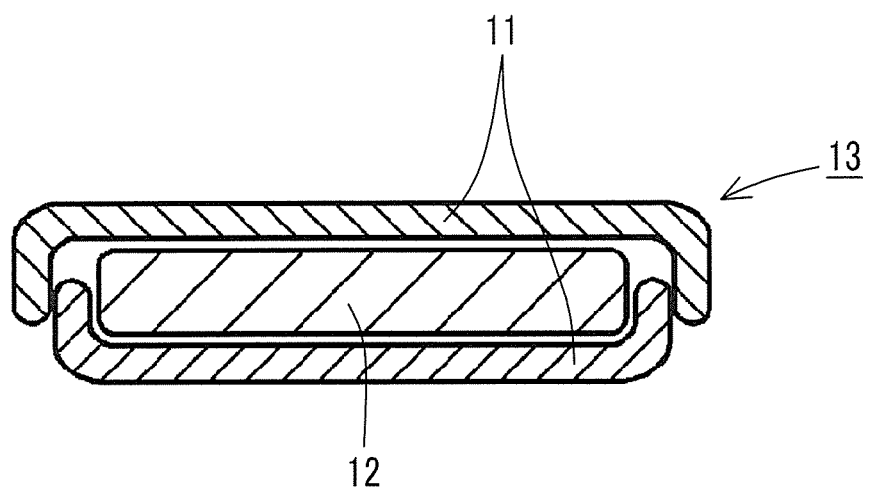
FIG. 2 is a vertical cross-sectional view schematically illustrating an all-solid state secondary battery (coin battery) prepared in Examples.

Next, a battery laminate 12 prepared as described above was put into a 2032-type coin case 11 formed of stainless steel equipped with a spacer and a washer (not shown in FIG. 2), and the 2032-type coin case 11 was swaged. As a result, an all-solid state secondary battery 101 represented by reference numeral 13 in FIG. 2 was prepared.

Examples 2 to 28 and Comparative Examples 2, 3, and 5

A positive electrode sheet for an all-solid state secondary battery and a negative electrode sheet for an all-solid state secondary battery according to each of Examples 2 to 28 and Comparative Examples 2, 3, and 5 were prepared using the same method as that of Example 1, except that the dispersion liquid of the binder particles including the resin shown in Table 2 and the respective compositions prepared using the dispersion liquid of the binder particles were used during the preparation of the solid electrolyte composition D-01, the preparation of the positive electrode sheet D-01 for an all-solid state secondary battery, the preparation of the negative electrode sheet D-01 for an all-solid state secondary battery, and the manufacturing of the all-solid state secondary battery D-01. Using each of the positive electrode sheets and each of the negative electrode sheets, an all-solid state secondary battery according to each of Examples 2 to 28 and Comparative Examples 2, 3, and 5 was manufactured.

<Test of Dispersibility of Solid Electrolyte Composition>

A part of each of the solid electrolyte compositions prepared as described above was separated from the planetary ball mill P-7, and a transparent glass tube having a diameter of 10 mm was charged with the separated composition up to a height of 3 cm. The glass tube was left to stand at 25° C. for 6 hours. Next, the phase separation state of the composition and the degree of phase separation were determined based on the following evaluation standards. In this test, an evaluation standard of "D" or higher is an acceptable level.

-Evaluation Standards-
 A: layer separation did not occur in the composition (slurry)
 B: a portion (supernatant layer) where layer separation occurred was at a distance of less than 2 mm from the liquid level
 C: a portion where layer separation occurred was at a distance of 2 mm or more and less than 5 mm from the liquid level
 D: a portion where layer separation occurred was at a distance of 5 mm or more and less than 10 mm from the liquid level
 E: a portion where layer separation occurred was at a distance of 10 mm or more and less than 20 mm from the liquid level
 F: a portion where layer separation occurred was at a distance of 20 mm or more from the liquid level <Test for Binding Properties of Electrode Sheet for all-Solid State Secondary Battery>

As a test for binding properties of the positive electrode sheet for an all-solid state secondary battery, a bending resistance test using a mandrel tester (according to JIS K5600-5-1) was performed for evaluation. Specifically, a strip-shaped specimen having a width of 50 mm and a length of 100 mm was cut out from each of the sheets. This specimen was set such that the active material layer surface was opposite to the mandrel (the current collector faced mandrel side) and the width direction of the specimen was parallel to the axis of the mandrel. Next, the specimen was bent by 180° (once) along the outer circumferential surface of the mandrel, and whether or not cracking or fracturing occurred in the active material layer was observed. The bending test was performed using a mandrel having a diameter of 32 mm. In a case where cracking and fracturing did not occur, the diameter of the mandrel (unit mm) was gradually reduced to 25, 20, 16, 12, 10, 8, 6, 5, 3, and 2, and the diameter of the mandrel at which cracking and/or fracturing occurred was recorded. Binding properties were evaluated based on one of the following evaluation standards in which the diameter (defect occurrence diameter) at which cracking or fracturing occurred was included. In the present invention, as the defect occurrence diameter decreases, the binding properties of the solid particles become stronger, and an evaluation standard "C" or higher is an acceptable level.

-Evaluation Standards-
 A: 3 mm or less
 B: 5 mm or 6 mm
 C: 8 mm
 D: 10 mm
 E: 12 mm or more (Measurement of Battery Performance (Discharge Capacity))

The discharge capacity was measured as the battery performance using an all-solid state secondary battery prepared using the same method as that of <Manufacturing of All-Solid State Secondary Battery D-01> described above, except that the positive electrode sheet prepared as described above was used.

That is, 180 zirconia beads having a diameter of 5 mm were put into a 45 mL zirconia container (manufactured by Fritsch Japan Co., Ltd.), and 1.9 g (corresponding to the solid content) of the solid electrolyte composition D-01 prepared as described above and 12.3 g of butyl butyrate as the total amount of the dispersion medium were put thereinto. Further, 8.0 g of $LiNi_{0.85}Co_{0.10}Al_{0.05}O_2$ (NCA) as a positive electrode active material and 0.1 g of acetylene black were put thereinto. Next, the container was continuously set in a planetary ball mill P-7 and the components were mixed together at a temperature of 25° C. and a rotation speed of 200 rpm for 20 minutes. This way, a positive electrode composition (slurry) D-01A for capacity measurement was prepared.

Next, the positive electrode composition D-01A prepared as described above was left to stand at 25° C. for 2 hours, was applied to an aluminum foil as a current collector having a thickness of 20 μm using a Baker Type applicator (trade name: SA-201, manufactured by Tester Sangyo Co., Ltd.), and was heated at 80° C. for 1 hour and heated at 110° C. for 1 hour to dry the positive electrode composition D-01A. Next, the dried positive electrode layer composition D-01A was pressurized (20 MPa, 1 minute) while being heated (120° C.) using a heat press machine. As a result, a positive electrode sheet D-01A for capacity measurement of an all-solid state secondary battery having a laminate structure of positive electrode active material layer having a thickness of 60 μm/aluminum foil was prepared.

The discharge capacity of each of the all-solid state secondary batteries using the positive electrode sheet D-01A for an all-solid state secondary battery manufactured as described above was measured using a charging and discharging evaluation device "TOSCAT-3000" (trade name; manufactured by Toyo System Corporation). The all-solid state secondary battery was charged at a current value of 0.2 mA until the battery voltage reached 4.2 V, and then was discharged at a current value of 0.2 mA until the battery voltage reached 3.0 V. This charging and discharging operation was set as one cycle and was repeated. During this charging and discharging cycle, the discharge capacity of the third cycle was obtained. This discharge capacity was converted into a value per 100 $cm^2$ of the surface area of the positive electrode active material layer, and this converted value was set as the discharge capacity of the all-solid state secondary battery and was determined based on the following evaluation standards. In this test, an evaluation standard of "C" or higher is an acceptable level.

-Evaluation Standards-
 A: the discharge capacity was 200 mAh or higher
 B: the discharge capacity was 180 mAh or higher and lower than 200 mAh
 C: the discharge capacity was 160 mAh or higher and lower than 180 mAh D: the discharge capacity was 110 mAh or higher and lower than 160 mAh
E: the discharge capacity was 70 mAh or higher and lower than 110 mAh
F: the discharge capacity was lower than 70 mAh ibility of the solid particles was excellent, and high binding properties were exhibited. Therefore, in the all-solid state secondary battery manufactured using the above-described solid electrolyte composition, the discharge capacity was high.

TABLE 2

| | | Binder Particles | | | | | | | |
|---|---|---|---|---|---|---|---|---|---|
| | | Average Particle Size (nm) | Glass Transition Temperature (° C.) | Mass Average Molecular Weight (×1000) | Number-Average Molecular Weight of Macromonomer (×1000) | SP Value of Macromonomer | Amount of Dissolved Components in Resin Particles | Evaluation Result | | |
| | No. | | | | | | | Dispersibility | Binding Properties | Battery Performance |
| Example 1 | D-01 | 120 | 5 | 88 | 10 | 18.0 | C | B | B | B |
| Example 2 | D-02 | 100 | 2 | 65 | 7 | 18.0 | C | B | B | B |
| Example 3 | D-03 | 80 | −8 | 70 | 7 | 18.0 | C | B | C | C |
| Example 4 | D-04 | 50 | −20 | 150 | 7 | 18.0 | C | C | C | C |
| Example 5 | D-05 | 300 | 75 | 75 | 5 | 18.0 | C | B | C | C |
| Example 6 | D-06 | 270 | 32 | 80 | 20 | 18.0 | C | B | B | C |
| Example 7 | D-07 | 180 | 45 | 110 | 30 | 18.0 | C | B | B | C |
| Example 8 | D-08 | 160 | −2 | 90 | 12 | 18.0 | C | B | A | B |
| Example 9 | D-09 | 150 | −15 | 80 | 10 | 18.0 | C | B | A | A |
| Example 10 | D-10 | 160 | −8 | 75 | 10 | 18.0 | C | A | A | A |
| Example 11 | D-11 | 100 | −10 | 200 | 10 | 18.0 | D | A | B | C |
| Example 12 | D-12 | 210 | −5 | 80 | 10 | 18.0 | D | B | B | C |
| Example 13 | D-13 | 230 | −8 | 50 | 10 | 18.0 | D | C | B | C |
| Example 14 | D-14 | 190 | 5 | 90 | 15 | 17.9 | C | B | B | A |
| Example 15 | D-15 | 120 | 23 | 103 | 12 | 18.1 | C | A | A | A |
| Example 16 | D-16 | 150 | 3 | 92 | 9 | 19.0 | A | B | B | B |
| Example 17 | D-17 | 220 | −30 | 62 | 6 | 18.4 | C | C | B | B |
| Example 18 | D-18 | 60 | −35 | 40 | 0.8 | 19.7 | A | B | B | B |
| Example 19 | D-19 | 80 | −45 | 28 | 0.5 | 19.0 | B | C | B | B |
| Example 20 | D-20 | 200 | −20 | 65 | 0.9 | 16.3 | C | C | B | B |
| Example 21 | D-21 | 250 | −5 | 70 | 2 | 17.3 | B | C | B | B |
| Example 22 | D-22 | 200 | 8 | 90 | 10 | 19.0 | A | A | B | A |
| Example 23 | D-23 | 180 | 5 | 121 | 12 | 19.0 | A | A | B | A |
| Example 24 | D-24 | 250 | 10 | 105 | 10 | 19.0 | A | A | B | A |
| Example 25 | D-25 | 170 | −2 | 75 | 8 | 19.0 | A | A | B | C |
| Example 26 | D-26 | 170 | 8 | 92 | 8 | 19.0 | A | A | A | B |
| Example 27 | D-27 | 190 | 12 | 88 | 6 | 19.0 | A | A | A | B |
| Example 28 | D-38 | 300 | 10 | 80 | 8 | 19.2 | B | C | C | C |
| Comparative Example 1 | CD-01 | — | — | — | — | — | — | — | — | — |
| Comparative Example 2 | CD-02 | 120 | −2 | 52 | 10 | 18.0 | D | D | D | D |
| Comparative Example 3 | CD-03 | — | −25 | 90 | 10 | 18.0 | F | F | D | F |
| Comparative Example 4 | cD-04 | — | — | — | — | — | — | — | — | — |
| Comparative Example 5 | CD-05 | — | −22 | 75 | 10 | 18.0 | F | F | D | D |

As can be seen from Table 2, regarding the binder particles including the resin having the branched structure that did not satisfy (Formula 1) according to the present invention, even in a case where a dispersion liquid thereof was prepared, and a large amount of unreacted polymerizable compound (soluble components) remained. In the solid electrolyte sheet formed of the solid electrolyte composition including the above-described binder particles, binding properties between solid particles were insufficient, and the battery performance of the all-solid state secondary battery was also insufficient.

On the other hand, in the binder particles prepared in each of Examples, irrespective of whether to be the branched structure, the high-purity resin represented by (Formula 1) in which the amount of dissolved components was low was present. As a result, in the solid electrolyte composition including the above-described binder particles, the dispersibility of the solid particles was excellent, and high binding properties were exhibited. Therefore, in the all-solid state secondary battery manufactured using the above-described solid electrolyte composition, the discharge capacity was high.

Example 29

In Examples, using the solid electrolyte composition in which the content of the binder particles was reduced, the dispersibility of the solid electrolyte composition and the binding properties of the positive electrode sheet for an all-solid state secondary battery were evaluated. The results are shown in Table 3.

That is, a solid electrolyte composition according to Example 29 was prepared using the same preparation method as that of the solid electrolyte composition D-01 in Example 1, except that the amount of LPS was reduced to 9.9 g and the amount of the dispersion liquid of the binder particles D-16 was changed to 0.1 g in terms of solid contents. Using the above-described solid electrolyte composition, a positive electrode sheet for an all-solid state secondary battery according to Example 29 was prepared using the same method as that of Example 1.

Examples 30 to 39

Each of solid electrolyte compositions according to Examples 30 to 39 was prepared using the same preparation method as that of the solid electrolyte composition according to Example 29, except that the dispersion liquid of the binder particles including the resin shown in Table 3 was used. Using the obtained solid electrolyte composition, each of positive electrode sheets for an all-solid state secondary battery according to Examples 30 to 39 was prepared using the same method as that of Example 1.

<Test of Dispersibility of Solid Electrolyte Composition>

The dispersibility of each of solid electrolyte compositions according to Examples 29 to 39 was evaluated using the same method as that of <Test of Dispersibility of Solid electrolyte composition> in Example 1, except that each of the solid electrolyte compositions according to Examples 29 to 39 prepared as described above was used.

<Test for Binding Properties of Electrode Sheet for all-Solid State Secondary Battery>

The binding properties of each of the electrode sheets for an all-solid state secondary battery according to Examples 29 to 39 was evaluated using the same method as that of <Test for Binding Properties of Electrode Sheet for All-Solid State Secondary Battery> in Example 1, except that a specimen cut from each of the positive electrode sheets for an all-solid state secondary battery prepared in Examples 29 to 39 was used.

TABLE 3

| | | Binder Particles | | | | | | Evaluation Result | |
|---|---|---|---|---|---|---|---|---|---|
| | No. | Average Particle Size (nm) | Glass Transition Temperature (° C.) | Mass Average Molecular Weight (×1000) | Number-Average Molecular Weight of Macromonomer (×1000) | SP Value of Macromonomer | Amount of Dissolved Components in Resin Particles | Dispersibility | Binding Properties |
| Example 29 | D-16 | 150 | 3 | 92 | 9 | 19.0 | A | B | C |
| Example 30 | D-28 | 120 | 0 | 120 | 120 | 18.9 | B | B | C |
| Example 31 | D-29 | 250 | 50 | 60 | 6 | 19.0 | B | B | C |
| Example 32 | D-30 | 160 | −1 | 80 | 6 | 19.2 | A | B | C |
| Example 33 | D-31 | 200 | 45 | 100 | 8 | 19.4 | A | B | C |
| Example 34 | D-32 | 150 | 70 | 150 | 10 | 19.3 | A | B | C |
| Example 35 | D-33 | 300 | −5 | 80 | 6 | 18.9 | B | B | C |
| Example 36 | D-34 | 100 | 30 | 150 | 100 | 19.0 | A | A | B |
| Example 37 | D-35 | 80 | 62 | 100 | 120 | 18.8 | A | A | B |
| Example 38 | D-36 | 80 | 40 | 90 | 140 | 18.8 | A | A | B |
| Example 39 | D-37 | 60 | 80 | 80 | 160 | 18.8 | A | A | A |

As can be seen from Table 3, in the binder particles prepared in each of Examples 29 to 39, irrespective of whether to be the branched structure, the high-purity resin represented by (Formula 1) in which the amount of dissolved components was low was present. As a result, in the solid electrolyte composition including the above-described binder particles, although the content of the binder particles was reduced up to 0.2 mass %, the dispersibility of the solid particles was excellent, and high binding properties were exhibited. As a result, it can be seen that, in the all-solid state secondary battery manufactured using the above-described solid electrolyte composition, the discharge capacity was high.

The present invention has been described using the embodiments. However, unless specified otherwise, any of the details of the above description is not intended to limit the present invention and can be construed in a broad sense within a range not departing from the concept and scope of the present invention disclosed in the accompanying claims.

The present application claims priority based on JP2018-081671 filed on Apr. 20, 2018 and JP2019-066143 filed on Mar. 29, 2019, the entire contents of which are incorporated herein by reference.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery
11: coin case
12: battery laminate
13: cell (coin battery) for ion conductivity measurement

What is claimed is:

1. A solid electrolyte composition comprising:
   an inorganic solid electrolyte having ion conductivity of a metal belonging to Group 1 or Group 2 in the periodic table; and
   binder particles including a resin represented by the following (Formula 1),

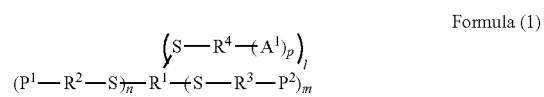

Formula (1)

in the formula, $R^1$ represents a (l+m+n)-valent linking group, $A^1$ represents a hydrogen atom, an acidic group, a group having a basic nitrogen atom, a urea group, a urethane group, an alkoxysilyl group, an epoxy group, an isocyanate group, or a hydroxyl group, p represents an integer of 1 to 10, $R^2$, $R^3$, and $R^4$ each independently represent a single bond or a linking group, $P^1$ represents a polymer chain including 50 mass % or higher of a component having a SP value of 19.5 or higher, P² represents a polymer chain including a component derived from a macromonomer having a number-average molecular weight of 500 or higher, l represents an integer of 0 to 5, n represents an integer of 1 to 8, n represents an integer of 1 to 9, and l+m+n represents an integer of 3 to 10.

2. The solid electrolyte composition according to claim 1, wherein the macromonomer includes an ethylenically unsaturated bond at a terminal or a side chain.

3. The solid electrolyte composition according to claim 1, wherein the macromonomer is represented by the following (Formula 3), $$H_2C={\overset{R^{11}}{\underset{}{C}}}-W-P^3 \qquad \text{Formula (3)}$$

in the formula, $R^{11}$ represents a hydrogen atom or an alkyl group having 1 to 8 carbon atoms, W represents a single bond or a linking group, and $P^3$ represents a polymer chain.

4. The solid electrolyte composition according to claim 1, wherein the macromonomer includes a polymer chain selected from the group consisting of a (meth)acrylic polymer, polyether, polysiloxane, polyester, and a combination thereof and an ethylenically unsaturated bond bound to the polymer chain.

5. The solid electrolyte composition according to claim 1, wherein the polymer chain $P^1$ includes a component derived from a polymerizable compound selected from a (meth)acrylic acid compound, a (meth)acrylic acid ester compound, or a (meth)acrylonitrile compound.

6. The solid electrolyte composition according to claim 1, wherein the resin is a reactant of a compound represented by the following (Formula 2), a polymerizable compound forming the polymer chain $P^1$, and a polymerizable compound forming the polymer chain $P^2$, $$((A^2)_p-R^6-S)_l-R^5-(SH)_{m+n} \qquad \text{Formula (2)}$$

in the formula, $R^5$ represents a (l+m+n)-valent linking group, $R^6$ represents a single bond or a linking group, $A^2$ represents a hydrogen atom, an acidic group, a group having a basic nitrogen atom, a urea group, a urethane group, an alkoxysilyl group, an epoxy group, an isocyanate group, or a hydroxyl group, p represents an integer of 1 to 10, l represents an integer of 0 to 5, m+n represents an integer of 2 to 10, and l+m+n represents an integer of 3 to 10.

7. The solid electrolyte composition according to claim 1, wherein a polymer chain in the macromonomer includes a component derived from a (meth)acrylic acid ester compound that has an alkyl group having 4 or more carbon atoms and a component derived from a polymerizable compound having a SP value of 20.0 or higher.

8. The solid electrolyte composition according to claim 1, wherein a polymer chain in the macromonomer includes at least one component selected from a component derived from a (meth)acrylic acid ester compound that has an alkyl group having 4 or more carbon atoms, a component represented by the following (Formula 4), a component represented by the following (Formula 5), or a component derived from a (meth)acrylic acid hydroxyalkyl ester compound, $$\text{Formula (4)}$$

in (Formula 4), $R^{10}$ represents a hydrogen atom or methyl, $A^2$ represents —O— or —$NR^A$—, $R^A$ represents a hydrogen atom or an alkyl group, $R^{12}$ represents a single bond or a linking group, $B^1$ represents a single bond or a linking group including —$CONR^C$— or —$SO_2NR^C$—, $R^C$ represents a hydrogen atom or an alkyl group, and $R^{13}$ represents a hydrogen atom, an alkyl group having 1 to 20 carbon atoms, an aromatic group, an aryloxy group, or an aralkyloxy group, and $$\text{Formula (5)}$$

in (Formula 5), $R^{14}$ represents a hydrogen atom or methyl, and $R^{15}$ and $R^{16}$ represent a hydrogen atom or an alkyl group.

9. The solid electrolyte composition according to claim 7, wherein a polymer chain in the macromonomer includes a component derived from a (meth)acrylic acid ester compound having an alicyclic structure.

10. The solid electrolyte composition according to claim 1, wherein a glass transition temperature of the binder particles is 30° C. or lower.

11. The solid electrolyte composition according to claim 1, wherein an average particle size of the binder particles is 300 nm or less.

12. The solid electrolyte composition according to claim 1, wherein the inorganic solid electrolyte is represented by the following Formula (S1), $$L_{a1}M_{b1}P_{c1}S_{d1}A_{e1} \qquad (S1),$$

in the formula, L represents an element selected from Li, Na, or K,

M represents an element selected from B, Zn, Sn, Si, Cu, Ga, Sb, Al, or Ge,

A represents an element selected from I, Br, Cl, or F, and a1 to e1 represent the compositional ratios among the respective elements, and a1:b1:c1:d1:e1 satisfies 1 to 12:0 to 5:1:2 to 12:0 to 10.

13. The solid electrolyte composition according to claim 1, further comprising a dispersion medium.

14. The solid electrolyte composition according to claim 13,
wherein the dispersion medium is selected from a ketone compound, an aliphatic compound, or an ester compound.

15. The solid electrolyte composition according to claim 1, further comprising an active material.

16. A sheet for an all-solid state secondary battery, the sheet comprising a layer that is formed of the solid electrolyte composition according to claim 1.

17. An electrode sheet for an all-solid state secondary battery, the electrode sheet comprising an active material layer that is formed of the solid electrolyte composition according to claim 15.

18. An all-solid state secondary battery comprising a positive electrode active material layer, a solid electrolyte layer, and a negative electrode active material layer in this order,
wherein at least one of the positive electrode active material layer, the solid electrolyte layer, or the negative electrode active material layer is formed of the solid electrolyte composition according to claim 1.

19. A method of manufacturing a sheet for an all-solid state secondary battery, the method comprising forming a film using the solid electrolyte composition according to claim 1.

20. A method of manufacturing an all-solid state secondary battery, the method comprising manufacturing the all-solid state secondary battery through the method according to claim 19.

* * * * *